US006266901B1

(12) United States Patent
Kanda et al.

(10) Patent No.: US 6,266,901 B1
(45) Date of Patent: Jul. 31, 2001

(54) WORK MACHINE

(75) Inventors: Toshimasa Kanda, Hirakata; Norihiro Aoshiba; Michio Chamura, both of Komatsu; Hiroshi Yoshinada, Machida; Naritoshi Ohtsukasa, Isehara, all of (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/462,410

(22) PCT Filed: May 8, 1998

(86) PCT No.: PCT/JP98/02048

§ 371 Date: Jan. 10, 2000

§ 102(e) Date: Jan. 10, 2000

(87) PCT Pub. No.: WO99/02789

PCT Pub. Date: Jan. 21, 1999

(30) Foreign Application Priority Data

Jul. 11, 1997 (JP) .................................................. 9-186534

(51) Int. Cl.[7] ................................ E02F 3/96; E02F 9/12; B66C 23/84; A01D 34/86; E04G 23/08

(52) U.S. Cl. .................................................................. 37/403

(58) Field of Search ............................ 37/403, 417, 443, 37/466, 903, 410; 701/50

(56) References Cited

FOREIGN PATENT DOCUMENTS 5037877 5/1993 (JP) .
6173295 6/1994 (JP) .
7165389 6/1995 (JP) .
133159 5/2000 (JP) .

*Primary Examiner*—Christopher J. Novosad
(74) *Attorney, Agent, or Firm*—Varndell & Varndell, PLLC

(57) ABSTRACT

A work machine for achieving efficient coordinated operations by a plurality of kinds of operating units, comprising first and second swivel driving members and first and second swivel joints, wherein a first swiveling base bearing a first operating unit and a second swiveling base bearing a second operating unit can swivel around a common swiveling axis independently relative to a traveling base.

26 Claims, 37 Drawing Sheets

WORK MACHINE

TECHNICAL FIELD

The present invention relates to a work machine for performing a variety of operations, such as breaking, excavating, lifting, loading, and the like, by operating an operating unit, and more particularly, to improvements in a work machine equipped with a plurality of operating units.

BACKGROUND ART

Conventionally, in order to improve working efficiency in work machines, such as construction machines, and the like, machines equipped with a plurality of different operating units have been proposed.

For example, in a work machine equipped with a loading operating unit for performing loading operations by means of a loading bucket and an excavating operating unit for performing excavating operations by means of a digging bucket, the aforementioned loading operating unit and excavating operating unit can be operated in coordination with each other, in such a manner that soil generated by the excavating operation can be loaded and removed directly, thereby improving the working efficiency.

A work machine such as that as described above generally comprises a traveling base which travels by means of crawler treads or wheels, and a swiveling base provided rotatably on the upper portion of the traveling base, in such a manner that one operating unit can be supported on the swiveling base to form an upper operating unit, whilst another operating unit is supported on the traveling base to form a lower operating unit.

In a work machine having this composition, the orientation of the upper operating unit can be changed as desired, by causing the swiveling base to swivel in an appropriate direction with respect to the traveling base, and hence work can be carried out by the upper operating unit throughout a range of 360°, regardless of the orientation of the traveling base.

However, the operational range of the lower operating unit is restricted by the orientation of the traveling base, and therefore the range in which coordinated operation of the upper operating unit and the lower operating unit can be performed is limited to the operational range of the lower operating unit, unless the orientation of the traveling base is changed.

In other words, with a conventional work machine as described above, in cases where coordinated operation of the upper operating unit and lower operating unit is to be performed over a wide range, the orientation of the traveling base must be changed, each time the range of coordinated operation exceeds the operational range of the lower operating unit, thereby leading to a decline in working efficiency corresponding to the amount of work involved in changing the orientation of the traveling base.

In view of these circumstances, Japanese Utility Model Application Laid-open No. 37877/1993, for example, describes a crane, wherein a swiveling unit is attached rotatably to the upper portion of a frame equipped with an outrigger, and furthermore, a traveling base is attached rotatably to the lower portion of the frame. Moreover, Japanese Patent Application Laid-open No. 173295/1994 discloses an excavating device with conveyor, wherein a first swiveling unit is installed on a lower traveling unit via a first swiveling device, a second swiveling unit is installed on top of the first swiveling unit via a second swiveling device, and a conveyor is attached to the side portion of the first swiveling unit, whilst an excavating front unit is attached to the second swiveling unit.

According to the crane disclosed in Japanese Utility Model Application Laid-open No. 37877/1993, the outrigger can be orientated in any direction by swiveling the frame, and moreover, the crane can be orientated in any direction with respect to the traveling unit and the outrigger by causing the swiveling unit to swivel. Furthermore, in the excavating device with conveyor disclosed in Japanese Patent Application Laid-open No. 173295/1994, the conveyor can be orientated in any direction with respect to the power traveling unit by causing the first swiveling unit to swivel, and the excavating front unit can be orientated in any direction with respect to the lower traveling unit and the conveyor by causing the second swiveling unit to swivel.

However, in the work machines disclosed in the aforementioned patent specifications, neither the detailed composition of the swiveling mechanism nor the detailed composition of the mode for connecting hydraulic circuits is described in either case, and hence there is the risk that various problems will arise at the stage of practical implementation.

Moreover, a work machine provided with two swiveling mechanisms has also been proposed, for instance, in Japanese Patent Application Laid-open No. 165392/1995, wherein a swiveling unit is installed on a traveling unit by means of a first swiveling mechanism, and a crane is provided on this swiveling unit in an eccentric position with respect to the first swiveling mechanism, by means of a second swiveling mechanism.

However, the device disclosed in Japanese Patent Application Laid-Open No. 165392/1995 is equipped only with a crane as an operating unit, and hence it, is not capable of performing coordinated operations involving operating units of a plurality of different types.

With the foregoing in view, it is an object of the present invention to achieve a work machine whereby coordinated operations involving operating units of a plurality of different types can be performed in an efficient manner.

Moreover, it is a further object of the present invention to provide a novel work machine whereby coordinated operations involving operating units of a plurality of different types can be performed in an efficient manner.

DISCLOSURE OF THE INVENTION

The invention described in the claim 1 is a work machine characterized in that it comprises: a first swiveling base installed rotatably about a prescribed swiveling axis on an upper portion of a traveling base; a first operating unit supported on the first swiveling base; a second swiveling base installed rotatably about the swiveling axis on an upper portion of the first swiveling base; a second operating unit supported on the second swiveling base; first swivel driving means, provided between the traveling base and the first swiveling base, for driving the traveling base and the first swiveling base in rotation with respect to each other; second swivel driving means, provided between the first swiveling base and the second swiveling base, for driving the first and second swiveling bases in rotation with respect to each other; a first swivel joint extending inside the traveling base and the first swiveling base in a state where a central axis thereof coincides with the swiveling axis, whereby hydraulic pressure fluid can be supplied to respective hydraulic circuits of the traveling base and the first swiveling base; and a second swivel joint extending inside the first swiveling base and the second swiveling base in a state where a central axis thereof coincides with the swiveling axis, whereby hydraulic pressure fluid can be supplied to respective hydraulic circuits of the first swiveling base and the second swiveling base.

According to the invention described in the claim 1, since first and second swivel driving means and first and second swivel joints are provided and the first swiveling base supporting the first operating unit and the second swiveling base supporting the second operating unit can be caused to swivel respectively and independently about a common swiveling axis with respect to the traveling base, it is possible to achieve a work machine whereby coordinated operations by means of the first and second operating units can be carried out over a wide range, regardless of the orientation of the traveling base.

The invention described in the claim 2 is a work machine characterized in that it comprises: a first swiveling base installed rotatably about a prescribed swiveling axis on an upper portion of a traveling base; a first operating unit supported on the first swiveling base; a second swiveling base installed rotatably about the swiveling axis on an upper portion of the first swiveling base; a second operating unit supported on the second swiveling base; first swivel driving means, provided between the traveling base and the first swiveling base, for driving the traveling base and the first swiveling base in rotation with respect to each other; second swivel driving means, provided between the first swiveling base and the second swiveling base, for driving the first and second swiveling bases in rotation with respect to each other; and a two-stage swivel joint comprising a pair of rotors having respective center holes and a single shaft fitting into the center holes of the rotors, in a rotatable fashion, the two-stage swivel joint extending inside the traveling base, the first swiveling base and the second swiveling base, in a state where a central axis of the shaft is aligned with the swiveling axis, in such a manner that hydraulic pressure fluid can be supplied to respective hydraulic circuits of the traveling base, first swiveling base and second swiveling base via the pair of rotors and the shaft.

According to the invention described in the claim 2, since first and second swivel driving means and a two-stage swivel joint are provided, and the first swiveling base supporting the first operating unit and the second swiveling base supporting the second operating unit can be caused to swivel respectively and independently about a common swiveling axis with respect to the traveling base, it is possible to achieve a work machine whereby coordinated operations by means of the first and second operating units can be carried out over a wide range, regardless of the orientation of the traveling base.

Moreover, in the invention described in the claim 2, since a two-stage swivel joint comprising a pair of rotors installed on a single shaft is used, the overall length can be shortened compared to a case where separate swivel joints are used for the first and second swiveling bases, and hence any increase in the overall height of the work machine caused by the provision of two swiveling bases can be restricted.

Here, in a case where a two-stage swivel joint as described above is used, if the central portion of the aforementioned joint is fixed to either the traveling base or the first swiveling base, as described in the claim 3, then deviation in the central axis of the shaft caused by swiveling of the first swiveling base or second swiveling base can be suppressed readily, thereby making it possible to prevent any problems relating to the hydraulic system, for instance, leaking of oil, caused by such deviation in the central axis of the shaft.

The invention described in the claim 4 is a work machine characterized in that it comprises: a first swiveling base, installed rotatably about a prescribed swiveling axis on an upper portion of a traveling base, comprising a first major swiveling gearwheel and a second major swiveling gearwheel respectively having centers on the swiveling axis; a first operating unit supported on the first swiveling base; a second swiveling base installed rotatably about the swiveling axis on an upper portion of the first swiveling base; a second operating unit supported on the second swiveling base; a first swivel drive motor, an output shaft of which is fixed to a first swiveling pinion, which is held on the traveling base in a state where the first swiveling pinion engages with the first major swiveling gearwheel; and a second swivel drive motor, an output shaft of which is fixed to a second swiveling pinion, which is held on the second swiveling base in a state where the second swiveling pinion engages with the second major swiveling gearwheel.

According to the invention described in the claim 4, since a first and second swiveling major gearwheel and a first and second swivel drive motor are provided, and the first swiveling base supporting the first operating unit and the second swiveling base supporting the second operating unit can be caused to swivel respectively and independently about a common swiveling axis with respect to the traveling base, then it is possible to achieve a work machine whereby coordinated operations by means of the first and second operating units can be carried out over a wide range.

Moreover, according to the invention described in the claim 4, since tie first and second swivel drive motors, which are relatively tall in height, are held respectively on the traveling base and the second swiveling base, it is possible to reduce the height of the first swiveling base to a minimum, thereby restricting any increase in the overall height of the work machine.

The invention described in the claim 5 is a work machine characterized in that it comprises: a first swiveling base installed rotatably about a prescribed swiveling axis on an upper portion of a traveling base; a supporting frame section extending from the first swiveling base in an outward radial direction from the swiveling axis and having an empty space in an inner portion thereof a fire operating unit supported on the first swiveling base via the supporting frame section; a hydraulic piping passing through the empty space in the supporter frame section, through which hydraulic oil can be caused to flow to the first operating unit; a second swiveling base installed rotatably about the swiveling axis on an upper portion of the first swiveling base; a second operating unit supported on the second swiveling base; first swivel driving means, provided between the traveling base and the first swiveling base, for driving the traveling base and the first swiveling base in rotation with respect to each other; and second swivel driving means, provided between the first swiveling base and the second swiveling base, for driving the first and second swiveling bases in rotation with respect to each other.

According to the invention described in the claim 5, since first and second swivel driving means are provided, and the first swiveling base supporting the first operating unit and the second swiveling base supporting the second operating unit can be caused to swivel respectively and independently about a common axis with respect to the traveling base, then it is possible to achieve a work machine whereby coordinated operations by means of the first and second operating units can be carried out over a wide range, regardless of the orientation of the traveling base.

Moreover, in the invention described in the claim 5, since the hydraulic piping for supplying hydraulic oil to the first operating unit is installed inside the supporting frame section provided on the first swiveling base, there is no need to provide a cover for preventing damage to the hydraulic piping.

Consequently, the first swiveling base can be positioned adjacently to the traveling base, and moreover, the second swiveling base can be positioned adjacently to the first swiveling base, thereby making it possible to restrict any increase in the overall height of the work machine.

The invention described in the claim 6 is a work machine characterized in that it comprises: a first swiveling base installed rotatably about a prescribed swiveling axis on an upper portion of a traveling base; a first operating unit supported on the first swiveling base; a second swiveling base installed rotatably about the swiveling axis on an upper portion of the first swiveling base; a second operating unit supported on the second swiveling base; first swivel driving means, provided between the traveling base and the first swiveling base, for driving the traveling base and the first swiveling base in rotation with respect to each other; second swivel driving means, provided between the first swiveling base and the second swiveling base, for driving the first and second swiveling bases in rotation with respect to each other; and swivel controlling means for controlling the first swivel driving means and the second swivel driving means, respectively, and, when the first swiveling base is swiveling in one direction with respect to the traveling base, causing the second swiveling base to swivel at the same angular speed in the other direction with respect to the first swiveling base.

According to the invention described in the claim 6, since first and second swivel driving means are provided, and the first swiveling base supporting the first operating unit and the second swiveling base supporting the second operating unit can be caused to swivel respectively and independently about a common axis with respect to the traveling base, then it is possible to achieve a work machine whereby coordinated operations by means of the first and second operating units can be carried out over a wide range, regardless of the orientation of the traveling base.

Moreover, in the invention described in the claim 6, by operating the swivel controlling means, the first swiveling base can be caused to swivel in one direction with respect to the traveling base, whilst the second swiveling base is caused to swivel at the same angular speed in the opposite direction with respect to the first swiveling base, thereby making it possible to cause the first swiveling base only to swivel, whilst the position of the second swiveling base does not change with respect to the traveling base.

Here, first swivel driving means and second swivel driving means respectively comprising major swiveling gearwheels and hydraulic swiveling motors, the output shafts of which are fixed to swiveling pinions, are employed, and if similar major swiveling gearwheels, swiveling pinions and hydraulic swiveling motors are used in the respective swivel driving means, then it is possible simply to supply the same quantity of hydraulic oil to the first hydraulic swiveling motor and the second hydraulic swiveling motor, respectively, without requiring complex control circuitry.

However, even in cases where major swiveling gearwheels and swiveling pinions of mutually different diameter, and moreover, mutually different hydraulic swiveling motors, are used, by controlling the quantity of hydraulic oil supplied to the respective hydraulic swiveling motors, appropriately, by means of flow control valves, the beneficial action described above can be obtained, in other words, the first swiveling base can be caused to swivel in one direction with respect to the traveling base, whilst the second swiveling base is caused to swivel at the same angular speed in the opposite direction with respect to the first swiveling base, thereby making it possible to cause the first swiveling base only to swivel, whilst the position of the second swiveling base does not change with respect to the traveling base.

The invention described in the claim 8 is a work machine characterized in that it comprises: a first swiveling base, installed rotatably about a prescribed swiveling axis on an upper portion of a traveling base, comprising a first major swiveling gearwheel and a second major swiveling gearwheel, which are mutually similar and respectively have centers on the swiveling axis; a supporting frame section, extending from the first swiveling base in an outward radial direction from the swiveling axis and having an empty space in an inner portion thereof; a first operating unit supported on the first swiveling base via the supporting frame section; a hydraulic piping passing through the empty space in the supporting frame section, through which hydraulic oil can be caused to flow to the first operating unit; a second swiveling base installed rotatably about the swiveling axis on an upper portion of the first swiveling base; a second operating unit supported or the second swiveling base; a first hydraulic swiveling motor, an output shaft of which is fixed to a first swiveling pinion, which is held on the traveling base in a state where the first swiveling pinion engages with the first major swiveling gearwheel, a second hydraulic swiveling motor, an output shaft of which is fixed to a second swiveling pinion similar to the first swiveling pinion, which is held on the second swiveling base in a state where the second swiveling pinion engages with the second major swiveling gearwheel and is driven at the same number of revolutions as the first hydraulic swiveling motor when the same quantity of hydraulic oil is supplied thereto; swivel controlling means for supplying the same quantity of hydraulic oil to the first hydraulic swiveling motor and the second hydraulic swiveling motor, respectively, and, when the first swiveling base is swiveling in one direction, causing the second swiveling base to swivel at the same angular speed in the other direction with respect to the first swiveling base; and a two-stage swivel joint comprising a pair of rotors having respective center holes and a single shaft fitting into the center holes of the rotors, in a rotatable fashion, the two-stage swivel joint extending inside the traveling base, the first swiveling base and the second swiveling base, in a state where a central axis of the shaft is aligned with the swiveling axis and a central portion of the joint in an axial direction thereof is fixed to either one of the traveling base or the first swiveling base, whereby respective hydraulic circuits of the traveling base, the first swiveling base and the second swiveling base can be mutually connected via the pair of rotors and the shaft.

According to the invention described in the claim 8, since first and second major swiveling gearwheels, first and second swiveling hydraulic motors, swivel controlling means and a two-stage swivel joint are provided, and the first swiveling base supporting the first operating unit and the second swiveling base supporting the second operating unit can be caused to swivel respectively and independently about a common swiveling axis with respect to the traveling base, it is possible to achieve a work machine whereby coordinated operations by means of the first and second operating units can be carried out over a wide range, regardless of the orientation of the traveling base.

Moreover, since the invention described in the claim 8 incorporates the composition of the inventions described in the claims 2 to 7, it can also be expected to provide all of the beneficial effects described in the claims 2 to 7. In particular, since, in addition to using a two-stage swivel joint, the first hydraulic swiveling motor and the second hydraulic swiveling motor are held respectively on the traveling base and the second swiveling base, and the hydraulic piping supplying hydraulic oil to the first operating unit is installed inside the supporting frame section provided on the first swiveling base, it is possible to prevent increase in the overall height of the work machine with even more reliability.

Desirably, the first operating unit and the second operating unit used in the inventions described in the claims 1 to 8 should be such that the operating units can be used to perform coordinated operations together, or such that one operating unit can be used to supplement the work of the other operating unit, for example, as the invention described in the claims 9 to 19, a combination of an outrigger device and a crane operating unit, a combination of a fork operating unit and a grapple operating unit, a combination of a fork operating unit and a crane operating unit, a combination of a loading operating unit and an excavating operating unit, a combination of a loading operating unit and a breaking operating unit, a combination of a fork operating unit and a tree processing operating unit, a combination of a grass cutting operating unit and a grapple operating unit, a combination of a cutting operating unit and a grapple operating unit, a combination of a gathering operating unit and a brush operating unit, a combination of a clamp operating unit and a grapple operating unit, a combination of a fork operating unit and an excavating operating unit, or the like.

Here, in cases where a loading operating unit is used as the first operating unit, as the invention described in the claim 20 or 21, desirably, the aforementioned loading operating unit comprises: a pair of lift arms supported via the base end portions thereof on the first swiveling base, in an upwardly and downwardly movable fashion, a loading bucket being supported on the respective front end portions of the pair of lift arms, swingably about a horizontal axis linking these front end portions; and a pair of dump cylinder actuators located respectively along the front end portions of the lift arms, in positions to the inside of the respective lift arms, the cylinder tubes thereof being supported on the loading bucket and the piston rods thereof being supported on the lift arms, whereby the loading bucket can be caused to swing with respect to the lift arms.

According to the inventions described in the claims 20 and 21, since the dump cylinder actuators are positioned to the inside of the lift arms, it is possible to prevent damage to the dump cylinder actuators caused by interference with the second operating unit.

Moreover, since the cylinder tubes of the dump cylinder actuators are supported on the loading bucket, then when soil loaded into the loading bucket spills over onto the actuators, they do not become damaged by abrasion of this soil.

If the first operating unit is a loading operating unit and the second operating unit is an excavating operating unit, whilst the traveling base is a unit which travels on wheels, then as the invention described in the claim 22, desirably, the loading operating unit should comprise: a pair of first arms supported via the base end portions thereof on the first swiveling base, in an upwardly and downwardly movable fashion; a pair of second arms supported on the respective front end portions of the first arms, swingably about a horizontal axis; a loading bucket supported on this pair of second arms, swingably about a horizontal axis linking the respective front end portions of the second arms; and arm extension cylinder actuators, positioned respectively between the first arms and the second arms, which cause the loading bucket to move towards, or away from, the traveling base, by means of the second arms swinging with respect to the first arms.

According to the invention described in the claim 22, by moving the loading bucket to a position adjacent to the traveling base, satisfactory stability can be ensured during movement of the traveling base and the manoeuvrability of the machine can be improved dramatically in cases where, for instance, it is used as a snow-removing machine.

The invention described in the claim 23 is a work machine characterized in that it comprises: a first swiveling base installed rotatably about a prescribed swiveling axis on an upper portion of a traveling base and supporting a cutting operating unit provided with a cutter; and a second swiveling base installed rotatably about a prescribed swiveling axis on an upper portion of the first swiveling base and supporting a grapple operating unit provided with a hand.

According to the invention described in the claim 23, since a feed for performing a cutting operation can be supplied to the cutter of the cutting operating unit, regardless of the orientation of the traveling base or the orientation of the grapple operating unit, by causing the first swiveling base to swivel with respect to the traveling base and the second swiveling base, it is possible to perform cutting of objects to be cut whilst holding the objects by means of the grapple operating unit.

The invention described in the claim 24 is a work machine characterized in that it comprises: a first swiveling base installed rotatably about a prescribed swiveling axis on an upper portion of a traveling base and supporting a gathering operating unit provided with a bucket; and a second swiveling base installed rotatably about a prescribed swiveling axis on an upper portion of the first swiveling base and supporting a brush operating unit provided with a brush for sweeping up objects into the gathering operating unit.

According to the invention described in the claim 24, by causing the first swiveling base and the second swiveling base to swivel appropriately with respect to the traveling base, the gathering operating unit and the brush operating unit can be orientated in any direction, regardless of the orientation of the traveling base, thereby allowing objects distributed over a wide range about the traveling base to be gathered up in an efficient manner. For example, if the bucket in the twenty-fourth aspect of the invention is provided with a screen mesh, then it becomes possible to gather up rubbish only scattered on a beach, in an efficient manner.

The invention described in the claim 25 is a work machine characterized in that it comprises: first swiveling base installed rotatably about a prescribed swiveling axis on an upper portion of a traveling base and supporting a clamping operating unit provided with a clamper; and a second swiveling base installed rotatably about a prescribed swiveling axis on an upper portion of the first swiveling base and supporting a grapple operating unit provided with a hand.

According to the invention described in the claim 25, by causing the first swiveling base and the second swiveling base to swivel appropriately with respect to the traveling base, it is possible to orientate the clamp operating unit and the grapple operating unit in any direction, regardless of the of the orientation of the traveling base, for example, in a car breaking site, an operation whereby dismantlable items are successively removed by the grapple operating unit from car held under pressure by the grapple operating unit, can be carried out in an efficient manner.

The invention described in the claim 26 is a work machine characterized in that it comprises: a first swiveling base installed rotatably about a prescribed swiveling axis on an upper portion of a traveling base and supporting a fork operating unit provided with a fork; and a second swiveling base installed rotatably about a prescribed swiveling axis on an upper portion of the first swiveling base and supporting an excavating operating unit provided with a root-cutting bucket.

According to the invention described in the claim 26, by respectively causing the first swiveling base and the second swiveling base to swivel appropriately with respect to the traveling base, it is possible to orientate the fork operating unit and the excavating operating unit in any direction, regardless of the orientation of the traveling base, and for example, by placing an extracted tree on the fork operating unit, whilst holding the upper end of the tree with the excavating operating unit and then causing the fork operating unit and the excavating operating unit to swivel in mutually opposing directions from this state, it is possible to hold the tree readily in a horizontal position, in other words, in a position suitable for transporting the tree.

BRIEF DESCRIPTION OF THE DRAWINGS

FIG. 18(*e*) is a side view showing a fourth embodiment of a work machine relating to the present invention;

BEST MODE FOR CARRYING OUT THE INVENTION

Below, the present invention is described in detail with reference to drawings depicting embodiments thereof.

Figure 1:
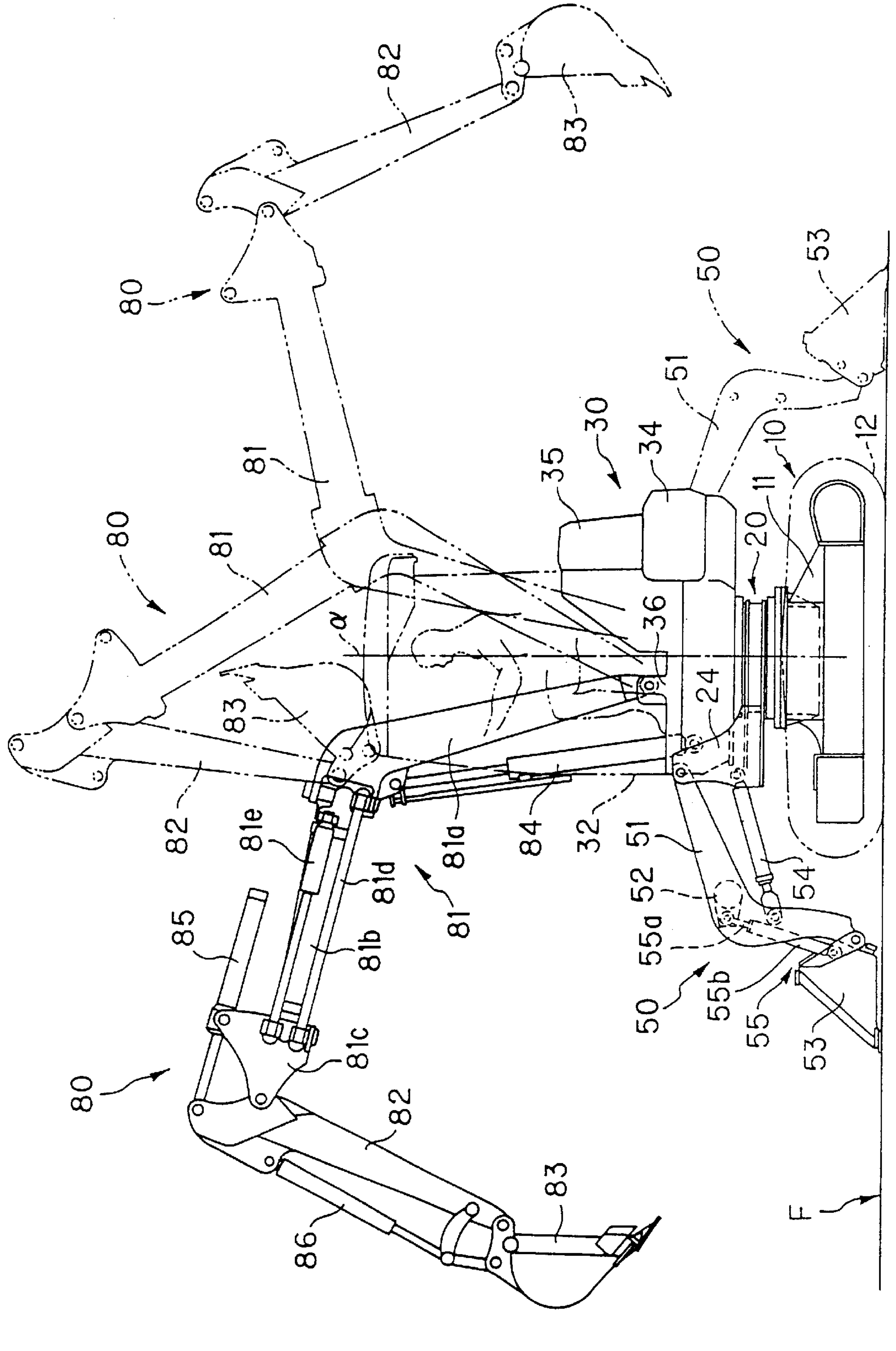
FIG. 1 is a side view giving a conceptual diagram of a first embodiment of a work machine relating to the present invention.

FIG. 1 shows a conceptual view of a first embodiment of a work machine relating to the present invention. The work machine illustrated here is employed principally for carrying out civil engineering operations, such as digging, loading and removing soil at a construction site, and it comprises a lower traveling unit (traveling base) 10, a central swiveling unit (first swiveling base) 20 and an upper swiveling unit (second swiveling base) 30.

In the lower traveling unit 10, a pair of left- and right-hand crawlers 12 are provided on either side of a truck frame 11, a pair of hydraulic traction motors (not illustrated) for driving these crawlers 12 independently are provided inside the truck frame 11, and the lower traveling unit 10 can be caused to move via the respective crawlers 12 by driving the respective hydraulic traction motors (not illustrated). For the sake of convenience, in the following description, a state where the lower traveling unit 10 is positioned on a horizontal floor surface via the pair of crawlers 12 is taken as a reference state.

Figure 10:
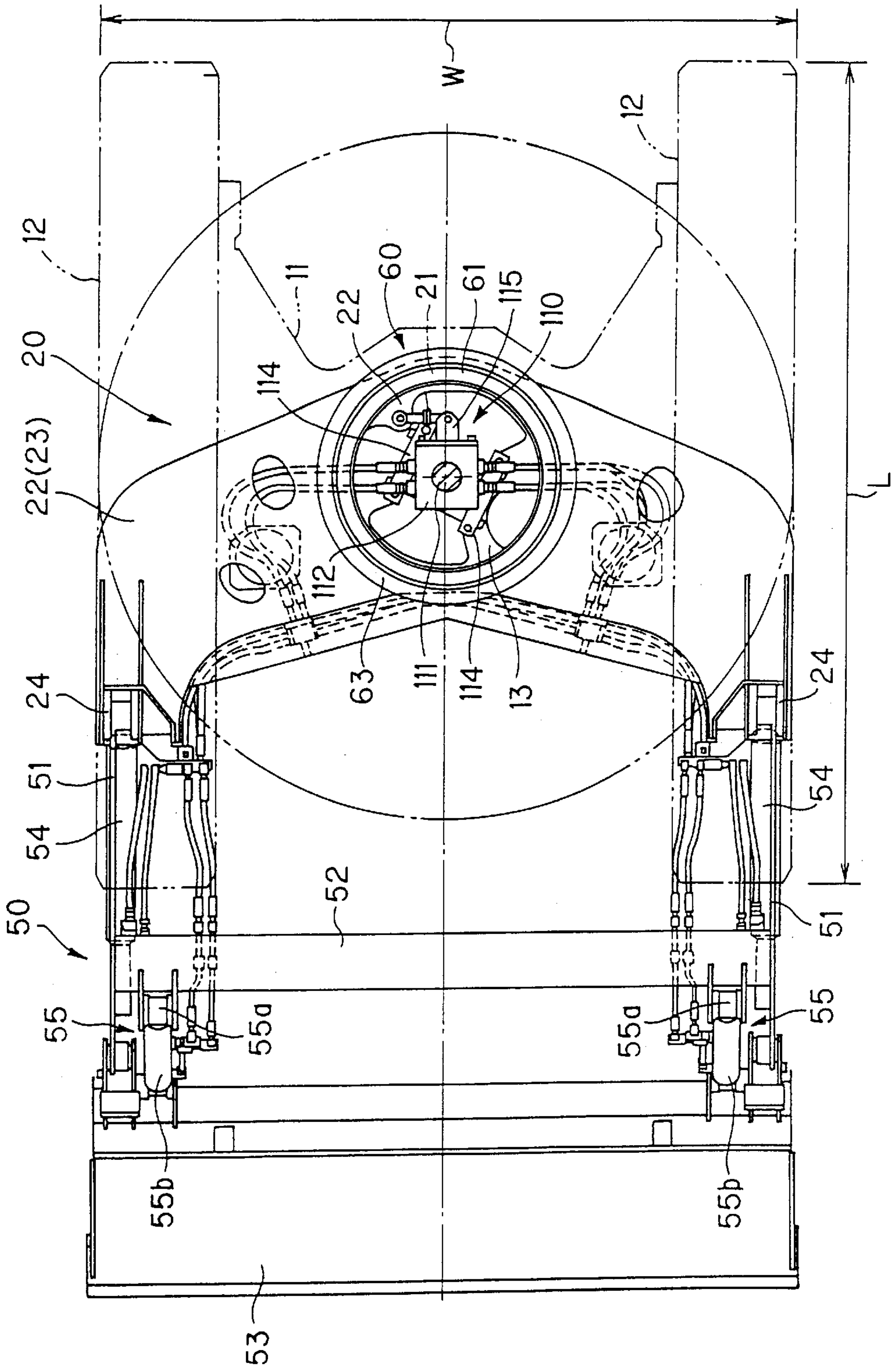
FIG. 10 is a plan diagram showing hydraulic piping relating to a first operating unit of the work machine illustrated in FIG. 1.
Figure 11:
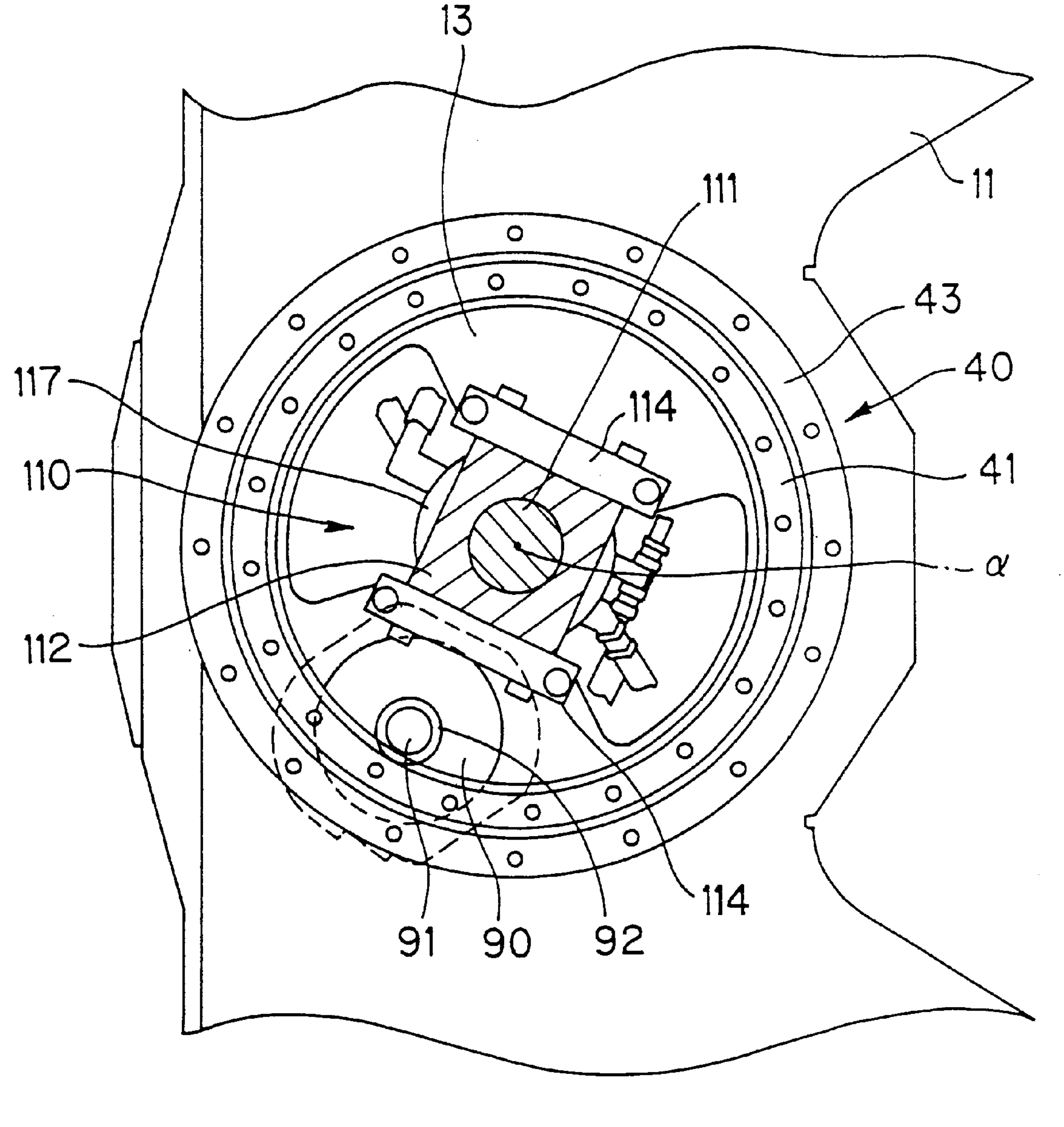
FIG. 11 is a sectional view along line XI—XI in FIG. 3.
Figure 12:
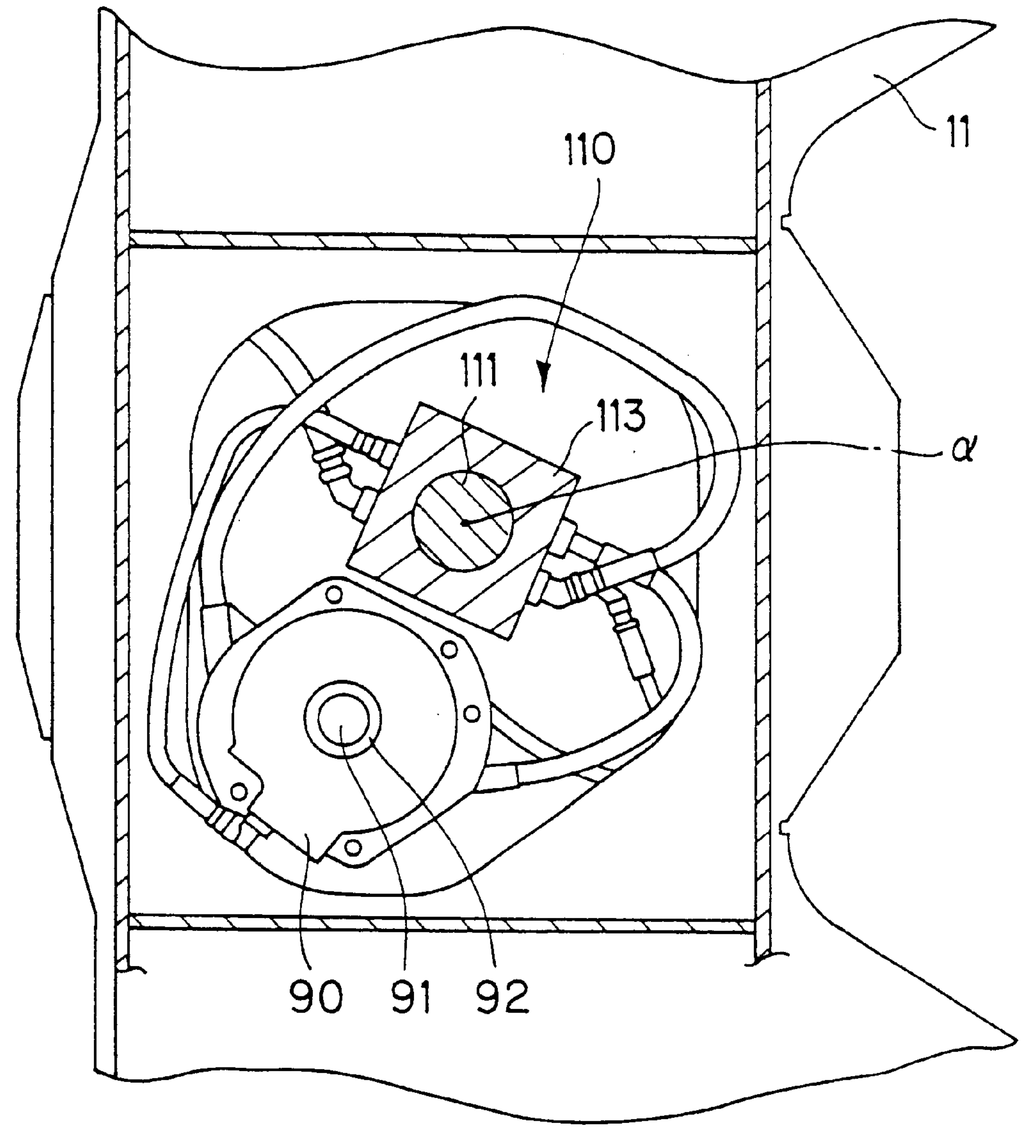
FIG. 12 is a sectional view along line XII—XII in FIG. 3.

As shown in FIG. 10, the aforementioned pair of crawlers 12 are installed on the truck frame 11 in such a manner that they are parallel with respect to each other, in plan view, and their length L in the longitudinal direction is greater than the width W between their respective outer edges.

Figure 2:
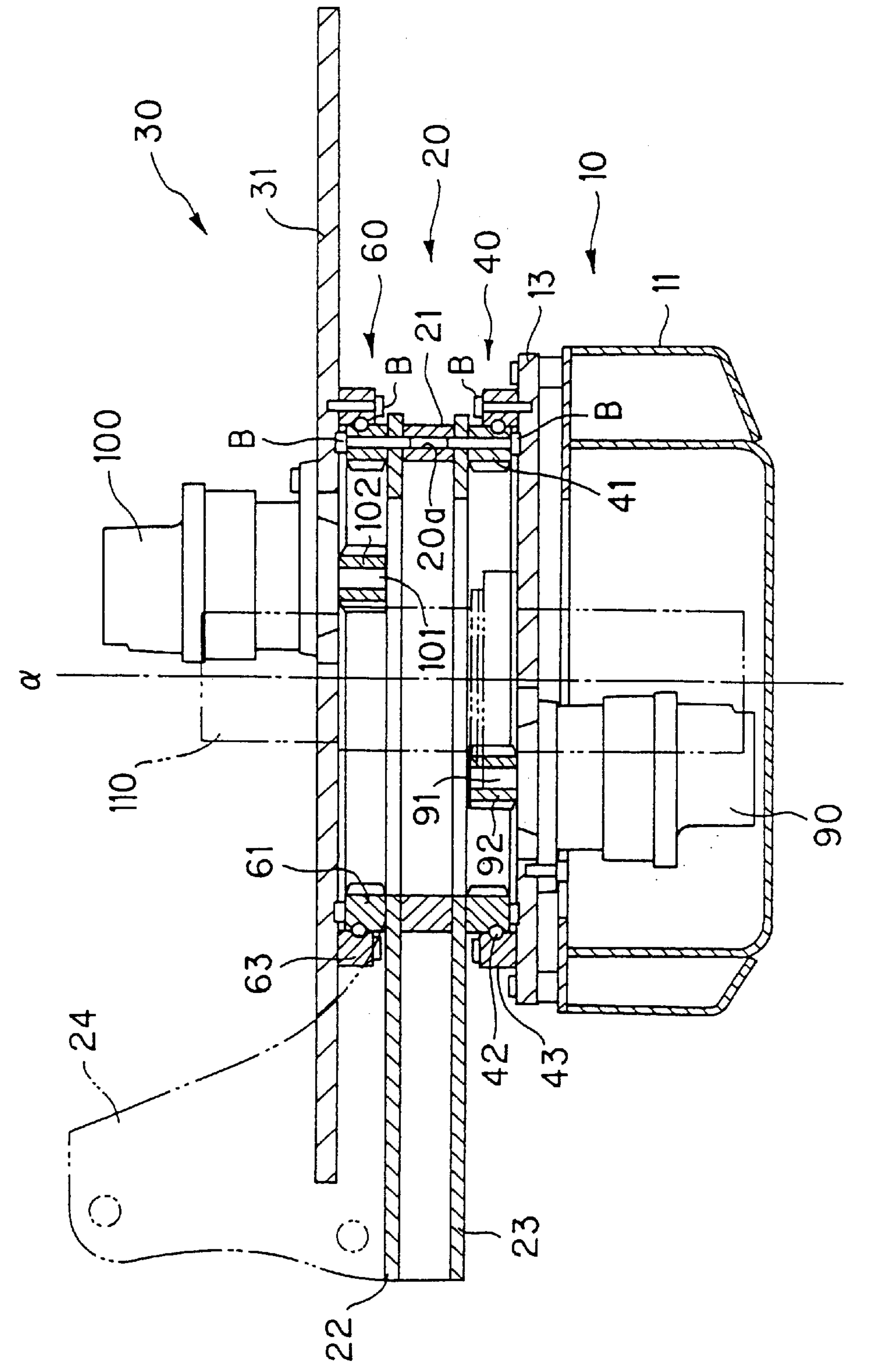
FIG. 2 is a sectional side view giving a conceptual diagram of a swivel mechanism of the work machine illustrated in FIG. 1.
Figure 3:
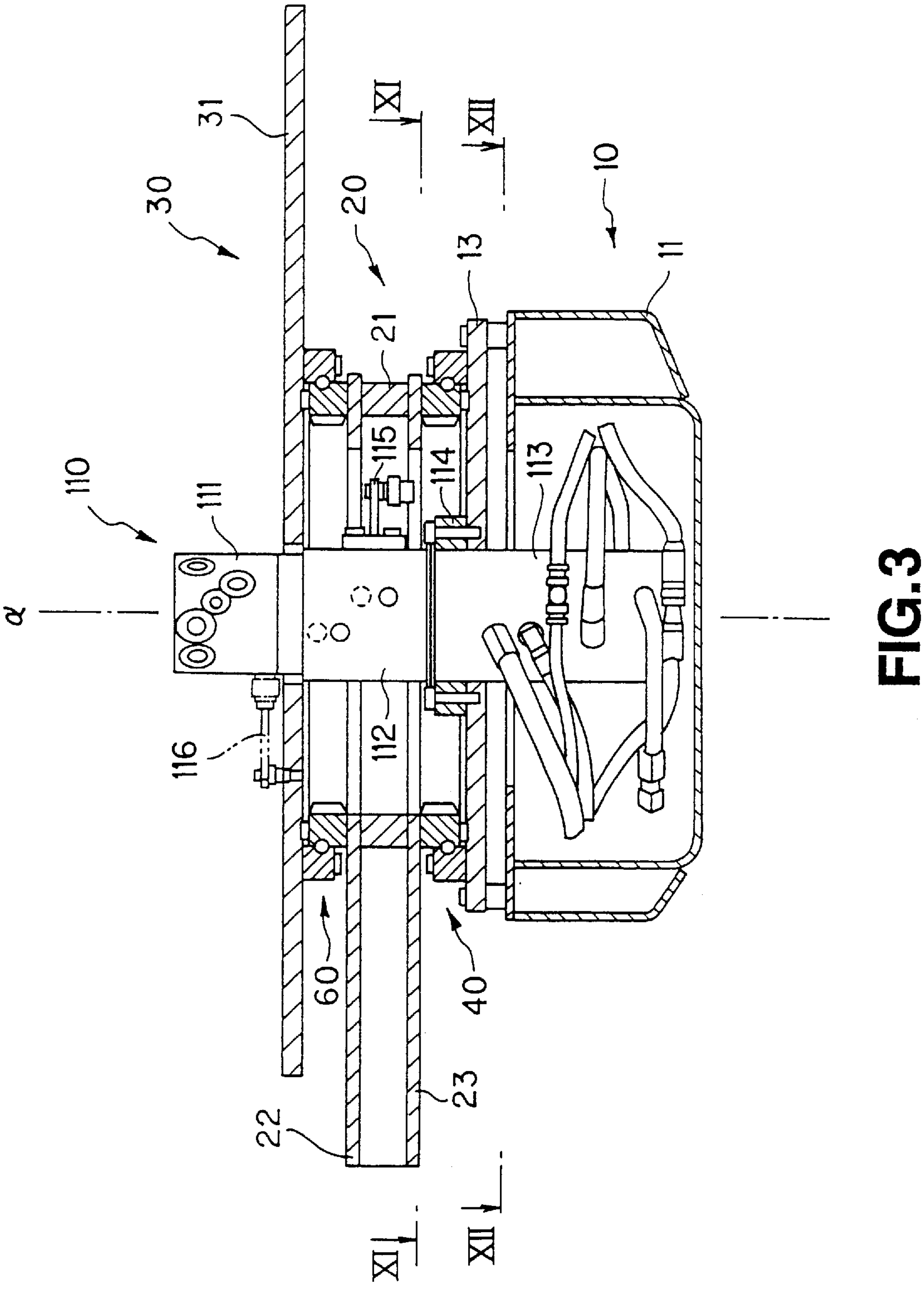
FIG. 3 is a sectional side view giving a conceptual diagram of a swivel mechanism of the work machine illustrated in FIG. 1.
Figure 4:
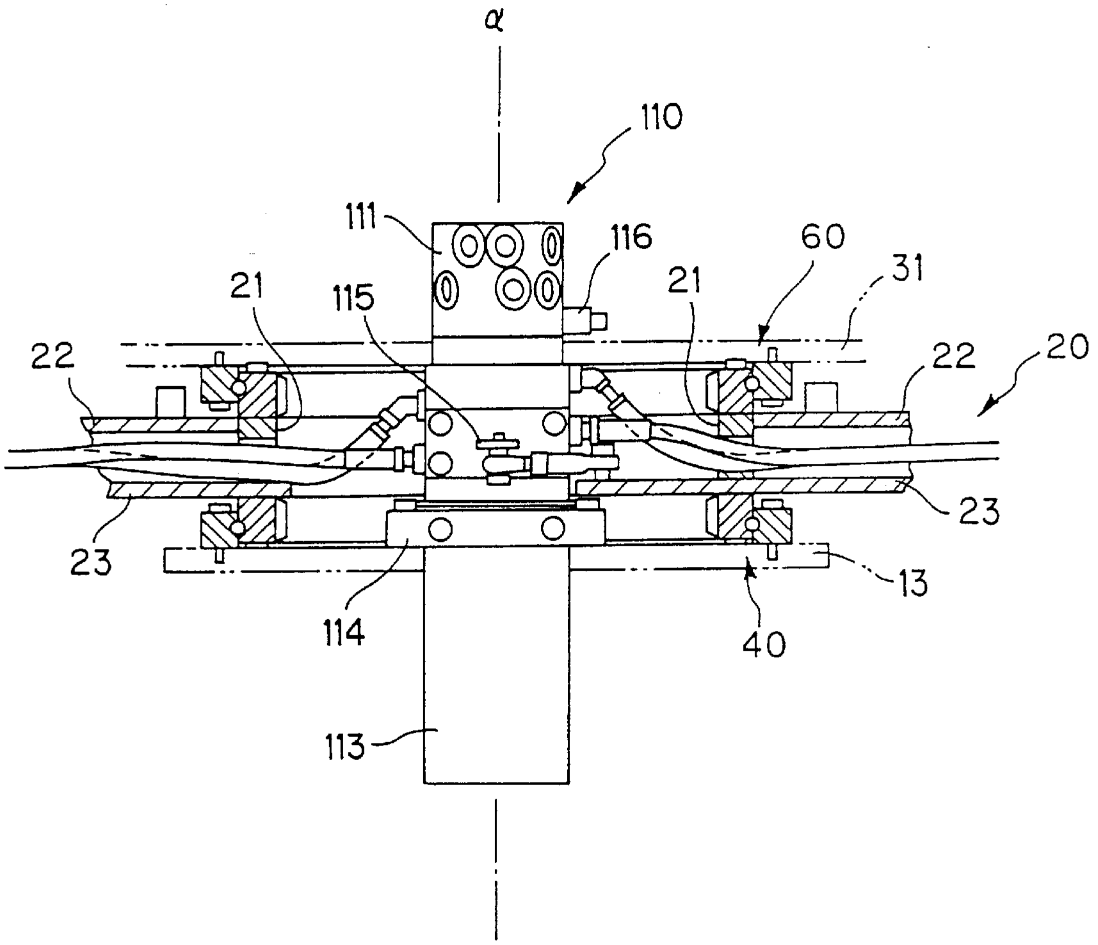
FIG. 4 is a sectional side view giving a conceptual diagram of a swivel mechanism of the work machine illustrated in FIG. 1.
Figure 5:
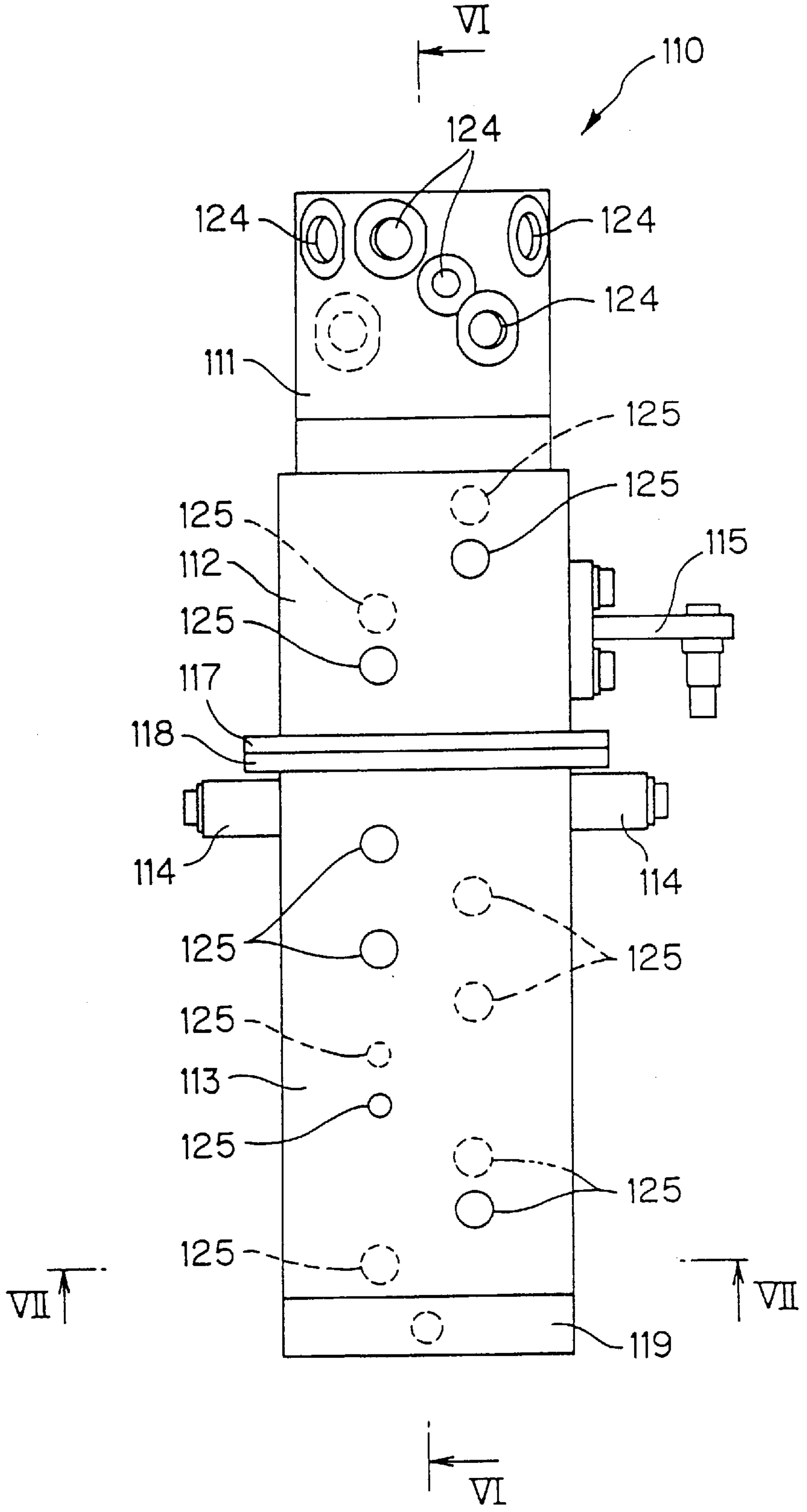
FIG. 5 is a side view giving a conceptual diagram of a two-stage swivel joint employed in the work machine illustrated in FIG. 1.

Moreover, as illustrated by FIG. 2 to FIG. 4, the central upper portion of the truck frame 11 has a flat composition and a flat fixed plate 13 is held extending in a horizontal direction in the region above the truck frame 11.

Incidentally, wheels may be used in place of the aforementioned crawlers 12 as means for causing the lower traveling unit 10 to move.

The central swiveling unit 20 comprises a ring frame section 21 having a cylindrical shape and a pair of supporting frame sections 22, 23 attached to the upper and lower end faces of this ring frame section 21 and extending in a horizontal direction, the central swiveling unit 20 being installed on the upper portion of the aforementioned lower traveling unit 10 in a state where a lower-stage swiveling circle 40 is positioned between the lower supporting frame section 23 and the fixed plate 13 on the lower traveling unit 10.

The lower-stage swiveling circle 40 comprises a ring-shaped lower-stage major swiveling gearwheel (first major swiveling gearwheel) 41 provided with teeth along the full length of the inner circumference thereof, and a ring-shaped lower-stage supporting ring 43 which fits movably to the outer circumference of the lower-stage major swiveling gearwheel 41. The lower-stage supporting ring 43 is fixed onto the upper face of the fixed plate 13, whilst the lower-stage major swiveling gearwheel 41 is installed independently on the lower face of the lower supporting frame section 23, whereby the central swiveling unit 20 performs the action of supporting the lower traveling unit 10, in a mode wherein the central swiveling unit 20 and the lower traveling unit 10 are able to swivel through 360° with respect to each other.

As illustrated in FIG. 10, the pair of upper and lower supporting frames 22, 23 constituting the central swiveling unit 20 form an approximate U shape in plan view, wherein the portions thereof located adjacently to the ring frame section 21 extend in outward radial directions and the respective end portions thereof are curved in such a manner that they lie mutually parallel in the same direction. A loading operating unit (first operating unit) 50 is supported by means of supporting brackets 24 attached to the respective ends of the upper and lower supporting frames 22, 23.

The loading operating unit 50 performs so-called loading operations, such as loading and removing soil, of the like, and as illustrated in FIG. 1 and FIG. 10, it is constituted by a pair of lift arms 51 which are approximately L-shaped, the front end portions thereof curving in a downward direction when the base end portions thereof are positioned horizontally and the lift arms 51 being connected axially via the aforementioned base end portions to the upper end portions of the respective supporting brackets 24, in an upwardly and downwardly movable manner, a connecting pipe 52 for connecting this pair of lift arms 52 in a mutually parallel state, in a position slightly towards the base end portions from the curved portions of the lift arms 51, and a loading bucket 53 connected between the respective front end portions of the aforementioned pair of lift arms 51, swingably about a horizontal axis connecting the aforementioned front end portions. Moreover, lift cylinder actuators 54 are positioned respectively between the lower end portions of the respective supporting brackets 24 and positions on the respective lift arms 51 slightly towards the front end portions from the curved portions thereof, whilst dump cylinder actuators 55 are positioned respectively between the two end portions of the loading bucket 53 and the connecting pipe 52, in positions to the inside of the respective lift arms 51.

As the diagrams illustrate, the pair of dump cylinder actuators 55 extend along the front end portions of the respective lift arms 51, the respective piston rods **55*a* thereof being attached axially to the connecting pipe 52 and the cylinder tubes 55*b* thereof being attached axially to the loading bucket 53**.

In the loading operating unit 50, the lift arms 51 can be caused to move upwards and downwards about a horizontal axis with respect to the central swiveling unit 20, by driving the lift cylinder actuators 54, and moreover, the loading bucket 53 can be made to swing about an axis parallel to the aforementioned horizontal axis with respect to the lift arms 51, by driving the dump cylinder actuators 55.

Furthermore, as illustrated in FIG. 10, the central swiveling unit 20 is composed in such a manner that, in a state where the loading bucket 53 is positioned to the front side of the lower traveling unit 10, the maximum width between the supporting frame sections 22, 23 extending laterally from the ring frame section 21 is virtually the same as the distance W between the outer edges of the pair of crawler treads 12, and moreover, the left and right-hand end portions of the loading bucket 53 project slightly beyond the outer edges of the respective crawler treads 12.

As shown in FIG. 2 and FIG. 3, the upper swiveling unit 30 comprises a base plate 31 extending in a horizontal direction, and it is installed on the upper portion of the aforementioned central swiveling unit 20 in a state where the upper-stage swivel circle 60 is positioned between the base plate 31 and the upper supporting frame section 22 of the central swiveling unit 20.

The upper-stage swiveling circle 60 comprises an upper-stage major swiveling gearwheel (second major swiveling gearwheel) 61 and an upper-stage supporting ring 63, which are respectively the same as the lower-stage major swiveling gearwheel 41 and the lower-stage supporting ring 43 in the lower-stage swiveling circle 40 described above, the upper-stage supporting ring 63 being fixed to the lower surface of the base plate 31 in a state where the axis thereof is aligned with the swiveling axis a of the lower-stage swiveling circle 40, whilst the upper-stage major swiveling gearwheel 61 is fixed to the upper face of the upper supporting frame 22, thereby providing an action whereby the aforementioned upper swiveling unit 30 is supported by the central swiveling unit 20 in a state where the upper swiveling unit 30 and the central swiveling unit 20 are able to rotate through 360° with respect to each other about the same swiveling axis a as the lower-stage swiveling circle 40.

Here, if the various constituent elements of the lower-stage swiveling circle 40 and the upper-stage swiveling circle 60 are provided independently in the lower traveling unit 10, central swiveling unit 20 and upper swiveling unit 30, respectively, then fastening means such as bolts, or the like, are generally used, and in the present work machine, a plurality of bolts B are used as means for attaching the respective constituent elements of the swiveling circles 40, 60. In this case, according to the work machine described above, since a similar lower-stage major swiveling gearwheel 41 and upper-stage major swiveling gearwheel 61 are attached respectively to both the upper and lower faces of the central swiveling unit 20, then if the screw holes 20*a* formed in the ring frame section 21 of the central swiveling unit 20 are formed in such a manner that they pass through from one face of the ring frame section 21 to the other face thereof, as illustrated in FIG. 2, these screw holes 20*a* can be used jointly for both major swiveling gearwheels 41, 61, which brings a merit in that the process of manufacturing the work machine can be simplified.

However, it is not necessary to employ similar members for the upper-stage swiveling circle 60 and the lower-stage swiveling circle 40, and a similar swiveling mechanism may be constituted even if members of mutually different diameters are used.

As shown in FIG. 1, a cabin 32, engine 33 (see FIG. 9) and balance weight 34 are provided above the base plate 31. The cabin 32 is formed in the shape of a box which allows an operator to be seated therein, and it is located in an offset position on one side of the aforementioned base plate 31. Although not illustrated in the diagrams, it is also provided internally with various operating levers and operating pedals, and a hydraulic control circuit 70 (see FIG. 9) comprising various operating valves which are controlled by means of the operating levers and operating pedals. The engine 33 is located inside an engine room 35 provided to the rear of the cabin 32 and serves to drive an oil pump 71 for the aforementioned hydraulic control circuit 70. The balance weight 34 is a weight for balancing the excavating operating unit, described hereinafter, and it is positioned further to the rear of the engine 33. This balance weight 34 is constituted in such a manner that although it is located in the furthest possible position from the swiveling axis a of the upper swiveling unit 30, the maximum turning circle thereof about the aforementioned swiveling axis a lies inside the outer edges of the pair of crawler treads 12 installed on the lower traveling unit 10.

Moreover, in the upper swiveling unit 30, an upper supporting bracket 36 is provided to the side of the cabin 32, in a position forward of the balance weight 34, and an excavating operating unit (second operating unit) 80 is supported by this upper supporting bracket 36.

The excavating operating unit 80 is used to perform so-called "back hoeing" work, for instance, excavating soil from a position lower than the ground surface F on which the lower traveling unit 10 is standing, or the like, and it comprises a boom 81, which is formed in an approximate L shape, wherein the front end portion thereof curves downwards when the base end portion thereof is positioned horizontally, the boom 81 being connected axially via the base end portion to the upper supporting bracket 36, in an upwardly and downwardly movable manner, an arm 82 connected axially to the front end portion of the boom 81 such that it is swingable about a horizontal axis, and an excavating bucket 83 connected axially to the front end portion of the arm 82 such that it is swingable about a horizontal axis, and moreover, it is constituted in such a manner that a boom cylinder actuator 84 is provided between the curved portion of the boom 81 and the upper supporting bracket 36, an arm cylinder actuator 85 is provided between the front end portion of the boom 81 and the base end portion of the arm 82, and a bucket cylinder actuator 86 is provided between the base end portion of the arm 82 and the excavating bucket 83.

In this excavating operating unit 80, by driving the boom cylinder actuator 84, the boom 81 can be moved upwards and downwards about a horizontal axis with respect to the upper swiveling unit 30, by driving the arm cylinder actuator 85, the arm 82 can be made to swing about an axis parallel to the aforementioned horizontal axis with respect to the boom 81, and moreover, by driving the bucket cylinder actuator 86, the excavating bucket 83 can be made to swing about an axis parallel to the aforementioned horizontal axis with respect to the arm 82.

Moreover, in the excavating operating unit 80, the aforementioned boom 81 is divided into three sections, namely, in order from the base end portion of the boom 81, a first boom section 81*a*, a second boom section 81*b* and a third boom section 81*c*, and by supporting a link rod 81*d* parallel to the second boom section 81*b* between the first boom section 81*a* and the third boom section 81*c*, a parallel link is formed between the first boom section 81*a* and the third boom section 81*c* by means of the second boom section 81*b* and the link rod 81*d*. Furthermore, an offset cylinder actuator 81*e* is provided between the base end portion of the second boom section 81*b* and the third boom section 81*c*, and by driving this offset cylinder actuator 81*e*, the arm 82 and elements forward thereof can be offset to the right or left-hand side with respect to the first boom section 81*a*, without altering the orientation of the excavating bucket 83.

In the aforementioned excavating operating unit 80, the boom 81, arm 82 and excavating bucket 83 can each be positioned respectively within the maximum turning circle of the upper swiveling unit 30, by respectively extending the boom cylinder actuator 84, the arm cylinder actuator 85, and the bucket cylinder actuator 86.

Moreover, as illustrated in FIG. 2, in the work machine described above, a lower-stage hydraulic swiveling motor (first hydraulic swiveling motor) 90 is provided in the lower traveling unit 10, and an upper-stage hydraulic swiveling motor (second hydraulic swiveling motor) 100 is provided in the upper swiveling unit 30. This lower-stage hydraulic swiveling motor 90 and upper-stage hydraulic swiveling motor 100 have the same composition containing the same respective gear mechanisms (not illustrated), and therefore when the same quantity of hydraulic fluid is supplied thereto, they will drive their respective output shafts 91, 101 through the same number of revolutions.

In the lower-stage hydraulic swiveling motor 90, a lower-stage swiveling pinion (first swiveling pinion) 92 is fixed to the output shaft 91, the end of which is orientated in a vertical direction, and the lower-stage swiveling pinion 92 is held on the lower face of the fixed plate 13, in a state where it engages with the lower-stage major swiveling gearwheel 41 of the lower-stage swiveling circle 40, and hence the lower-stage hydraulic swiveling motor 90 performs the action of causing the lower traveling unit 10 and the central swiveling unit 20 to rotate through 360° relative to each other about the aforementioned swiveling axis a, when the motor is driven.

In the upper-stage hydraulic swiveling motor 100, an upper-stage swiveling pinion (second swiveling pinion) 102 similar to the lower-stage swiveling pinion 92 is fixed to the output shaft 101, the end of which is orientated in a vertical direction, and the upper-stage swiveling pinion 102 is held on the upper face of the base plate 31 in a state where it engages with the upper-stage major swiveling gearwheel 61 of the upper-stage swiveling circle 60, and hence the upper-stage hydraulic swiveling motor 100 performs the action of causing the central swiveling unit 20 and the upper swiveling unit 30 to rotate through 360° relative to each other about the aforementioned swiveling axis a, when the motor is driven.

Here, either the positional arrangement of the lower-stage hydraulic swiveling motor 90 and the lower-stage major swiveling gearwheel 41 for causing the lower traveling unit 10 and the central swiveling unit 20 to rotate through 360° with respect to each other, or the positional arrangement of the upper-stage hydraulic swiveling motor 100 and the upper-stage major swiveling gearwheel 61 for causing the central swiveling unit 20 and the upper swiveling unit 30 to rotate through 360° with respect to each other may be reversed, in such a manner that, for example, the lower-stage hydraulic swiveling motor 90 supports the central swiveling unit 20, and the lower-stage major swiveling gearwheel 41 is fixed to the lower traveling unit 10, and moreover, it is also possible to reverse both of the aforementioned positional arrangements, in other words, to make the lower-stage hydraulic swiveling motor 90 support the central swiveling unit 20 and fix the lower-stage major swiveling gearwheel 41 to the lower traveling unit 10, whilst also making the upper-stage hydraulic swiveling motor 100 support the central swiveling unit 20 and fixing the upper-stage major swiveling gearwheel 61 to the upper swiveling unit 30.

However, if the positional arrangement in the work machine described above is adopted, then it is not necessary to position components of relatively large height, such as the hydraulic swiveling motors 90, 100, in the central swiveling unit 20, and hence the height dimension of the central swiveling unit 20 can be reduced to a minimum, thereby making it possible to restrict increase in the overall height of the work machine caused by the fact that two swiveling units 20, 30 are provided on top of the lower traveling unit 10.

Figure 9:
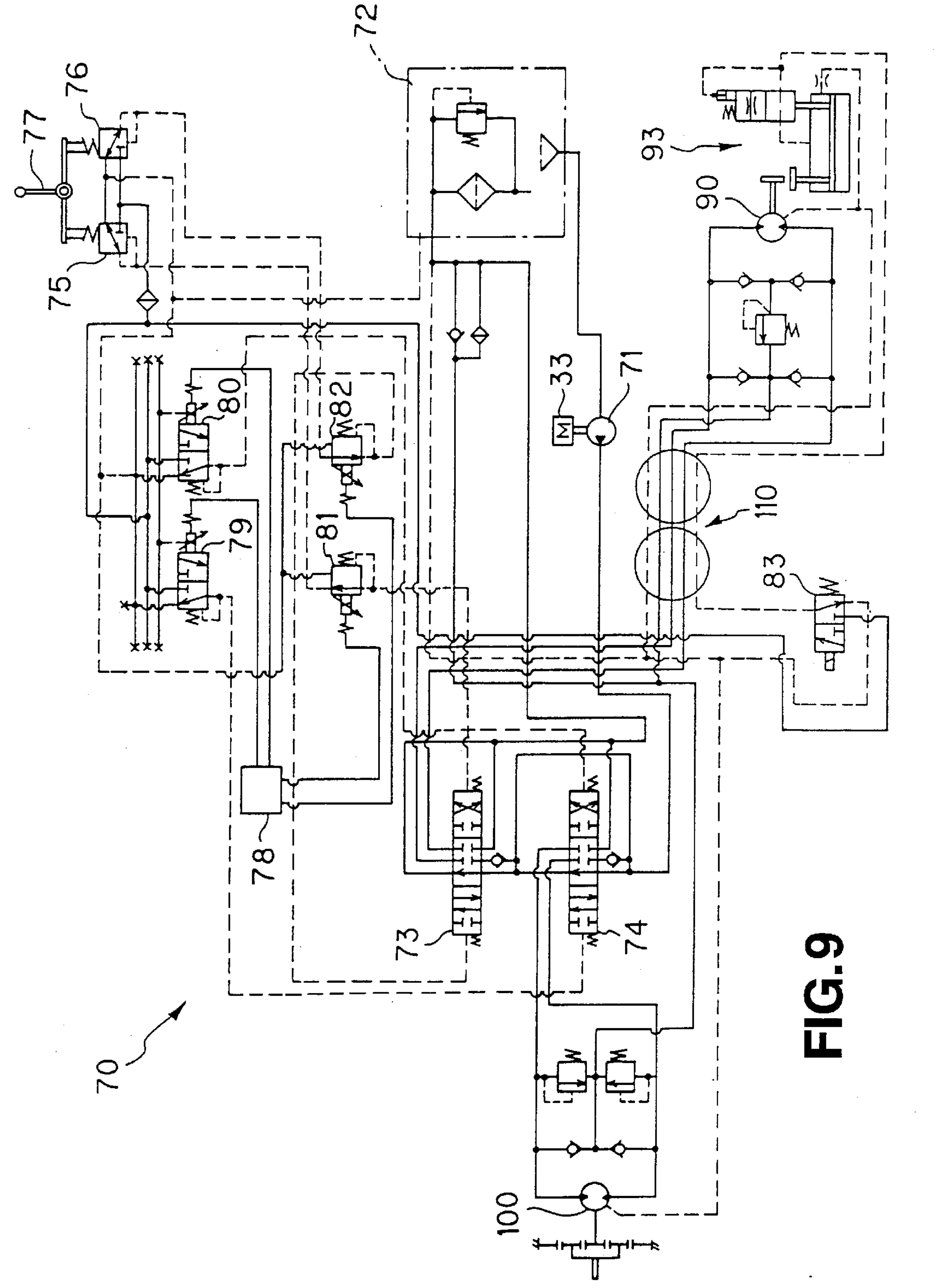
FIG. 9 is a circuit diagram showing the principal portion of a hydraulic supply system employed in the work machine illustrated in FIG. 1.

As shown in FIG. 9, the lower-stage hydraulic swiveling motor 90 is provided with a swivel park brake mechanism 93, and by operating this swivel park brake mechanism, any unwanted driving of the motor can be prevented.

As illustrated in FIG. 3, a two-stage swivel joint 110 is provided across the inner part of the lower traveling unit 10, central swiveling unit 20 and upper swiveling unit 30.

As shown in FIG. 3 to FIG. 8, the two-stage swivel joint 110 comprises a cylindrical shaft 111, the upper end portion of which is formed with an enlarged diameter, and an upper rotor 112 and lower rotor 113 which engage rotatably with the aforementioned shaft 111 via respective center holes 112*a,* 113*a,* the upper end face of the aforementioned lower rotor 113 being located in virtually a central position in the axial direction thereof, and the two-stage swivel joint 110 is fixed to the fixed plate 13 in the lower traveling unit 10 by means of a fixing bracket 114 installed on the outer circumference of the upper end of the lower rotor 113, in a state where the central axis of the shaft 111 is aligned with the swiveling axis a of the upper and lower swiveling circles 40, 60. Moreover, a central coupling bracket 115 fixed to the upper rotor 112 is coupled to the lower supporting frame section 23 of the central swiveling unit 20, whilst an upper coupling bracket 116 attached to the upper end portion of the shaft 111 is coupled to the base plate 31 of the upper swiveling unit 30.

In the two-stage swivel joint 110 having the positional arrangement described above, in a state where the central swiveling unit 20 swivels with respect to the lower traveling unit 10 and, moreover, the upper swiveling unit 30 swivels with respect to the central swiveling unit 20, the lower rotor 113 halts together with the lower traveling unit 10, whilst the shaft 111 rotates in conjunction with the rotation of the upper swiveling unit 30 and the upper rotor 112 rotates in conjunction with the rotation of the central swiveling unit 20.

Numerals 117, 118 in the diagrams denote lubricating bushes provided respectively on the lower end face of the upper rotor 112 and the upper end face of the lower rotor 113, which slide against each other, and numeral 119 denotes a lower end cap for sealing the lower end opening of the lower rotor 113.

Figure 6:
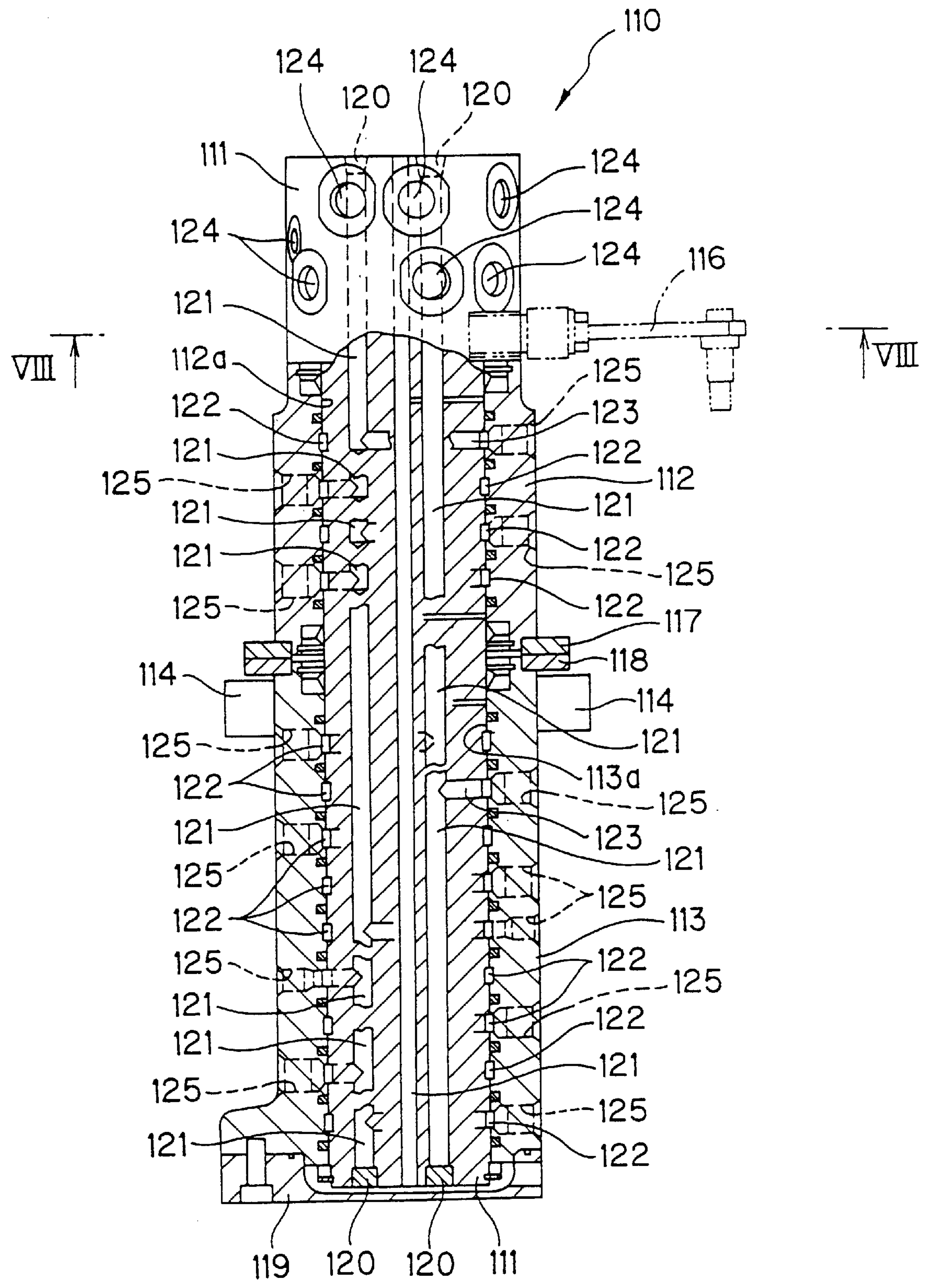
FIG. 6 is a sectional view along line VI—VI in FIG. 5.
Figure 7:
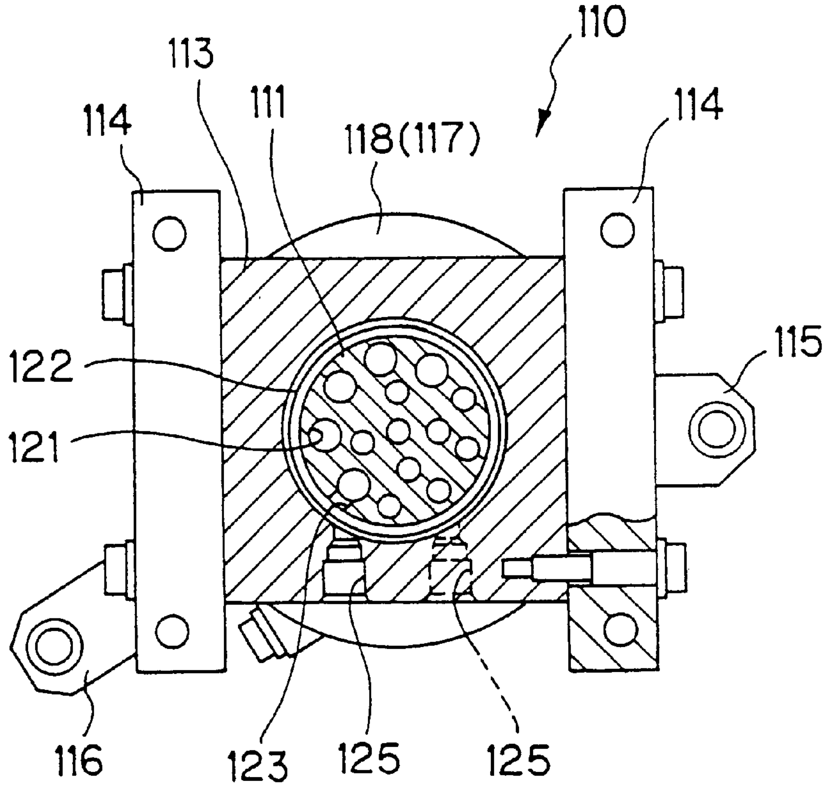
FIG. 7 is a sectional view along line VII—VII in FIG. 5.
Figure 8:
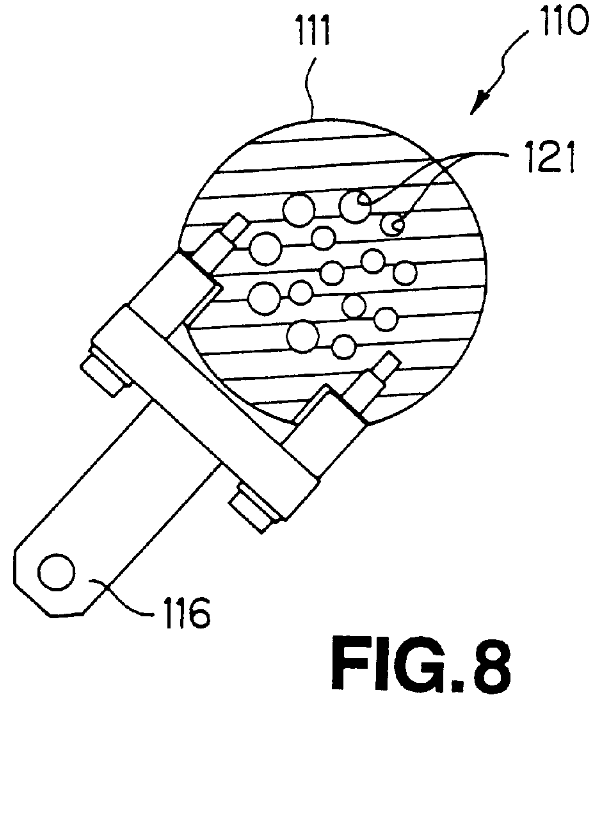
FIG. 8 is a sectional view along line VIII—VIII in FIG. 6.

As FIG. 6 to FIG. 8 reveal, in the aforementioned two-stage swivel joint 110, a plurality of oil main passages 121, both ends of which are respectively sealed by stopping plugs 120 are formed inside the aforementioned shaft 111 extending mutually in parallel in the axial direction thereof, and moreover, a plurality of mutually independent ring-shaped oil ring passages 122 are formed between the outer circumference of the shaft 111 and the respective inner circumferences of the upper rotor 112 and the lower rotor 113, the oil main passages 121 and the oil ring passages 133 being selectively connectable by means of coupling passages 123 extending in the radial direction of the shaft 111. Moreover, individual oil supply passages 124 extending respectively in radial directions from each of the oil main passages 121 are opened in the outer circumference of the upper end portion of the shaft 111, and furthermore, individual pipe joint passages 125 extending respectively in radial directions from each of the oil ring passages 122 are opened in the outer circumference of the upper rotor 112 and the lower rotor 113.

According to the two-stage swivel joint 110 having the foregoing composition, regardless of the relative rotational positions of the shaft 111 and the upper and lower rotors 112, 113, it is possible to ensure at all times a plurality of oil flow channels from the openings of each oil supply passage 124, via the oil main passages 121, coupling passages 123 and oil ring passages 122, in succession, to the openings of the pipe joint passages 125, and hence hydraulic fluid is able to pass between the respective hydraulic circuits of the upper swiveling unit 30, central swiveling unit 20 and lower traveling unit 10, which swivel through 360° with respect to each other, by means of these oil flow channels.

Specifically, it is possible to cause a desired quantity of hydraulic oil to flow from the oil pump 71, which is driven by the engine 33 in the upper swiveling unit 30, via the hydraulic control circuit 70, to the various cylinder actuators 54, 55 of the loading operating unit 50, and furthermore, it is also possible to cause a desired quantity of hydraulic oil to flow respectively from the aforementioned oil pump 71, via the hydraulic control circuit 70, to the hydraulic traction motor (not illustrated) which drives the crawler treads 12, and to the lower-stage hydraulic swiveling motor 90. Since no relative rotation occurs between the oil pump 71 and the hydraulic control circuit 70, hydraulic oil can be made to flow directly from the oil pump 71 to the upper-stage hydraulic swiveling motor 100 and the excavating operating unit 80 provided on the upper swiveling unit 30 via the hydraulic control circuit 70, without passing along the oil flow channels in the two-stage swivel joint 110.

Here, the two-stage swivel joint 110 employed for causing hydraulic oil to flow between the respective hydraulic circuits of the upper swiveling unit 30, central swiveling unit 20 and lower traveling unit 10, which swivel through 360° with respect to each other, is not limited to a swivel joint wherein a pair of rotors 112, 113 engage with the lower end portion of the shaft 111. For example, if a joint is adopted wherein the rotors engage respectively with both the upper and lower end portions of a shaft having a central portion with an enlarged diameter, or wherein a pair of rotors engage with the upper end portion of a shaft having a lower end portion with an enlarged diameter, similar beneficial effects can be expected to those provided by the two-stage swivel joint 110.

Moreover, the mode for fixing the two stage swivel joint 110 is not limited to a mode for fixing by means of the lower rotor 113, but rather the two-stage swivel joint 110 may also be fixed by means of the upper rotor 112. In this case, the two-stage swivel joint 110 is not limited to being fixed to the lower traveling unit 10, but it may also be fixed to the central swiveling unit 20. However, in either of these cases, desirably, the joint is fixed by means of the central portion thereof in the axial direction, similarly to the two-stage swivel joint described above, in which case shifting in the central as of the shaft 111 during swiveling of the upper swiveling unit 30 and central swiveling unit 20 can be restricted efficiently, and hence any occurrence of problems in the hydraulic system, for example, leaking of the hydraulic oil, caused by shifting of the central axis of the shaft 111 can be prevented simply and reliably.

Figure 14:
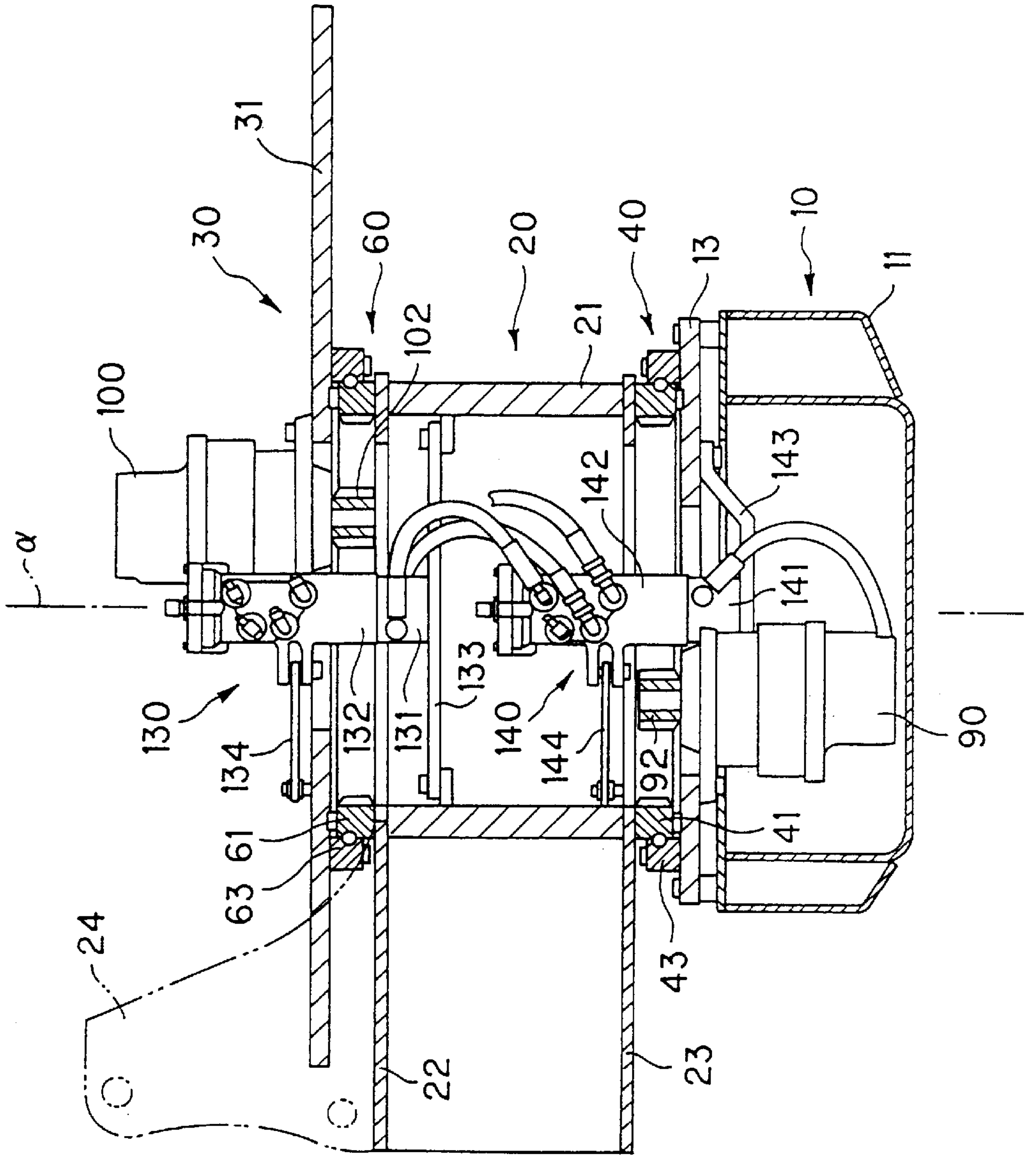
FIG. 14 is a sectional side view giving a conceptual diagram of a swivel mechanism in a case where two swivel joints are employed in the work machine illustrated in FIG. 1.

Moreover, as illustrated in FIG. 14, is it also possible to employ two swivel joints of a conventional type as a composition for causing hydraulic oil to flow between the upper swiveling unit 30, central swiveling unit 20 and lower traveling unit 10, which swivels through 360° with respect to each other.

In other words, in the work machine illustrated in FIG. 14, two swivel joints 130, 140 are prepared, which respectively comprise cylindrical shafts 131, 141 having a lower end portion with an enlarged diameter, and single rotors 132, 142 formed in an angular shape having a central hole (not illustrated) which engage rotatably with the upper end portions of the aforementioned shafts 131, 141 by means of the aforementioned center holes (not illustrated), and the swivel joints 130, 140 are provided respectively between the lower traveling unit 10 and central swiveling unit 20, and between the central swiveling unit 20 and upper swiveling unit 30, in a state where the central axes of the shafts 131, 141 are aligned with the swiveling axis a of the upper and lower swiveling circles 40, 60.

In this case, in the lower-stage swivel joint (first swivel joint) 140, the lower end face of the shaft 141 is fixed to the lower traveling unit 10 by means of a fixing bracket 143, whilst a coupling bracket 144 provided on the rotor 142 is coupled to the lower supporting frame section 23. Moreover, in the upper-stage swivel joint (second swivel joint) 130, the lower end face of the shaft 131 is fixed to the ring frame section 21 by means of a fixing bracket 133, whilst a coupling bracket 134 provided on the rotor 132 is coupled to the base plate 31.

Consequently, in the work machine illustrated in FIG. 14, in a state where the central swiveling unit 20 swivels with respect to the lower traveling unit 10, and the upper swiveling unit 30 swivels with respect to the central swiveling unit 20, the shaft 141 of the lower-stage swivel joint 140 stays at rest with the lower traveling unit 10, whilst the rotor 132 in the upper-stage swivel joint 130 is coupled to the upper swiveling unit 30, and the rotor 142 of the lower-stage swivel joint 140 and the shaft 131 of the upper-stage swivel joint 130 are coupled to the central swiveling unit 20, and in a state where the shaft 131 of the upper-stage swivel joint 130 and the rotor 142 of the lower-stage swivel joint 140 are mutually connected, if the hydraulic circuit of the upper swiveling unit 30 is connected to the rotor 132 of the upper-stage swivel joint 130, whilst the hydraulic circuit of the central swiveling unit 20 is connected to the shaft 131 of the upper-stage swivel joint 130 and the hydraulic circuit of the lower traveling unit 10 is connected to the shaft 141 of the lower-stage swivel joint 140, then hydraulic oil can be caused to flow between the respective hydraulic cuts of the upper swiveling unit 30, central swiveling unit 20 and lower traveling unit 10 swiveling through 360° with respect to each other, by means of the two swivel joints 130, 140.

However, as shown in FIG. 14, in a work machine wherein two swivel joints 130, 140 are provided, the total length of the two swivel joints 130, 140 is greater than the aforementioned two-stage swivel joint 110, and moreover, since it is necessary to ensure a sufficient gap between the swivel joints 130, 140, the height of the central swiveling unit 20 tends to rise. Therefore, when composing a work machine having a reduced overall height, desirably, a two-stage swivel joint 110 as described above is employed.

FIG. 3, FIG. 4, and FIG. 10 to FIG. 12 show conceptual views of embodiments of hydraulic piping leading from the respective hydraulic circuits of the aforementioned two-stage swivel joint 110 to the lower traveling unit 10 and central swiveling unit 20.

As these diagrams show, in the lower traveling unit 10, since both the hydraulic traction motor (not illustrated) and the lower-stage hydraulic swiveling motor 90, which are the elements to be supplied with hydraulic oil, are positioned inside the truck frame 11, the hydraulic piping to these elements is also located inside the truck frame 11.

In the central swiveling unit 20, on the other hand, the various cylinder actuators 54, 55 of the loading operating unit 50, which is the element to be supplied with hydraulic oil, are respectively located to the outside of the ring frame section 21 and the pair of upper and lower supporting frame sections 22, 23.

However, in the aforementioned work machine, the hydraulic piping up to the supporting bracket 24 which forms the supporting section of the loading operating unit 50 is provided within a central space enclosed by the ring frame section 21 and the pair of upper and lower supporting frame sections 22, 23. Therefore, according to the work machine described above, it is not necessary to provide any type of cover on the outside of the upper and lower supporting frame sections 22, 23 in order to protect the hydraulic piping leading from the two-stage swivel joint 110 to the loading operating unit 50 from receiving any damage, and hence the central swiveling unit 20 can be positioned adjacently to the lower traveling unit 10, whilst the upper swiveling unit 30 can be positioned adjacently to the central swiveling unit 20, thereby making it possible to restrict any increase in the overall height of the work machine.

FIG. 9 is a circuit diagram showing a hydraulic oil supply control system for both upper and lower hydraulic swiveling motors 90, 100, in a work machine comprising the two-stage swivel joint 110 described above, or upper and lower swivel joints 130, 140.

As this diagram shows, in the work machine described above, independent swivel operating valves 73, 74 are positioned respectively in the oil flow path leading from operating oil tank 72 provided in the upper swiveling unit

30, through the oil pump 71, which is driven by the engine 33, and back again to the operating oil tank 72, and the supply of hydraulic oil to the upper and lower hydraulic swiveling motors 90, 100 is controlled by driving these swivel operating valves 73, 74 appropriately.

Numerals 75 and 76 in FIG. 9 denote lower swivel operating valves which are controlled by operating lever 77, numeral 78 denotes a control unit for outputting switching signals to control valves 79, 80, 81, 82 in order to switch the aforementioned swivel operating valves 73, 74, and numeral 83 denotes a solenoid valve for driving the aforementioned swivel park brake mechanism 93.

According to a work machine having the foregoing composition, if, for example, the swivel operating valve 74 for the upper-stage hydraulic swiveling motor 100 is switched appropriately whilst the swivel operating valve 73 for the lower-stage hydraulic swiveling motor 90 is held in a constant state, then hydraulic oil will be supplied from the oil pump 71 to the upper-stage hydraulic swiveling motor 100, driving the aforementioned upper-stage hydraulic swiveling motor 100, and hence the upper swiveling unit 30 will be caused to swivel in a desired direction about the swiveling axis a with respect to the central swiveling unit 20.

In this case, since the central swiveling unit 20 is in a state of rest with respect to the lower traveling unit 10, consequently, only the upper swiveling unit 30 will swivel with respect to the lower traveling unit 10, and hence the excavating operating unit 80 supported on the upper swiveling unit 30 orientated in any desired direction and used to carry out excavating operations, regardless of the orientation of the lower traveling unit 10.

In this case, as described above, if the boom cylinder actuator 84, arm cylinder actuator 85 and bucket cylinder actuator 86 of the excavating operating unit 80 are respectively extended, then the boom 81, arm 82 and excavating bucket 83 will be located inside the maximum turning circle of the upper swiveling unit 30, and hence the aforementioned operation can also be carried out in restricted spaces, without having to move the lower traveling unit 10.

On the other hand, if the swivel operating valve 73 for the lower-stage hydraulic swiveling motor 90 is switched appropriately whilst the swivel operating valve 74 for the upper-stage hydraulic swiveling motor 100 is held in a constant state, then hydraulic oil will be supplied from the oil pump 71 to the lower-stage hydraulic swiveling motor 90, driving the aforementioned lower-stage hydraulic swiveling motor 90, and hence the central swiveling unit 20 will be caused to swivel in a desired direction about the swiveling axis a with respect to the lower traveling unit 10.

In this case, since the upper swiveling unit 30 is in a state of rest with respect to the central swiveling unit 20, consequently, the central swiveling unit 20 and the upper swiveling unit 30 will both swivel in the same direction with respect to the lower traveling unit 10, thereby enabling the loading operating unit 50 and the excavating operating unit 80 supported on the central swiveling unit 20 and the upper swiveling unit 30 to be orientated respectively in any desired directions and used to carry out loading operations and excavating operations, regardless of the orientation of the lower traveling unit 10.

Figure 13:
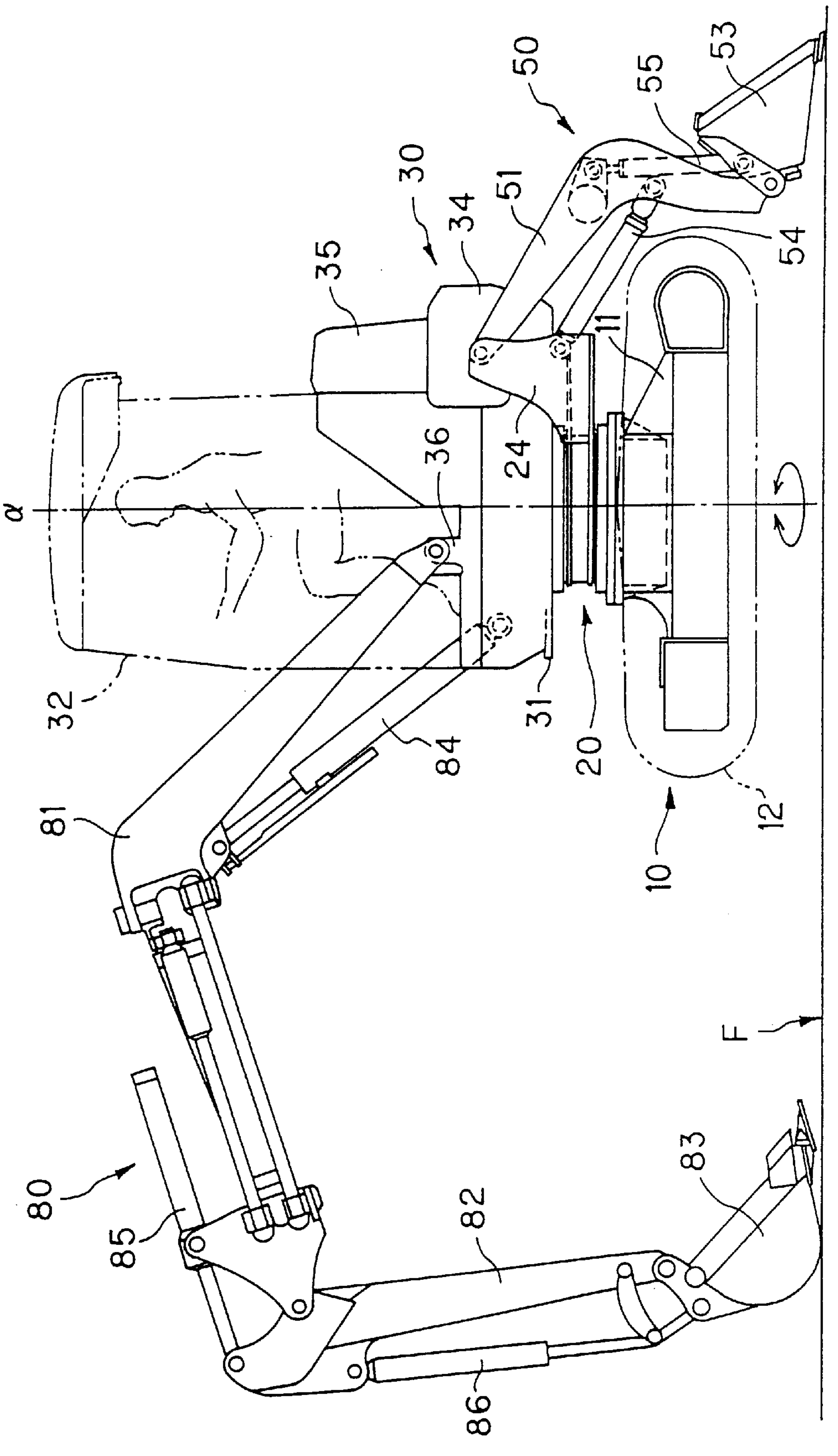
FIG. 13 is a side view showing one example of an operational mode of the work machine illustrated in FIG. 1.

In this case, if the upper swiveling unit 30 alone has previously been rotated and the loading operating unit 50 and excavating operating unit 80 are in a state where they can be used for coordinated operations, the orientation of both of these operating units with respect to the lower traveling unit 10 can be altered as desired, whilst maintaining a state where coordinated operations can be performed, and hence further increases in working efficiency can be achieved. Moreover, as shown in FIG. 13, if the operation described above is implemented in a state where both the excavating operating unit 80 and the loading operating unit 50 are pushed against the ground surface F and the crawlers 12 of the lower traveling unit 10 have been separated from the ground surface F, then it becomes possible for the lower traveling unit 10 to be caused to swivel about the swiveling axis a with respect to the upper swiveling unit 30 and central swiveling unit 20, thereby enabling the direction to be changed readily in restricted spaces, for example.

Moreover, if the swivel operating valve 73 for the lower-stage hydraulic swiveling motor 90 and the swivel operating valve 74 for the lower traveling unit 100 are respectively switched in mutually opposite directions, then the central swiveling unit 20 will swivel in one direction about the swiveling axis a with respect to the lower traveling unit 10, whilst the upper swiveling unit 30 will swivel in the other direction at the same angular speed about the swiveling axis a with respect to the central swiveling unit 20.

Consequently, the central swiveling unit 20 only swivels in the first direction with respect to the lower traveling unit 10, whilst the upper swiveling unit 30 does not swivel with respect to the upper swiveling unit 30, thereby enabling the loading operating unit 50 only to be orientated in a desired direction and used to carry out loading operations.

In this case, according to the aforementioned work machine, since a similar lower-stage swiveling circle 40 and upper-stage swiveling circle 60 are used, and moreover, a similar upper-stage hydraulic swiveling motor 100 and lower-stage hydraulic swiveling motor 90 comprising similar swiveling pinions 92, 102, are used, the aforementioned operation can be performed simply by switching the swivel operating valves 73, 74 in opposite directions, without requiring any complicated control circuitry.

However, even in cases where major swiveling gearwheels and swiveling pinions of mutually different diameters, and moreover, mutually different hydraulic swiveling motors, are employed, the operation described above, in other words, the operation of causing the central swiveling unit 20 only to rotate in one direction, without the upper swiveling unit 30 swiveling with respect to the lower traveling unit 10, can be achieved readily by controlling the quantity of hydraulic oil supplied to the respective hydraulic swiveling motors via the flow control valves, as appropriate, and thereby causing the two major swiveling gearwheels to rotate in opposite directions at the same angular speed.

Incidentally, in a work machine wherein operating units are supported respectively on the upper swiveling unit 30 and central swiveling unit 20 which swivel with respect to each other, there is a risk that the aforementioned loading operating unit 50 and excavating operating unit 80 may interfere with each other during the aforementioned operations, or while carrying out coordinated work.

However, according to the work machine described above, since the lift cylinder actuators 54 are positioned below the lift arms 51 and the dump cylinder actuators 55 are positioned to the inner side of the lift arms 51 along the front end portion of the lift arms 51, then supposing, for example, that the excavating bucket 83 of the excavating operating unit 80 collides with the loading operating unit 50, there will be no risk of any damage being caused to the cylinder actuators 54, 55 thereby, and hence the work in hand can be continued.

Moreover, in the work machine described above, since a composition is adopted whereby the cylinder tubes 55*b* of the dump cylinder actuators 55 are attached to the loading bucket 53, then if the soil loaded into the loading bucket 53 falls down the side of the dump cylinder actuators 55, this soil can be prevented from attaching itself to the piston rods 55*a* of the dump cylinder actuators. Accordingly, there is no risk of damage to the dump cylinder actuators 55 being caused by the abrasion of soil adhering to the piston rods 55*a*.

In this way, according to the work machine described above, since the central swiveling unit 20 supporting the loading operating unit 50 and the upper swiveling unit 30 supporting the excavating operating unit 80 can respectively be swivelled independently about a common swiveling axis a with respect to the lower traveling unit 10, and the aforementioned loading operating unit 50 and excavating operating unit 80 can be orientated in any desired direction, regardless of the orientation of the lower traveling unit 10, then it is possible to carry out coordinated tasks, whereby, for example, soil excavated in a desired direction by the excavating operating unit 80 is loaded directly by the loading operating unit 50, and this loaded soil is then removed to the container of a dump truck located in a desired direction, and hence notable increases in working efficiency can be achieved.

Moreover, in the first embodiment described above, a work machine is described wherein an excavating operating unit 80 is supported on the upper swiveling unit 30 and a loading operating unit 50 is supported on the central swiveling unit 20, but the present invention is not limited to this.

Figure 15:
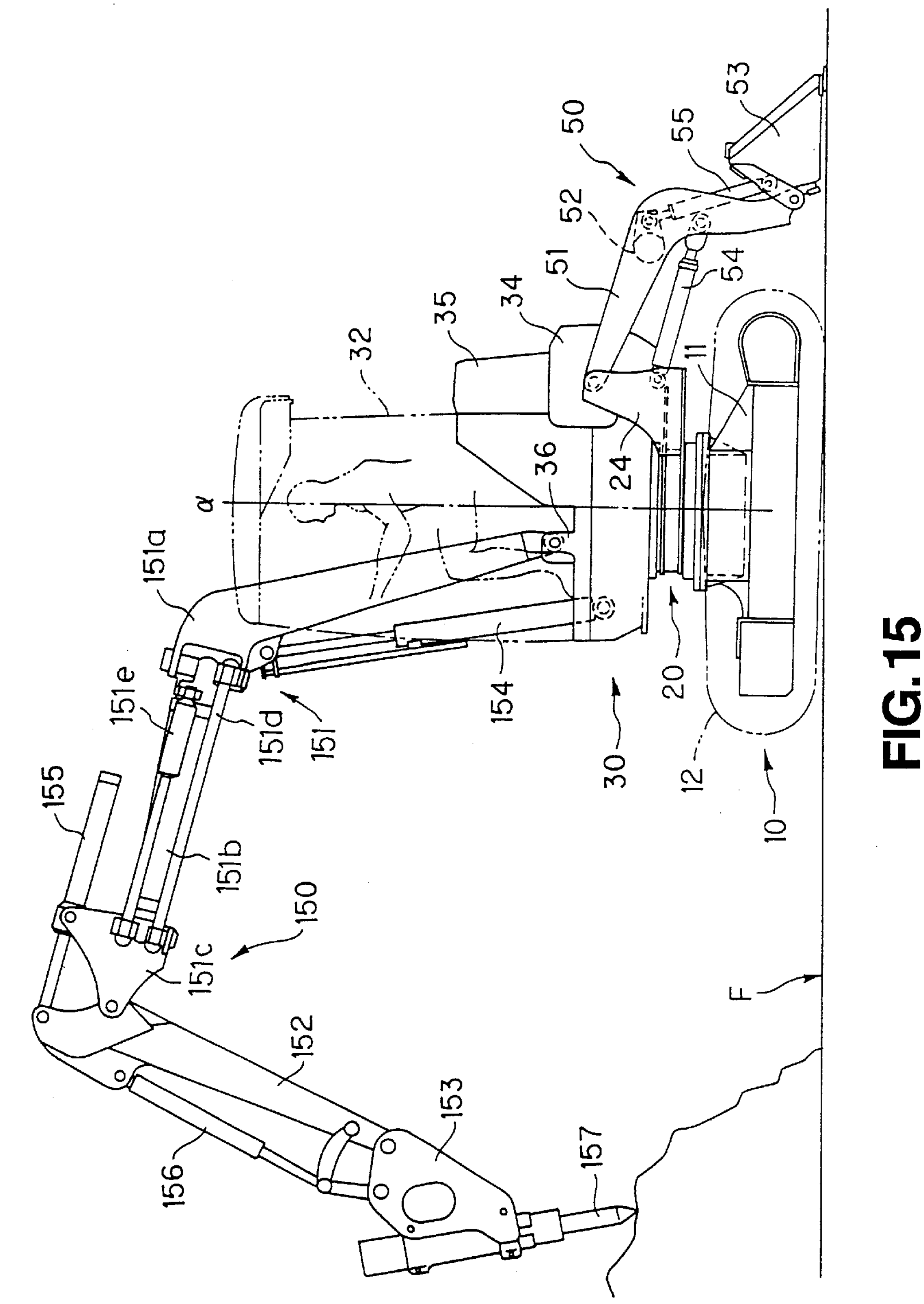
FIG. 15 is a side view showing a second embodiment of a work machine relating to the present invention.
Figure 16:
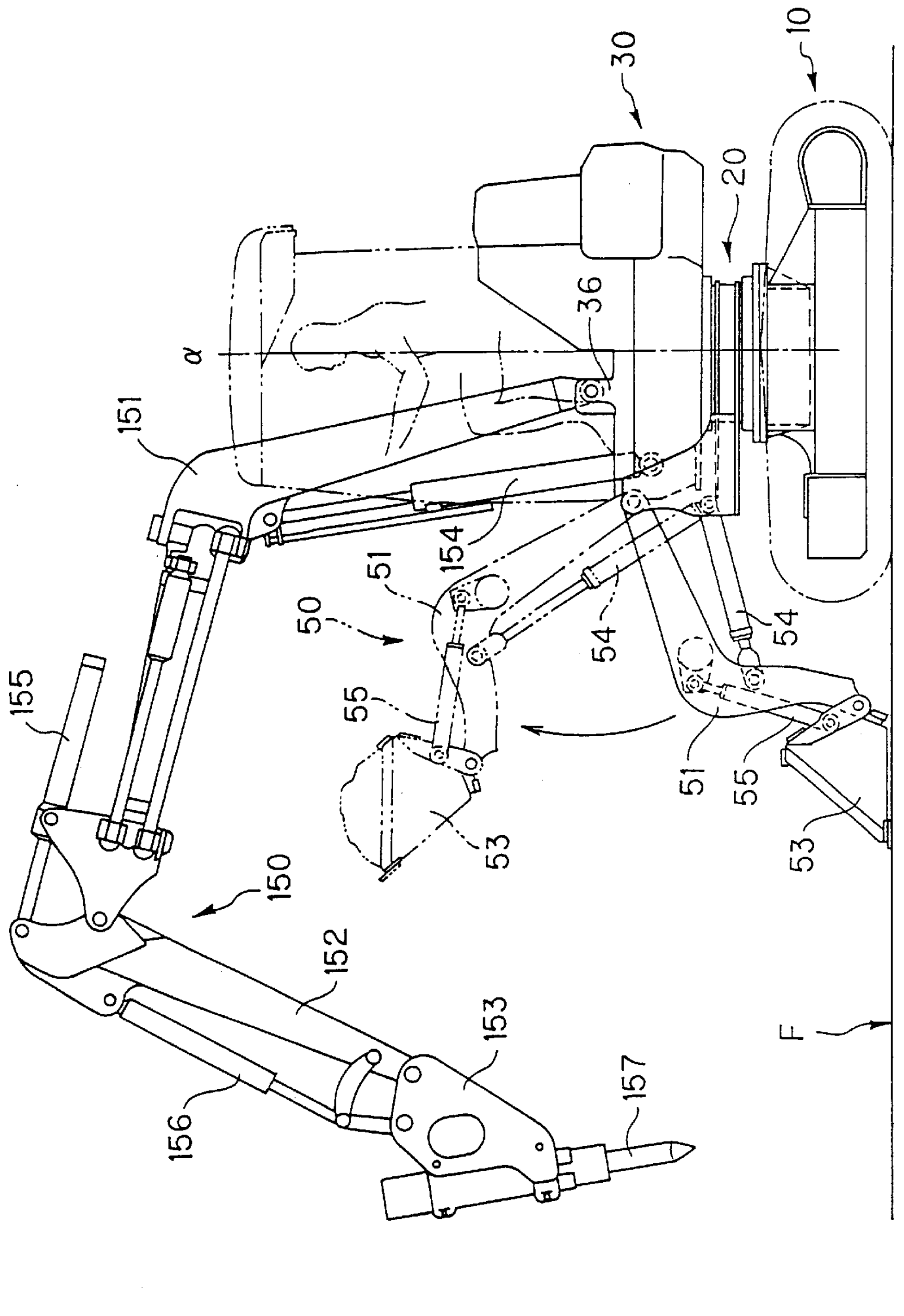
FIG. 16 is a side view showing an applicational mode of the work machine illustrated in FIG. 15.

For example, as illustrated by a second embodiment depicted in FIG. 15 and FIG. 16, it is also possible to constitute a work machine wherein a breaking tool (second operating unit) 150 is supported on the upper swiveling unit 30, in place of the excavating operating unit 80 in the work machine relating to the first embodiment.

In other words, similarly to the excavating operating unit 80 of the work machine described in the first embodiment, the work machine according to this second embodiment constitutes a breaking operating unit 150 by comprising a boom 151 having an approximate L shape, wherein the front end portion thereof curves downwards when the base end portion thereof is positioned horizontally, which is connected axially to an upper supporting bracket 36 via the aforementioned base end portion, in an upwardly and downwardly movable manner, an arm 152 connected axially to the front end portion of this boom 151 in a swingable manner about a horizontal axis, and a breaker 153 connected axially to the front end portion of this arm 152 in a swingable manner about a horizontal axis, a boom cylinder actuator 154 being positioned between the curved portion of the boom 151 and the upper supporting bracket 36, an arm cylinder actuator 155 being positioned between the front end portion of the boom 151 and the base end portion of the arm 152, and a breaker cylinder actuator 156 being positioned between the base end portion of the arm 152 and the breaker 153.

In this drilling operating unit 150, by driving the boom cylinder actuator 154, it is possible to cause the boom 151 to move upwards and downwards about a horizontal axis with respect to the upper swiveling unit 30, by driving the arm cylinder actuator 155, it is possible to cause the arm 152 to swing about an axis parallel to the aforementioned horizontal axis, with respect to the boom 151, and by driving the boom cylinder actuator 156, it is possible to cause the chisel 157 of the breaker 153 to swing about an axis parallel to the aforementioned horizontal axis, with respect to the arm 152.

Moreover, in this breaking operating unit 150, the aforementioned boom 151 is divided into three sections, namely, in order from the base end portion, a first boom section 151*a,* a second boom section 151*b* and a third boom section 151*c,* and furthermore, by supporting a link rod 151*d* parallel to the second boom section 151*b* between the first boom section 151*a* and the third boom section 151*c,* a parallel link is constituted between the first boom section 151*a* and the third boom section 151*c* by means of the second boom section 151*b* and the link rod 151*d.* Additionally, an offset cylinder actuator 151*e* is positioned between the base end portion of the second boom section 151*b* and the third boom section 151*c,* and by driving this offset cylinder actuator 151*e,* it is possible to offset the arm 152 and subsequent members to the left or right with respect to the first boom section 151*a,* without changing the orientation of the breaker 153.

Moreover, in the aforementioned breaking operating unit 150, if the boom cylinder actuator 154, arm cylinder actuator 155 and breaker cylinder actuator 156 are each extended, then the boom 151, arm 152 and breaker 153 can each respectively be positioned inside the maximum turning circle of the aforementioned upper swiveling unit 30, similarly to the work machine described in the first embodiment.

With the exception of this breaking operating unit 150, the composition relating to the lower traveling unit 10, central swiveling unit 20, upper swiveling unit 30, and the upper and lower swiveling circles 40, 60, and upper and lower hydraulic swiveling motors 90, 100, and moreover, the composition relating to the installation of hydraulic piping from the two-stage swivel joint 110 to the loading operating unit 50 inside the central swiveling unit 20, and the like, are the same as the corresponding compositions in the work machine according to the first embodiment, and hence similar labels have been used for these parts only and detailed descriptions thereof have been omitted here.

In the work machine according to the second embodiment having the foregoing composition, the central swiveling unit 20 supporting the loading operating unit 50 and the upper swiveling unit 30 supporting the breaking operating unit 150 can be caused to swivel respectively and independently about a common swiveling axis a with respect to the lower traveling unit 10, thereby enabling the loading operating unit 50 and the breaking operating unit 150 to be orientated in any desired direction, regardless of the orientation of the lower traveling unit 10, and therefore, when breaking up rock or concrete by means of the breaking operating unit 150, for example, as illustrated in FIG. 15, by locating the loading operating unit 50 in a position at 180° from the breaking operating unit 150 in order to use it as an outrigger, it is possible to prevent rising up of the lower traveling unit 10, whilst by rotating the central swiveling unit 20 only through 180°, as illustrated in FIG. 16, it is possible to carry out coordinated tasks whereby the rubble generated by the breaking operation is loaded directly by the loading operating unit 50 and this loaded rubble is then removed to the container of a dump truck positioned in any desired direction.

Figure 17:
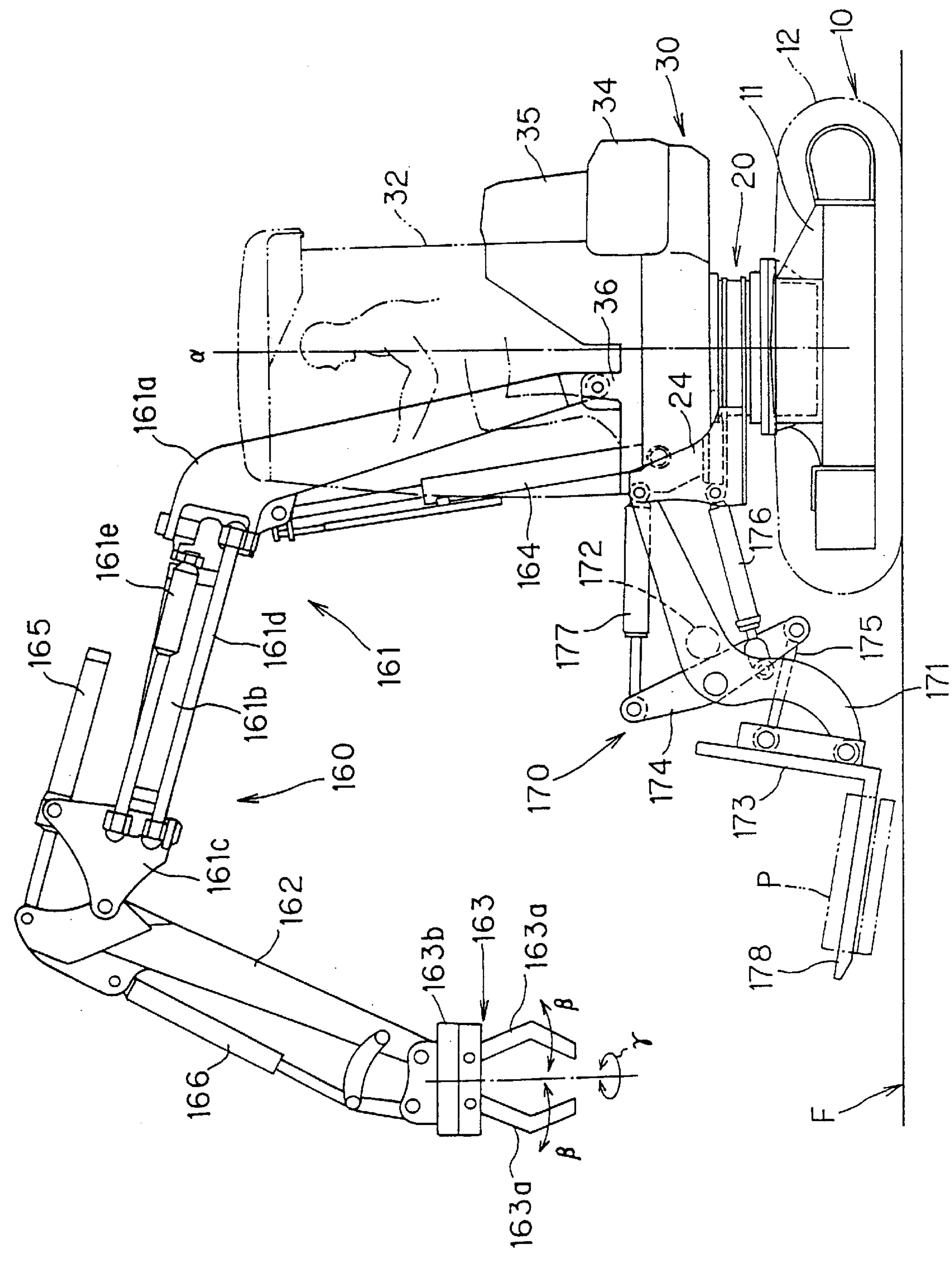
FIG. 17 is a side view showing a third embodiment of a work machine relating to the present invention.
Figure 18A:
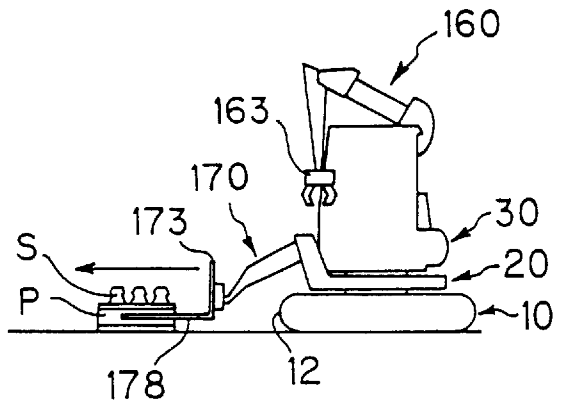
FIGS. 18(*a*)–(*d*) are side views showing applicational modes of the work machine illustrated in FIG. 17.
Figure 18B:
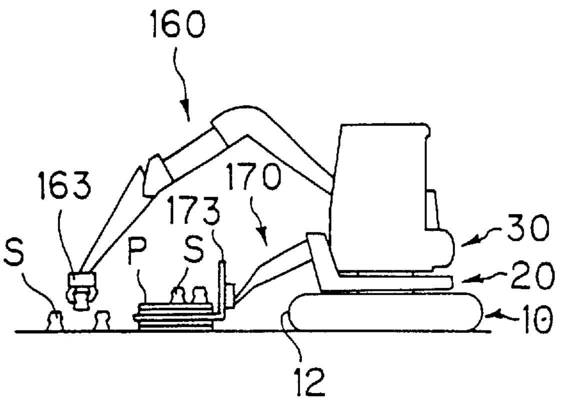
Figure 18C:
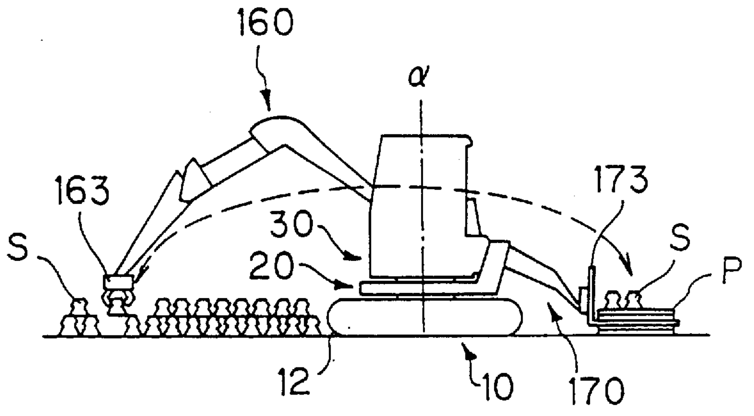
Figure 18D:
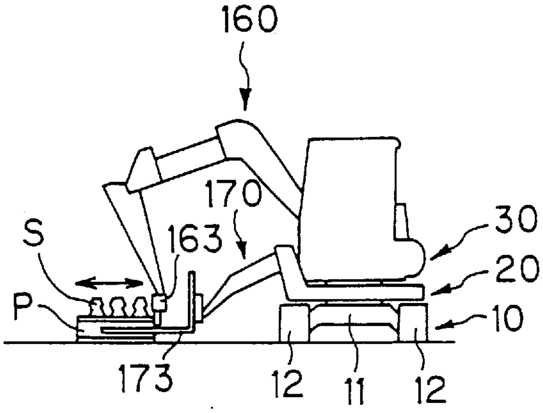
Figure 18E:
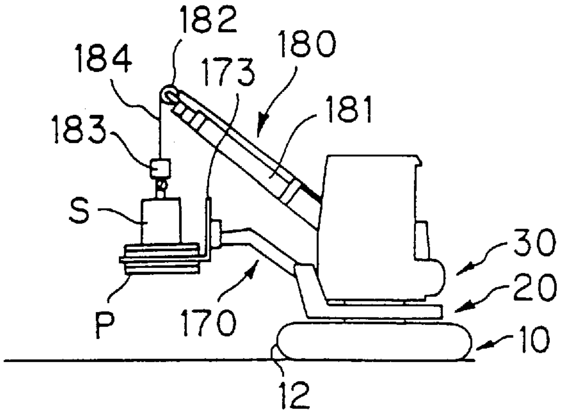

FIG. 17 shows an example of a work machine according to a third embodiment, wherein a grapple operating unit (second operating unit) 160 is supported on the upper swiveling unit 30 in place of the excavating operating unit 80 in the work machine described in the first embodiment, and a fork operating unit (first operating unit) 170 is supported on the central swiveling unit 20 in place of the loading operating unit 50.

In the work machine according to this third embodiment, a grapple operating unit 160 is constituted by comprising a boom 161 having an approximate L shape, wherein the front end portion thereof curves downwards when the base end portion thereof is positioned horizontally, which is connected axially to an upper supporting bracket 36 via the aforementioned base end portion, in an upwardly and downwardly movable fashion, an arm 162 connected axially to the front end portion of this boom 161 in a swingable manner about a horizontal axis, and a grapple hand 163 connected axially to the front end portion of the arm 162 in a swingable manner about a horizontal axis, a boom cylinder actuator 164 being positioned between the curved portion of the boom 161 and the upper supporting bracket 36, an arm cylinder actuator 165 being positioned between the front end portion of the boom 161 and the base end portion of the arm 162, and a hand cylinder actuator 166 being positioned between the base end portion of the arm 162 and the grapple hand 163.

In this grapple operating unit 160, by driving the boom cylinder actuator 164, it is possible to move the boom 161 upwards and downwards about a horizontal axis with respect to the upper swiveling unit 30, by driving the arm cylinder actuator 165, it is possible to cause the arm 162 to swing about an axis parallel to the aforementioned horizontal axis with respect to the boom 161, and moreover, by driving the hand cylinder actuator 166, it is possible to cause the grapple hand 163 to swing about an axis parallel to the aforementioned horizontal axis, with respect to the arm 162.

In this grapple operating unit 160, the aforementioned boom 161 is divided into three sections, namely, in order form the base end portion, a first boom section 161*a*, a second boom section 161*b*, and a third boom section 161*c*, and moreover, by supporting a link rod 161*d* parallel to the second boom section 161*b* between the first boom section 161*a* and the third boom section 161*c*, a parallel link is formed between the first boom section 161*a* and the third boom section 161*c* by means of the second boom section 161*b* and the link rod 161*d*. Furthermore, an offset cylinder actuator 161*e* is provided between the base end portion of the second boom section 161*b* and the third boom section 161*c*, and by driving the offset cylinder actuator 161*e*, the arm 162 and subsequent elements can be offset to the left or right with respect to the first boom section 161*a*, without altering the orientation of this grapple hand 163.

In the aforementioned grapple operating unit 160, by respectively extending the boom cylinder actuator 164, the arm cylinder actuator 165 and the hand cylinder actuator 166, the boom 161, arm 162 and grapple hand 163 can each be positioned respectively within the maximum turning circle of the upper swiveling unit 30, similarly to the work machine described in the first embodiment.

Moreover, the aforementioned grapple hand 163 grips objects by means of a pair of fingers 163*a* opening and closing with respect to each other (as indicated by the arrow b in the diagram), in addition to which the fingers 163*a* are attached rotatably with respect to the main body of the hand 163*b* (as indicated by the arrow g in the diagram).

On the other hand, in the work machine according to the third embodiment described above, a fork operating unit 170 is constituted by comprising a pair of lift arms 171 having an approximate L shape, wherein the front end portion thereof curves downwards when the base end portion thereof is positioned horizontally, which are axially connected respectively via the base end portions thereof to the upper ends of supporting brackets 24, in an upwardly and downwardly movable fashion, a connecting pipe 172 which couples this pair of lift arms 171 together in a parallel state at a position slightly towards the base end portions of the lift arms 171 from the curved portions thereof, a fork unit 173 connected axially between the front end portions of the aforementioned pair of lift arms 171 in a swingable manner about a horizontal axis linking these respective front end portions, cross links 174 connected axially to the curved portions of the aforementioned pair of lift arms 171 in a swingable manner about a horizontal axis, and tilt links 175 connecting the lower end portion of each cross link 174 with the upper end portion of the fork unit, lift cylinder actuators 176 being positioned respectively between the lower end portion of each supporting bracket and a position on each lift arm 171 slightly towards the front end portion thereof from the curved portion thereof, and moreover, tilt cylinder actuators 177 being positioned respectively between the upper end portions of each cross link 174 and the upper end portion of each supporting bracket 24.

In this fork operating unit 170, by driving the lift cylinder actuators 176, the lift arms 171 can be moved upwards and downwards about a horizontal axis with respect to the central swiveling unit 20, and by driving the tilt cylinder actuators 177, the fork unit 173 can be caused to swing about an axis parallel to the aforementioned horizontal axis, with respect to the lift arms 171, by means of the cross links 174 and the tilt links 175.

Leaving aside the grapple operating unit 160 and the fork operating unit 170, the composition relating to the lower traveling unit 10, central swiveling unit 20, upper swiveling unit 30, and the upper and lower swiveling circles 40, 60 and upper and lower hydraulic swiveling motors 90, 100, and also the composition relating to the installation of hydraulic piping from the two-stage swivel joint 110 to the fork operating unit 170 inside the central swiveling unit 20 are similar to the corresponding compositions in the work machine according to the first embodiment, and therefore similar labels have been given to these parts only, and detailed descriptions thereof have been omitted.

In the work machine according to the third embodiment having the foregoing composition, since the central swiveling unit 20 supporting the fork operating unit 170 and the upper swiveling unit 30 supporting the grapple operating unit 160 can be swivelled respectively and independently about a common swiveling axis a with respect to the lower traveling unit 10, it is possible to orientate the fork operating unit 170 and the grapple operating unit 160 in any desired direction, regardless of the orientation of the lower traveling unit 10.

Consequently, as illustrated in FIG. 18(*a*), for example, by inserting the fork blades 178 provided in the fork unit 173 into a pallet P by causing the lower traveling unit 10 to travel, and then, from this state, operating the grapple operating unit 160, as illustrated in FIG. 18(*b*), it is possible to unload a material S from the aforementioned pallet P, and by further causing the lower traveling unit 10 to travel, a plurality of materials S loaded on the pallet P can be moved to a different location in one operation.

In this case, by causing the upper swiveling unit 30 only to rotate, such that the grapple operating unit 160 changes orientation with respect to the lower traveling unit 10, the position to which the material S is unloaded from the pallet P is not restricted to the direction in which the fork operating unit 170 is orientated and, for example, the material S can be unloaded to a position which is orientated 180° from the position of the fork operating unit 170, as illustrated in FIG. 18(*c*).

In a work machine provided with a fork operating unit 170, such as a fork lift, or the like, usually, the operation of loading and unloading a pallet P to and from the fork unit 173 is restricted to the direction of travel of the work machine, and a pallet P cannot, for example, be loaded or unloaded to or from the fork unit 173 to one side thereof.

However, according to the work machine described in the third embodiment, a pallet P can be loaded onto or unloaded from the fork unit 173 when the fork operating unit 170 is positioned to one side of the lower traveling unit 10, by positioning the grapple operating unit 160 in the same direction as the fork operating unit 170 and operating the grapple hand 163 appropriately, and hence working efficiency can be improved markedly.

In the work machine according to the third embodiment described above, the mechanism described for causing the fork unit to swing with respect to the lift arms involved cross links 174, tilt links 175 and tilt cylinder actuators 177, but it is also possible to constitute a mechanism for causing the fork unit to swing with respect to the lift arms by positioning the tilt cylinder actuators between the connecting pipe 172 and the fork unit 173, similarly to the loading operating unit 50 in the first embodiment. In this case, it is possible to prevent damage to the fork operating unit 170 caused by interference between the grapple operating unit 160 and the fork operating unit 170.

FIG. 18(*e*) shows a work machine according to a fourth embodiment, wherein a crane operating unit (second operating unit) 180 is supported on the upper swiveling unit 30 in place of the grapple operating unit 160 of the work machine described in the third embodiment.

In this work machine according to the fourth embodiment, the crane operating unit 180 is constituted by comprising a multi-stage boom 181 which can be extended and retracted in a longitudinal direction and is connected axially to an upper supporting bracket (not illustrated) on the upper swiveling unit 30 via the base end portion thereof, and a suspending rope 184, which extends from a drum (not illustrated) provided on the upper swiveling unit 30, along the multi-stage boom 181, and drops vertically via a sleeve 182, the end portion thereof being fixed to a hook 183, a boom cylinder actuator (not illustrated) being provided between the multi-stage boom 181 and the upper supporting bracket (not illustrated), an extension and contraction actuator (not illustrated) being provided in the multi-stage boom 181, and a winding actuator (not illustrated) being provided in the drum (not illustrated).

In this crane operating unit 180, by driving the boom cylinder actuator (not illustrated), the multi-stage boom 181 can be moved upwards and downwards about a horizontal axis with respect to the upper swiveling unit 30, by driving the extension and contraction actuator (not illustrated) the multi-stage boom 181 can be made to extend or contract in the longitudinal direction thereof, and by driving the winding actuator (not illustrated), the distance to which the hook 183 is suspended from the sleeve 182 can be adjusted appropriately.

Leaving aside the crane operating unit 180, the composition is similar to that of the work machine according to the third embodiment, and therefore similar labels have been applied to these parts only, and detailed descriptions thereof have been omitted.

In the work machine according to the fourth embodiment having the foregoing composition, since the central swiveling unit 20 supporting the fork operating unit 170 and the upper swiveling unit 30 supporting the crane operating unit 180 can be swivelled respectively and independently about a common swiveling axis a with respect to the lower traveling unit 10, it is possible to orientate the fork operating unit 170 and the crane operating unit 180 in any desired direction, regardless of the orientation of the lower traveling unit 10.

Consequently, it is possible to place a pallet P held by the fork operating unit 170 underneath a material S being suspended from the hook 183 of the crane operating unit 180, and cause the lower traveling unit 10 to travel in this state, and by swiveling the upper swiveling unit 30 and central swiveling unit 20 simultaneously with respect to the lower traveling unit 10, it is possible to transport the material in a state where it is prevented from shaking.

Figure 19:
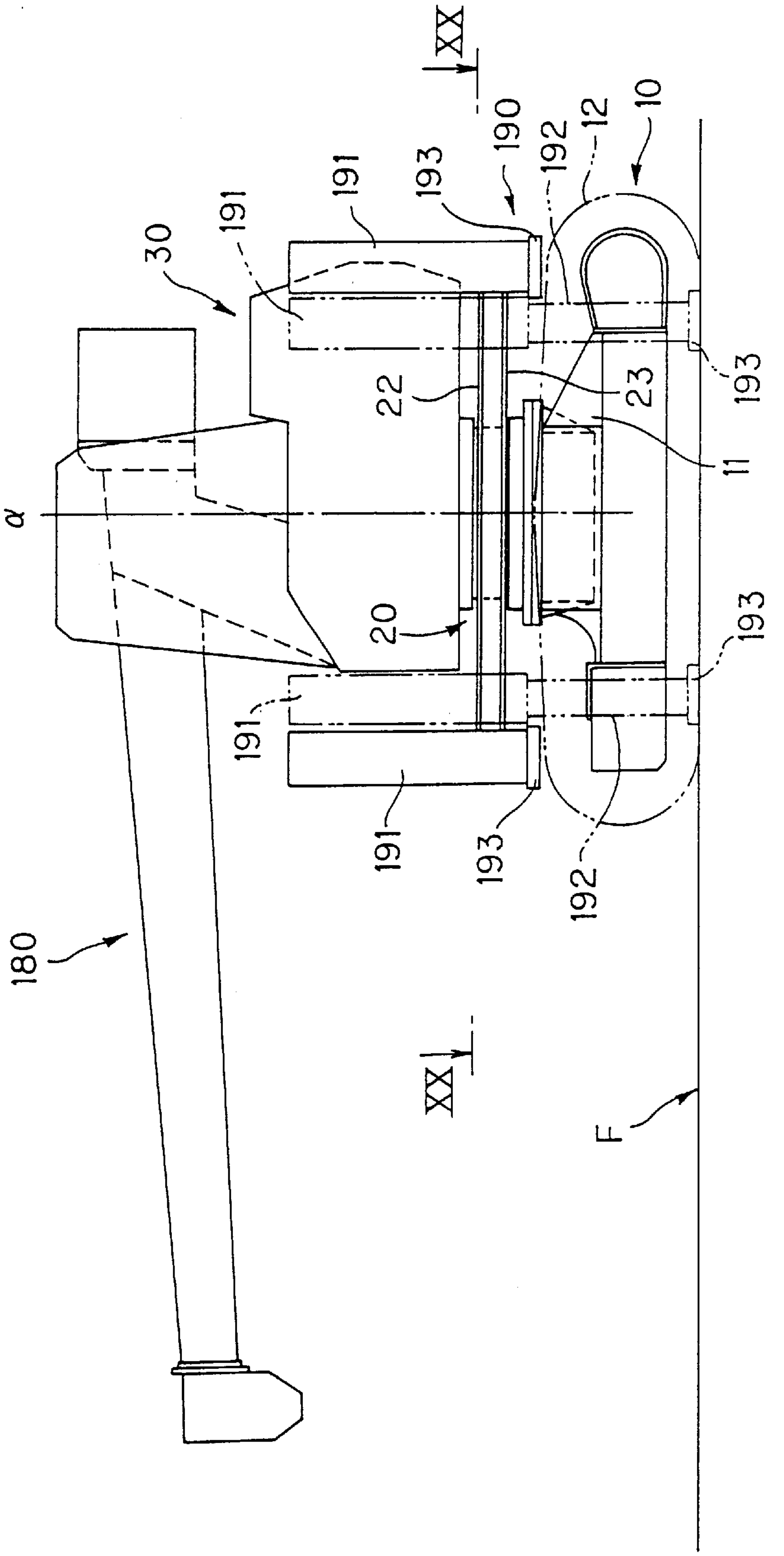
FIG. 19 is a side view showing a fifth embodiment of a work machine relating to the present invention.
Figure 20:
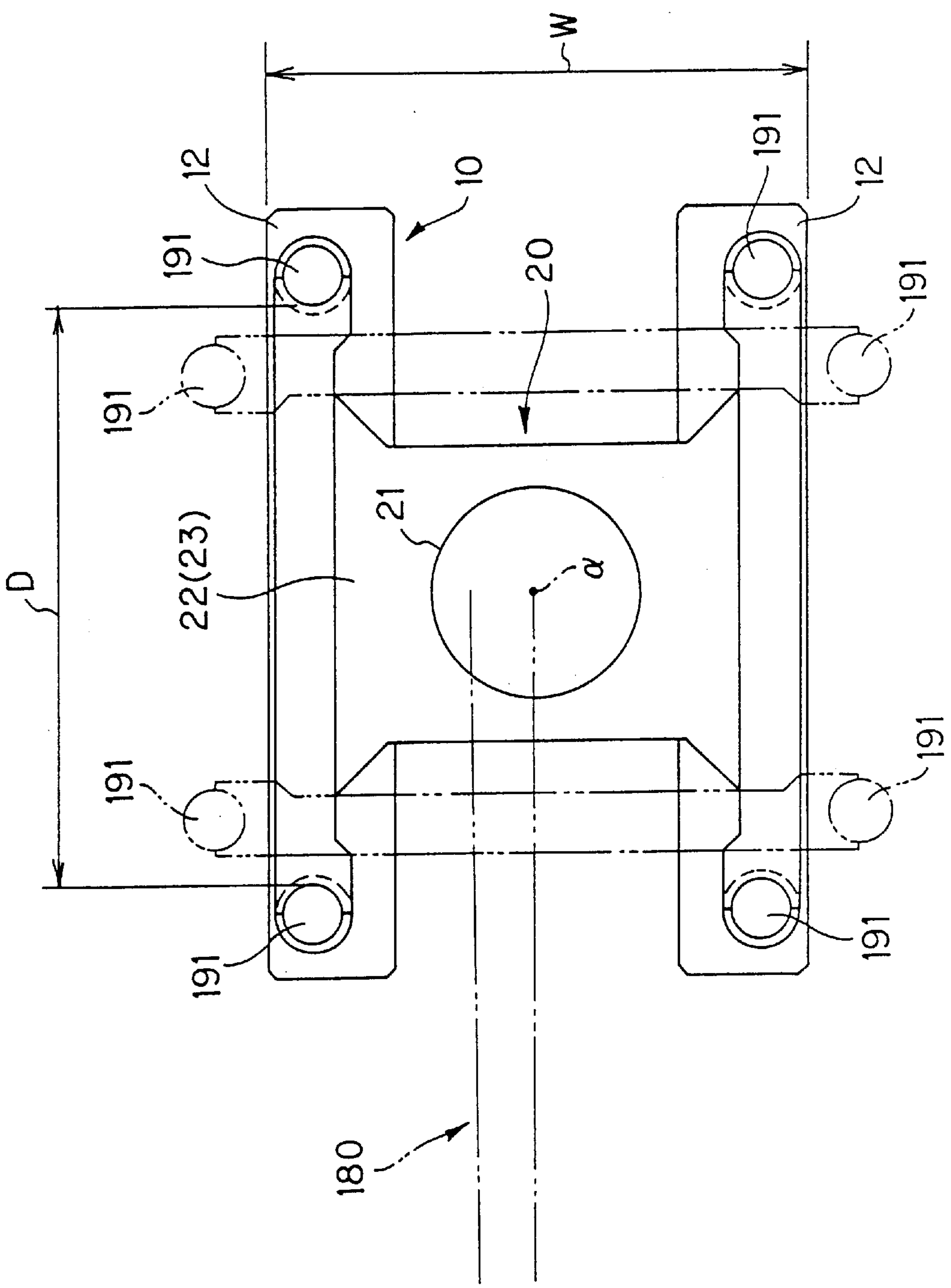
FIG. 20 is a sectional view along line XX—XX in FIG. 19.

FIG. 19 and FIG. 20 illustrate a work machine according to a fifth embodiment, wherein an outrigger device (first operating unit) 190 is held on the central swiveling unit 20 in place of the fork operating unit 170 of the work machine illustrated in the fourth embodiment.

In the work machine according to fifth embodiment, a pair of upper and lower supporting frame sections 22, 23 constituting the central swiveling unit 20 project leftwards and rightwards from the ring frame section 21, the respective end portions thereof extending horizontally in the longitudinal direction of the crawler treads 12 of the lower traveling unit 10, and jack cylinder actuators 191 are fixed respectively to the front and rear end portions thereof, thereby constituting an outrigger device 190.

The jack cylinder actuators 191 in the outrigger device 190 are each connected to an outrigger float 193 at the front end of their respective rods 192, by means of a ball joint (not illustrated), these rods 192 facing respectively in a vertical direction, and as indicated by the solid line in FIG. 20, the jack cylinder actuators 191 are installed on the aforementioned supporting frame sections 22, 23 in such a manner that a distance D, which is sufficiently greater than the distance W between the outer edges of the crawler treads 12, is ensured between the actuators positioned towards the front of the marine and the actuators positioned towards the rear of the machine.

With the exception of the crane operating unit 180 and the outrigger operating unit 190, the composition of the lower traveling unit 10, central swiveling unit 20, upper swiveling unit 30, and the lower and upper swiveling circles 40, 60 and upper and lower hydraulic swiveling motors 90, 100, and moreover the composition relating to the installation of hydraulic piping from the two-stage swivel joint 110 to the outrigger device 190 inside the central swiveling unit 20 are the same as the corresponding compositions in the work machine according to the first embodiment, and therefore similar labels have been given to these parts only and detailed descriptions thereof have been omitted.

In the work machine according to the fifth embodiment having the foregoing composition, since the central swiveling unit 20 holding the outrigger device 190 and the upper swiveling unit 30 supporting the crane operating unit 180 can be swivelled respectively and independently about a common swiveling axis a with respect to the lower traveling unit 10, the outrigger device 190 and the crane operating unit 180 can be orientated in any desired direction, regardless of the orientation of the lower traveling unit 10.

Consequently, as described above, if the portions of the supporting frame sections 22, 23 extending in the longitudinal direction are positioned in line with the crawler treads 12 of the lower traveling unit 10, then the outrigger device 190 can be positioned within the outer edges of the pair of crawler treads 12 and each of the jack cylinder actuators 191 can be positioned respectively above the crawlers 12, whilst if the central swiveling unit 20 is rotated through 90° from this position with respect to the lower traveling unit 10, it is possible to position the jack cylinder actuators 191 respectively to the outside of the outer edges of the crawler treads 12, as illustrated by the double-dotted lines in FIG. 20, without requiring any actuators for expanding or contracting in the horizontal direction. By causing the jack cylinder actuators 191 to extend in this position, the work machine can be supported via the outrigger floats 193 and hence stability during lifting operations by the crane operating unit 180 can be increased. Incidentally, even when the outrigger device 190 is being operated, the upper swiveling unit 30 can still be caused to swivel with respect to the lower traveling unit 10, and hence there is no restriction on the lifting work carried out by the crane operating unit 180.

Figure 21:
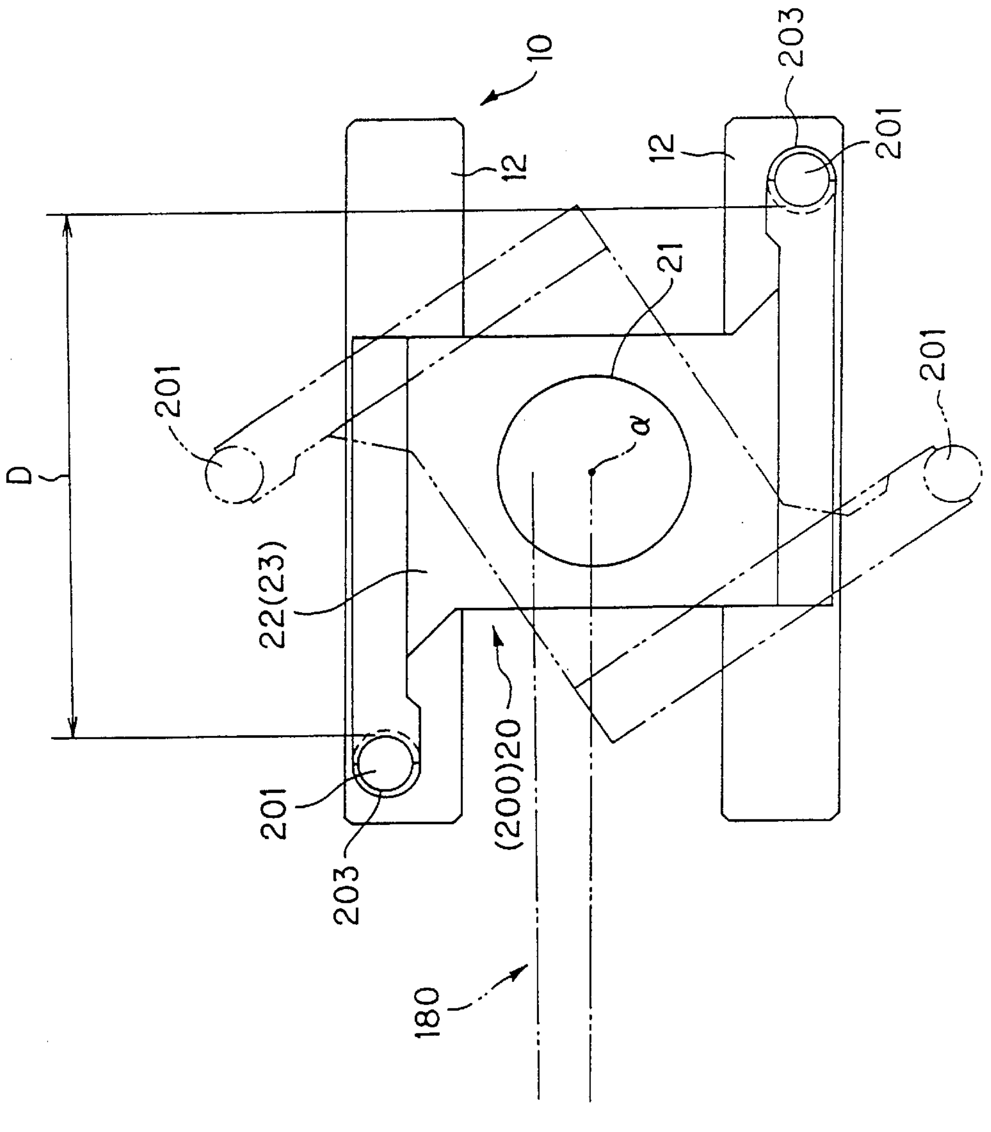
FIG. 21 is a conceptual plan view showing a first modification example of the work machine illustrated in FIG. 19.

FIG. 21 shows a first modification example wherein the outrigger device 190 in the work machine according to the fifth embodiment has been changed.

Specifically, in this first modification example, an outrigger device (first operating unit) 200 is constituted by means of the pair of upper and lower supporting frame sections 22, 23 projecting leftwards and rightwards from the ring frame section 21, one end portion thereof extending horizontally in a forward direction in line with a crawler tread 12 of the lower traveling unit 10 and the other end portion thereof extending horizontally in a rearward direction in line with a crawler tread 12, and moreover, jack cylinder actuators 201 being provided at the respective remote end portions thereof. In this first modification example, the jack cylinder actuators 201 are connected to outrigger floats 203 via ball joints (not illustrated) at the front end portions of their respective rods (not illustrated), these rods being orientated respectively in a downward vertical direction, and as indicated by the solid lines in FIG. 21, the jack cylinder actuators 201 are installed on the aforementioned supporting frame sections 22, 23 in such a manner that the same distance D as in the fifth embodiment is ensured between the actuator positioned towards the front of the machine and the actuator positioned towards the rear of the machine.

According to this first modification example, when the portions of the supporting frame sections 22, 23 extending in the forward and rearward directions are positioned in line with the crawler treads 12 of the lower traveling unit 10, the outrigger device 200 can be positioned within the outer edges of the pair of crawlers 12 and the jack cylinder actuators 201 can be positioned respectively above the crawler treads 12, whereas if the central swiveling unit 20 is swivelled from this position through approximately 55° in a clockwise fashion according to the diagram, with respect to the lower traveling unit 10, then it is possible to position the jack cylinder actuators 201 respectively to the outside of the outer edges of the crawler treads 12, without having to provide any actuators for extending or retracting in the horizontal direction.

Therefore, by causing the jack cylinder actuators 201 to extend in this state, the work machine is supported via the outrigger floats 203 and stability during lifting operations by the crane operating unit 180 can be increased.

Moreover, in this first modification example, there are two points of contact with the ground surface F, but the amount of projection of the jack cylinder actuators 201 from the lower traveling unit 10 can be raised compared to the work machine according to the fifth embodiment, without extending the length of the supporting frame sections 22, 23, and hence stability during operation can be increased further.

Figure 22:
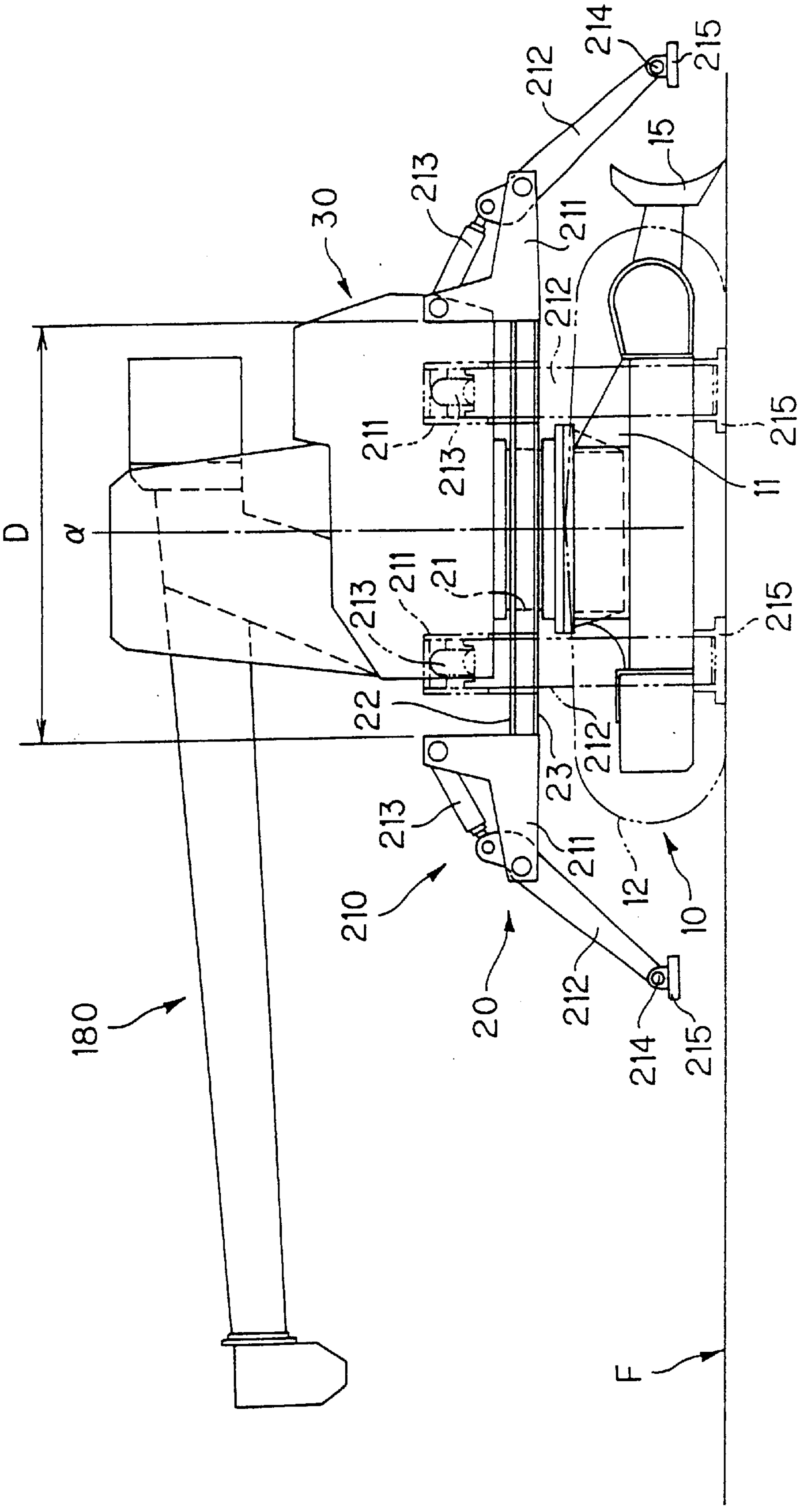
FIG. 22 is a side view showing a second modification example of the work machine illustrated in FIG. 19.

FIG. 22 shows a second modification example, wherein the outrigger device 190 in the work machine according to the fifth embodiment has been changed.

Specifically, in this second modification example, an outrigger device (first operating unit) 210 is constituted by means of a pair of upper and lower supporting frame sections 22, 23 constituting a central swiveling unit 20 projecting leftwards and rightwards from the ring frame section 21, the respective end portions thereof extending horizontally in a longitudinal direction in line with the crawler treads 12 of the lower traveling unit 10, L-shaped link brackets 211 being attached respectively to the front and rear end portions thereof, outrigger foot sections 212 being attached to the horizontal projecting sections of each link bracket 211, and jack cylinder actuators 213 being attached to the upper projecting sections of each link bracket 211.

The outrigger foot sections 212 are connected via ball joints 214 to outrigger floats 215 at the respective front end portions thereof, and they are attached to the link brackets 211 via the respective base end portions thereof, in a swingable fashion about a horizontal axis.

The jack cylinder actuators 213 are positioned between the link brackets 211 and the base end portions of the outrigger foot sections 212, and each actuator is attached to the link bracket 211 and the outrigger foot section 212 in a swingable fashion about a horizontal axis.

In this second modification example, a distance D, which is sufficiently greater than the width W between the outer edges of the crawler treads 12, is ensured between the upper projecting portions of the link brackets 211 positioned towards the front of the machine and the upper projecting portions of the link brackets 211 positioned towards the rear of the machine. Moreover, numeral 15 in the diagram denotes a blade attached to the rear end portion of the lower traveling unit 10.

According to this second modification example, similarly to the work machine according to the fifth embodiment, if the portions of the supporting frame section 22, 23 extending in a longitudinal direction are positioned in line with the crawler treads 12 of the lower traveling unit 10, then the outrigger device 210 can be positioned within the outer edges of the pair of crawlers 12, whilst if the central swiveling unit 20 is swivelled through 90° from this state with respect to the lower traveling unit 10, then it becomes possible to position the outrigger foot sections 212 respectively to the outside of the outer edges of the crawler treads 12, as indicated by the double-dotted lines in the diagram, without having to provide any actuators for extending or contracting in a horizontal direction, and if the jack cylinder actuators 213 are caused to extend in this position, then the work machine can be supported via the outrigger floats 215 and stability during lifting operations by the crane operating unit 180 can be increased.

Figure 23:
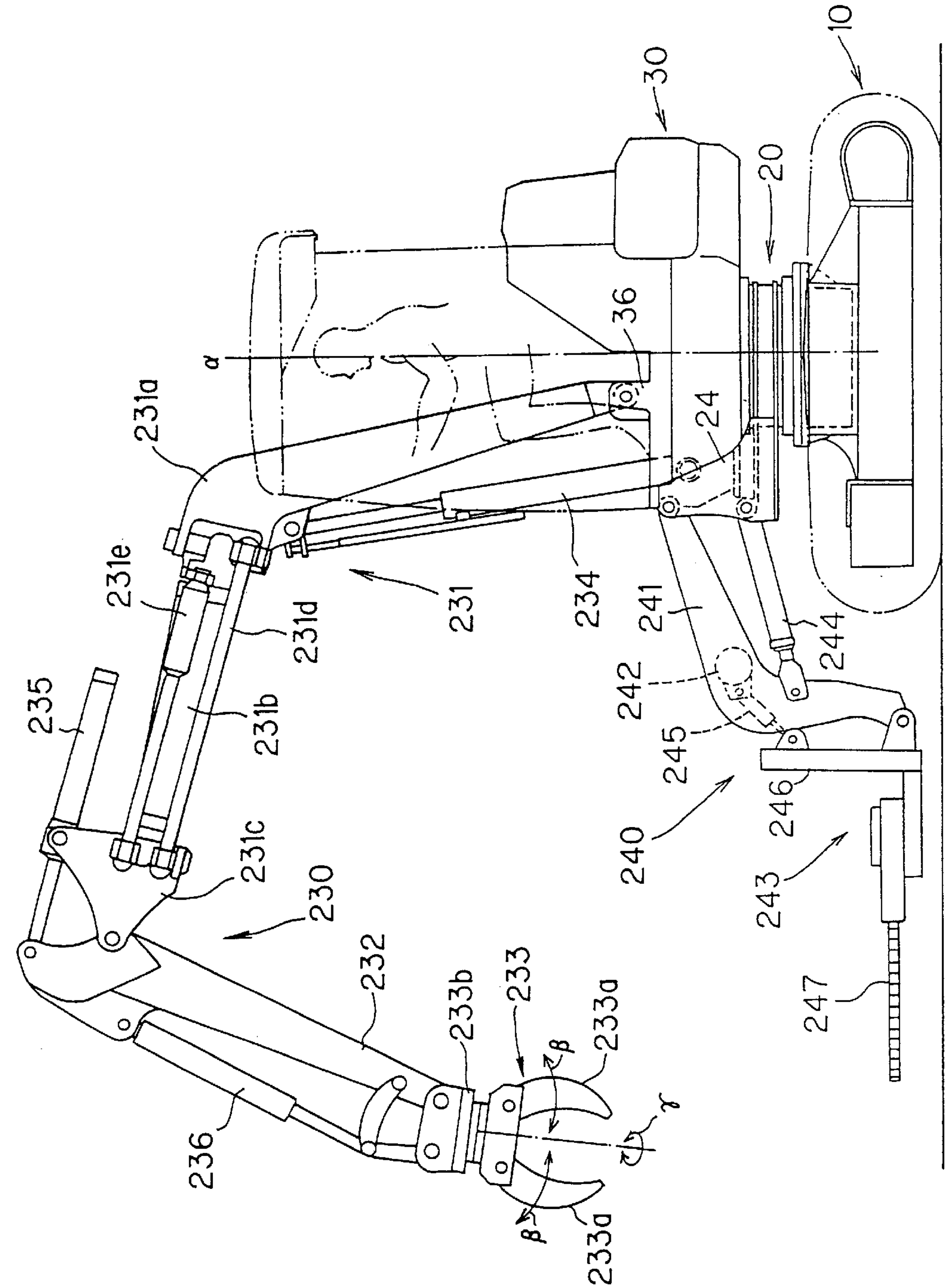
FIG. 23 is a side view showing a sixth embodiment of a work machine relating to the present invention.
Figure 24:
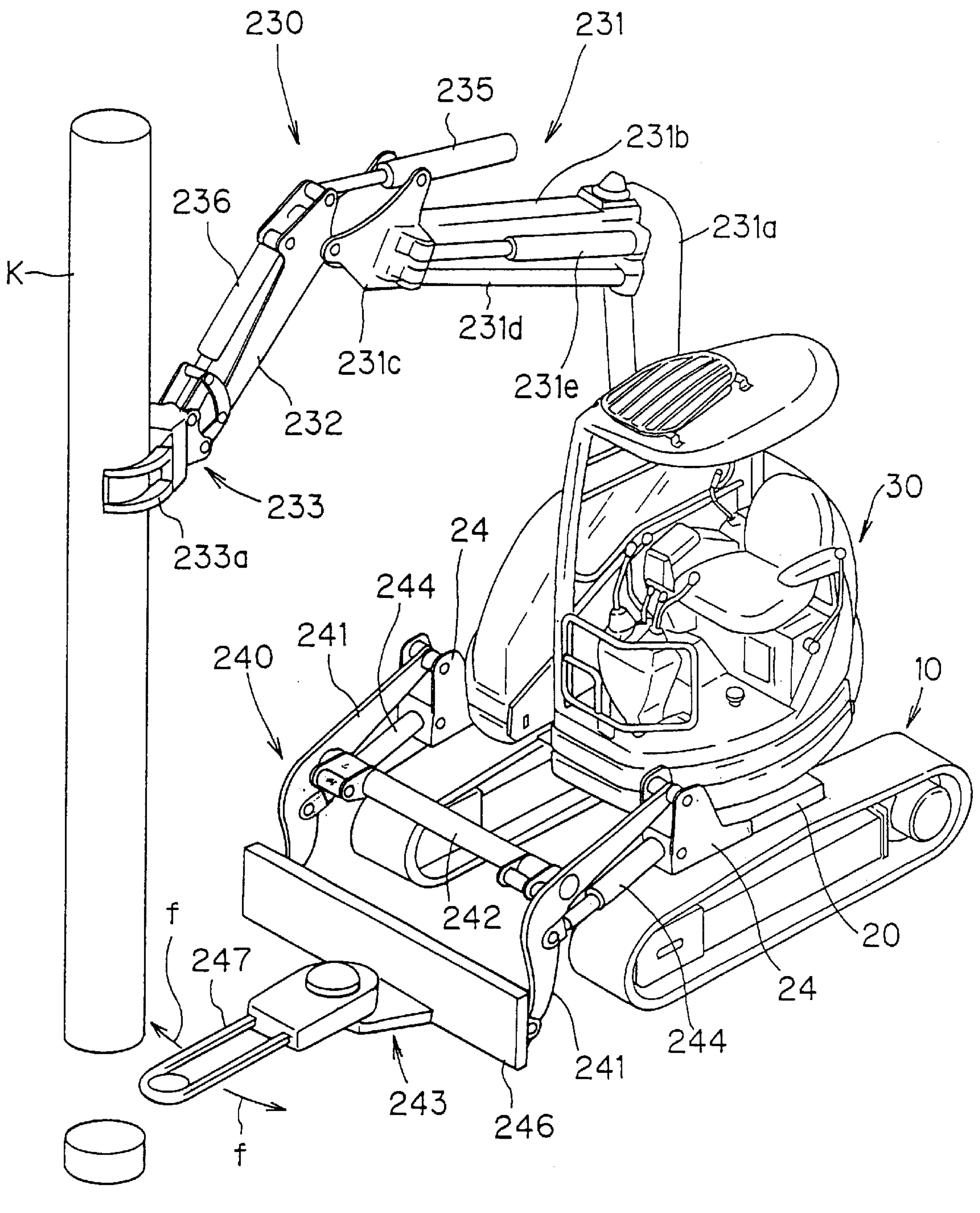
FIG. 24 is an oblique view showing an applicational mode of the work machine illustrated in FIG. 23.

FIG. 23 and FIG. 24 illustrate a work machine according to a sixth embodiment, wherein a grapple operating unit (second operating unit) 230 is supported on the upper swiveling unit 30 in place of the excavating operating unit 80 in the work machine described in the first embodiment, and moreover a cutting operating unit (first operating unit) 240 is supported on the central swiveling unit 20 in place of the loading operating unit 50.

In the work machine according to this sixth embodiment, the grapple operating unit 230 is constituted by comprising a boom 231 having an approximate L shape, wherein the front end portion thereof curves downwards when the base end portion thereof is positioned horizontally, which is connected axially via the aforementioned base end portion to an upper supporting bracket 36 in an upwardly and downwardly movable fashion, an arm 232 connected axially to the front end portion of the boom 231 in a swingable manner about a horizontal axis, and a grapple hand 233 connected axially to the front end portion of the arm 232 in a swingable manner about a horizontal axis, a boom cylinder actuator 234 being provided between the curved portion of the boom 231 and the upper supporting bracket 36, an arm cylinder actuator 235 being provided between the front end portion of the boom 231 and the base end portion of the arm 232, and a hand cylinder actuator 236 being provided between the base end portion of the arm 232 and the grapple hand 233.

The grapple hand 233 grips objects by means of a pair of fingers 233*a* opening and dosing with respect to each other (as indicated by arrow b in FIG. 23), in addition to which the fingers 233*a* are attached in such a manner that they are rotatable with respect to the main body 233*b* of the hand (as indicated by arrow g in FIG. 23).

In this grapple operating unit 230, by driving the boom cylinder actuator 234, the boom 231 can be moved upwards and downwards about a horizontal axis with respect to the upper swiveling unit 30, by driving the arm cylinder actuator 235, the arm 232 can be caused to swing about an axis parallel to the aforementioned horizontal axis, with respect to the boom 231, and by driving the hand cylinder actuator 236, the grapple hand 233 can be caused to swing about an axis parallel to the aforementioned horizontal axis, with respect to the arm 232.

In the grapple operating unit 230, the aforementioned boom 231 is divided into three sections, namely, in order from the base end portion thereof, a first boom section 231*a*, a second boom section 231*b* and a third boom section 231*c*, and moreover, by supporting a link rod 231*d* which is parallel to the second boom section 231*b* between the first boom section 231*a* and the third boom section 231*c*, a parallel link is constituted between the first boom section 231*a* and the third boom section 231*c* by means of the second boom section 231*b* and the link rod 231*d*.

Furthermore, an offset cylinder actuator 231*e* is provided between the base end portion of the second boom section 231*b* and the third boom section 231*c*, and by driving this offset cylinder actuator 231*e*, it is possible to offset the arm 232 and subsequent members to the left or right with respect to the first boom section 231*a*, without altering the orientation of the grapple hand 233.

In the grapple operating unit 230 described above, by respectively extending the boom cylinder actuator 234, the arm cylinder actuator 235 and the hand cylinder actuator 236, the boom 231, arm 232 and grapple hand 233 can each be positioned respectively within the maximum turning circle of the upper swiveling unit 30, similarly to the work machine described in the first embodiment.

On the other hand, in the work machine according to the sixth embodiment, a cutting operating unit 240 is constituted by providing a pair of lift arms 241 having an approximate L shape, wherein the front end portions thereof curve downwards when the base end portions thereof are positioned horizontally, which are axially connected respectively via the aforementioned base end portions to the upper end portions of the supporting brackets 24, in an upwardly and downwardly movable fashion, a connecting pipe 242 which connects this pair of lift arms 241 together in a mutually parallel state at a position on each lift arm 241 located slightly towards the base end portion thereof from the curved portion thereof, and a cutting unit 243 axially connected between the front end portions of the aforementioned pair of lift arms 241 such that it is swingable about a horizontal axis linking the aforementioned front end portions, lift cylinder actuators 244 being provided respectively between a position on each lift arm located slightly towards the front end portion thereof from the curved portion thereof and the lower end section of each supporting bracket 24, and dump cylinder actuators 245 being provided respectively between the connecting pipe 242 and both end portions of the cutting unit 243 in positions to the inner side of the respective lift arms 241.

The cutting unit 243 is constituted by providing a chain saw 247 on the front end portion of an L-shaped holding plate 246 and it has the function of cutting a desired object by means of driving the chain saw 247.

In this cutting operating unit 240, by driving the lift cylinder actuators 244, the lift arms 241 can be moved upwards and downwards about a horizontal axis with respect to the central swiveling unit 20, and by driving the dump cylinder actuators 245, the cutting unit 243 can be made to swing about an axis parallel to this horizontal axis, with respect to the lift arm 241.

With the exception of the grapple operating unit 230 and the cutting operating unit 240, the composition of the lower traveling unit 10, central swiveling unit 20, upper swiveling unit 30, the upper and lower swiveling circles 40, 60, and the upper and lower hydraulic motors 90, 100, and the composition relating to the installation of hydraulic piping from the two-stage swivel joint 110 to the cutting operating unit 240 inside the central swiveling unit 20 are similar to corresponding compositions in the work machine according to the first embodiment, and therefore similar labels are given only to these parts and detailed descriptions thereof are omitted here.

In the work machine according to the sixth embodiment having the foregoing composition, since the central swiveling unit 20 supporting the cutting operating unit 240 and the upper swiveling unit 30 supporting the grapple operating unit 230 can swivel respectively and independently about a common swiveling axis a with respect to the lower traveling unit 10, then the cutting operating unit 240 and the grapple operating unit 230 can be orientated in any desired direction, regardless of the orientation of the lower traveling unit 10.

Here, in the aforementioned cutting operating unit 240, the chain saw 247 does not comprise a feeder mechanism with respect to the holding plate 246, but when the central swiveling unit 20 is swivelled, this movement of the central swiveling unit 20 provides a feeding action to the chain saw 247 in order to perform a cutting operation.

Therefore, according to the work machine described above, supposing a case where, for example, an existing column K is being dismantled at an underground work site, or the like, as illustrated in FIG. 24, then by causing the central swiveling unit 20 to swivel, in a state where the aforementioned column K is being held by the grapple hand 233 of the grapple operating unit 230 in order to prevent the column K from falling over after it has been cut, a feed f can be applied to the chain saw 247 in order to perform a cutting operation, without affecting the orientation of the grapple operating unit 230 in any way, and without causing the lower traveling unit 10 to move in any way.

In other words, according to the work machine described above, it is possible to perform cutting of an existing column K, simply and relatively safely, even in a restricted underground working space, or the like, by coordinated use of the grapple operating unit 230 and the cutting operating unit 240. In this case, as described previously, since it is unnecessary to provide a feeder mechanism for the chain saw 247 with respect to the holding plate 246 in the cutting operating unit 240, the structure of the machine does not become more complex and there is no rise in manufacturing costs.

Moreover, by causing the central swiveling unit 20 and the upper swiveling unit 30 to swivel with respect to the lower traveling unit 10, it is possible to dismantle existing columns K located around the work machine, in a successive fashion, without having to move the lower traveling unit 10, thereby allowing working efficiency to be raised.

In the sixth embodiment, a cutting operating unit employing a chain saw was described, but even in an operating unit using another type of cutter, such as a circular blade comprising cutting teeth provided about the circumference of a circular disc, a feed can be applied to the cutter in a similar manner in order to perform cutting by swiveling the central traveling unit, thereby enabling similar beneficial effects to be obtained. Moreover, here, the central swiveling unit 20 and the upper swiveling unit 30 are caused to swivel about a common swiveling axis a, but in the sixth embodiment, the swiveling axis of the central swiveling unit 20 does not necessarily have to coincide with the swiveling axis of the upper swiveling unit 30.

Figure 25:
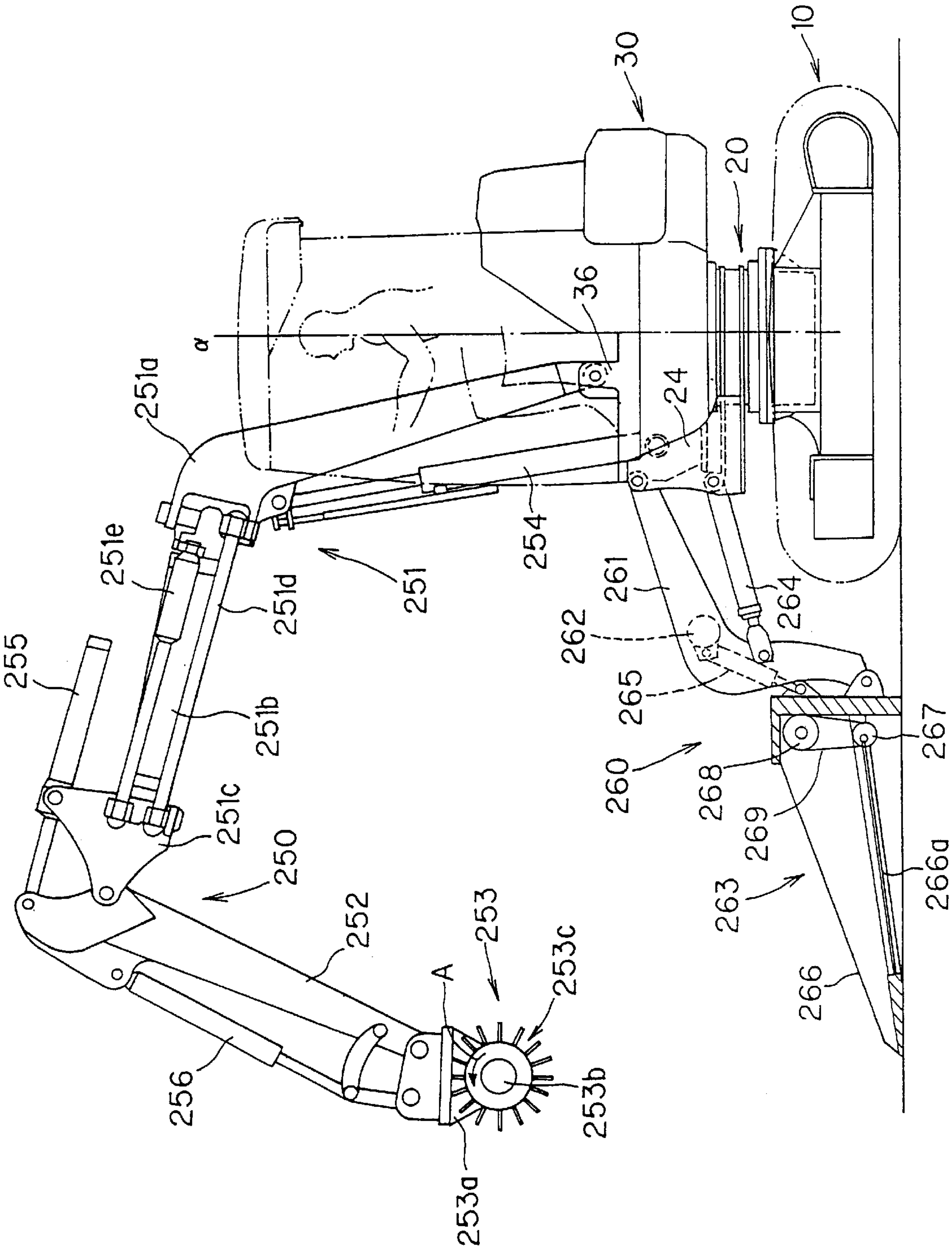
FIG. 25 is a side view showing a seventh embodiment of a work machine relating to the present invention.
Figure 26:
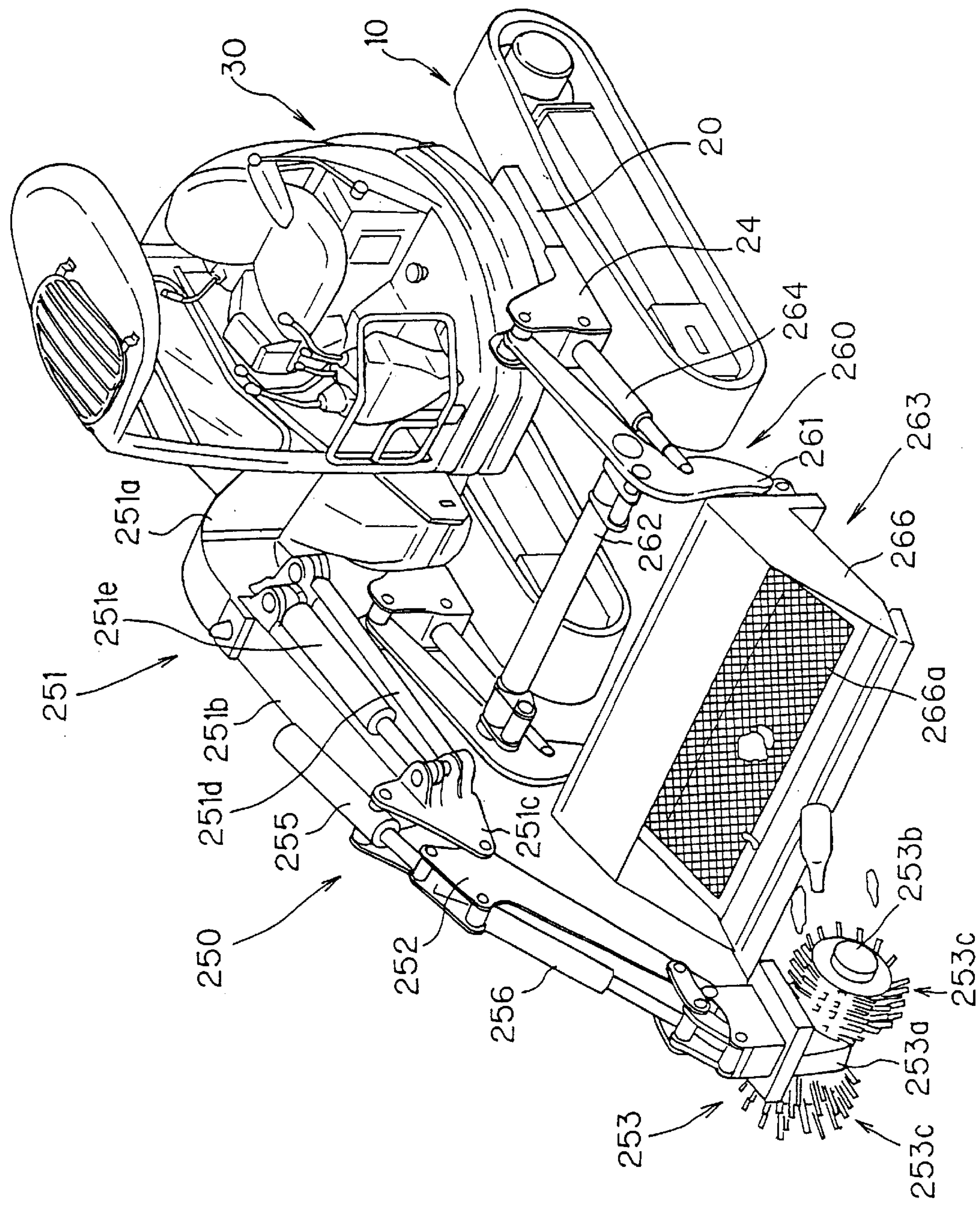
FIG. 26 is an oblique view showing an applicational mode of the work machine illustrated in FIG. 25.

FIG. 25 and FIG. 26 show a work machine according to a seventh embodiment, wherein a brush operating unit (second operating unit) 250 is supported on the upper swiveling unit 30 in place of the excavating operating unit 80 described in the first embodiment, and a gathering operating unit (first operating unit) 260 is supported on the central swiveling unit 20 in place of the loading operating unit 50.

In the work machine according to the seventh embodiment, a brush operating unit 250 is constituted by providing a boom 251 having an approximate L shape, wherein the front end portion thereof curves downwards when the base end portion thereof is positioned horizontally, which is axially connected via the aforementioned base end portion to an upper supporting bracket 36, in an upwardly and downwardly movable fashion, an arm 252 axially connected to the front end portion of this boom 251 in a swingable manner about a horizontal axis, and a rotating brush unit 253 anally connected to the front end portion of this arm 252 in a swingable manner about a horizontal axis, a boom cylinder actuator 254 being provided between the curved portion of the boom 251 and the upper supporting bracket 36, an arm cylinder actuator 255 being provided between the front end portion of the boom 251 and the base end portion of the arm 252, and a brush cylinder actuator 256 being provided between the base end portion of the arm 252 and the rotating brush unit 253.

The rotating brush unit 253 comprises a main body **253*a* supported on the arm 252, and rotating brushes 253*c* provided rotatably on either side of the main body 253, each comprising a plurality of elastic brushes standing on the surface of a shaft member 253*b*. When a hydraulic rotating motor (not illustrated) provided inside the unit main body 253*a* is driven, the respective rotating brushes 253*c* rotate about the axis of the shaft section 253*b*** in the direction indicated by arrow, thereby performing the action of, for example, sweeping up objects such as rubbish, and the like, scattered on the ground surface F, towards the work machine.

In this brush operating unit 250, by driving the boom cylinder actuator 254, the boom 251 can be moved upwards and downwards about a horizontal axis with respect to the upper swiveling unit 30, by driving the arm cylinder actuator 255, the arm 252 can be caused to swing about an axis parallel to the aforementioned horizontal axis, with respect to the boom 251, and by driving the brush cylinder actuator 256, it is possible to cause the rotating brush unit 253 to swing about an axis parallel to the aforementioned horizontal axis, with respect to the arm 252.

Moreover, in this brush operating unit 250, the aforementioned boom 251 is divided into three sections, namely, in order from the base end portion, a first boom section **251*a*, a second boom section 251*b*, and a third boom section 251*c*, and moreover, by supporting a link rod 251*d* parallel to the second boom section 251*b* between the first boom section 251*a* and the third boom section 251*c*, a parallel link is constituted between the first boom section 251*a* and the third boom section 251*c* by means of the second boom section 251*b* and the link rod 251*d*. Furthermore, an offset cylinder actuator 251*e* is positioned between the base end portion of the second boom section 251*b* and the third boom section 251*c*, and by driving this offset cylinder actuator 251*e*, it is possible to offset the arm 252 and subsequent elements to the left or right with respect to the first boom section 251*a*, without changing the orientation of the rotating brush unit 253**.

In the brush operating unit 250 described above, if the boom cylinder actuator 254, the arm cylinder actuator 255 and the brush cylinder actuator 256 are respectively extended, then the boom 251, arm 252 and rotating brush unit 253 can each be positioned within the maximum turning circle of the upper swiveling unit 30, similarly to the work machine described in the first embodiment.

On the other hand, in the work machine according to the seventh embodiment described above, a gathering operating unit 260 is constituted by providing a pair of lift arms 261 having an approximate L shape, wherein the front end portions thereof curve downwards when the base end portions thereof are positioned horizontally, which are axially connected respectively via the aforementioned base end portions to the upper end portions of supporting brackets 24, in an upwardly and downwardly movable fashion, a connecting pipe 262 which connects this pair of lift arms 261 together in a mutually parallel state at a position on each lift arm 261 located slightly towards the base end portion thereof from the curved portion thereof, and an oscillating bucket 263 axially connected between the front end portions of the aforementioned pair of lift arms 261 such that it is swingable about a horizontal axis linking the aforementioned front end portions, lift cylinder actuators 264 being provided respectively between a position on each lift arm 261 located slightly towards the front end portion thereof from the curved portion thereof and the lower end section of each supporting bracket 24, and dump cylinder actuators 265 being provided respectively between the connecting pipe 262 and both end portions of the oscillating bucket 263 in positions to the inner side of the respective lift arms 261.

The oscillating bucket 263 comprises a bucket main unit 266 having a base and walls made from screen mesh **266*a*, an eccentric cam 267 connected to the base end portion of the screen mesh 266*a*, a hydraulic oscillation motor 268 provided inside the bucket main unit 266, and a drive chain 269 connecting this hydraulic oscillation motor 268 and the eccentric cam 267. When the hydraulic oscillation motor 268 is driven, the eccentric cam 267 is caused to rotate by means of the drive chain 269, and the screen mesh 266*a* starts to oscillate with respect to the bucket main unit 266**.

In this gathering operating unit 260, by driving the lift cylinder actuators 264, the lift arms 261 can be caused to move upwards and downwards about the central swiveling unit 20 with respect to a horizontal axis, and by driving the dump cylinder actuator 265, the oscillating bucket 263 can be caused to oscillate about an axis parallel to the aforementioned horizontal axis with respect to the lift arms 261.

With the exception of the brush operating unit 250 and the gathering operating unit 260, the composition of the lower traveling unit 10, central swiveling unit 20, upper swiveling unit 30 and the upper and lower swiveling circles 40, 60 and upper and lower hydraulic swiveling motors 90, 100, and also the composition relating to the installation of hydraulic piping from the two-stage swivel joint 110 to the gathering operating unit 260 inside the central swiveling unit 20 are similar to the corresponding compositions in the work machine according to the first embodiment, and hence similar labels are applied only to these parts, and detailed descriptions thereof are omitted here.

In the work machine according to the seventh embodiment having the foregoing composition, since the central swiveling unit 20 supporting the gathering operating unit 260 and the upper swiveling unit 30 supporting the brush operating unit 250 can be swivelled respectively and independently about a common swiveling axis a with respect to the lower traveling unit 10, the gathering operating unit 260 and the brush operating unit 250 can be orientated in any desired direction, regardless of the orientation of the lower traveling unit 10.

Therefore, according to the foregoing work machine, in a case where, for example, rubbish gathering work is being carried out on a beach, as illustrated in FIG. 26, then by swiveling the upper swiveling unit 30 and the lower swiveling unit 20 respectively and appropriately with respect to the lower traveling unit 10, in a state where the brush operating unit 250 and the gathering operating unit 260 are orientated in the same direction, and operating the brush operating unit 250 and the gathering operating unit 260 in coordination in such a manner that rubbish swept up by the rotating brushes 253*c* is subsequently collected in the oscillating bucket 263, it is possible to gather up rubbish over a wide area on both sides of the path of travel of the lower traveling unit 10, rather than simply within the vehicle width of the lower traveling unit 10, and hence the rubbish gathering operation can be carried out with extremely good efficiency.

Moreover, according to the work machine described above, sand or gravel adhering to the rubbish collected in the oscillating bucket 263 are reliably sieved out by the oscillating motion of the screen mesh 266*a*, whereupon, by driving the lift cylinder actuator 264 and the dump cylinder actuator 265 appropriately, the rubbish devoid of sand or gravel collected in the oscillating bucket 263 can be loaded directly into the container of a dump truck located in a desired direction.

In this seventh embodiment, a brush operating unit incorporating rotating brushes was used, but it is also possible to employ a brush operating unit comprising paintbrush-style brushes. Moreover, the example described employed a gathering operating unit comprising a screen mesh, and hence rubbish can be recovered with good efficiency on beach areas, in particular, but it does not necessarily have to comprise a screen mesh, provided that it is capable of gathering the rubbish brushed up by the brush operating unit with good efficiency. Moreover, similarly to the sixth embodiment, the swiveling axes of the central swiveling unit 20 and the upper swiveling unit 30 do not necessarily have to coincide with each other.

Figure 27:
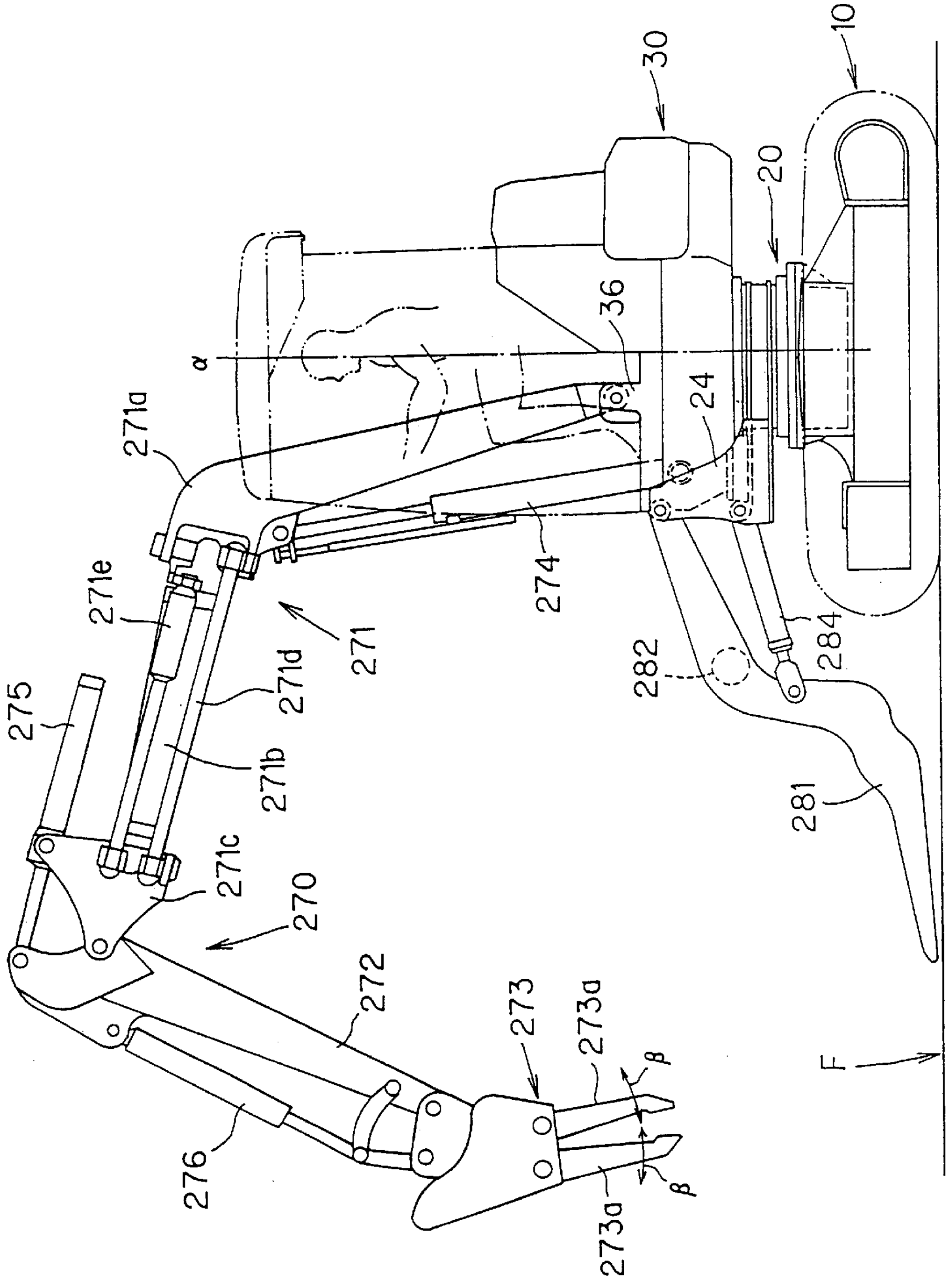
FIG. 27 is a side view showing an eighth embodiment of a work machine relating to the present invention.
Figure 28:
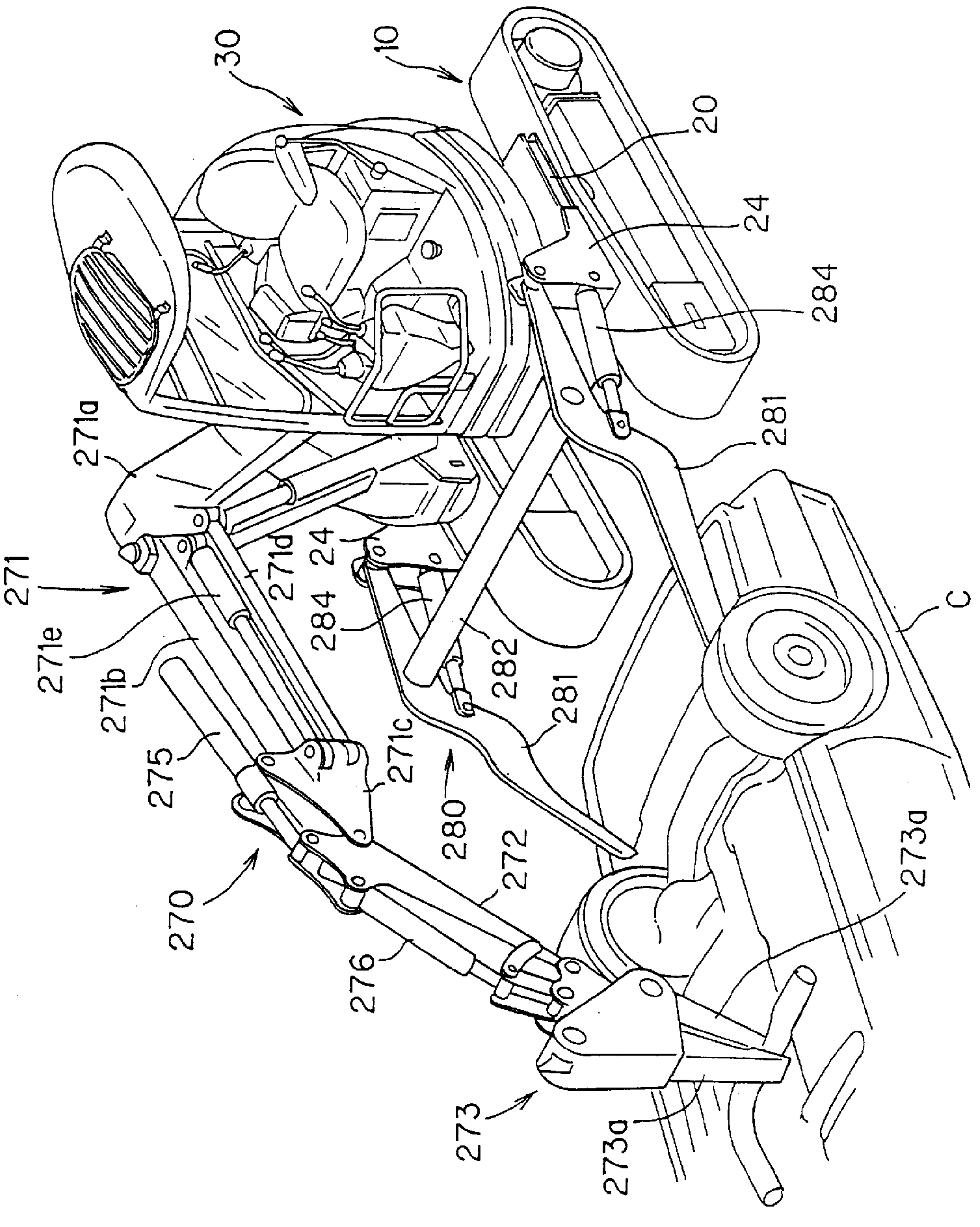
FIG. 28 is an oblique view showing an applicational mode of the work machine illustrated in FIG. 27.

FIG. 27 and FIG. 28 illustrate a work machine according to an eighth embodiment, wherein a grapple operating unit (second operating unit) 270 is supported on the upper swiveling unit 30 in place of the excavating operating unit 80 in the work machine described in the first embodiment, and a clamp operating unit (first operating unit) 280 is supported on the central swiveling unit 20 in place of the loading operating unit 50.

In the work machine according to this eighth embodiment, the grapple operating unit 270 is constituted by providing a boom 271 having an approximate L shape, wherein the front end portion thereof curves downwards when the base end portion thereof is positioned horizontally, which is connected axially via the aforementioned base end portion to an upper supporting bracket 36 in an upwardly and downwardly movable fashion, an arm 272 connected axially to the front end portion of the boom 271 in a swingable manner about a horizontal axis, and a grapple hand 273 connected axially to the front end portion of the arm 272 in a swingable manner about a horizontal axis, a boom cylinder actuator 274 being provided between the curved portion of the boom 271 and the upper supporting bracket 36, an arm cylinder actuator 275 being provided between the front end portion of the boom 271 and the base end portion of the arm 272, and a hand cylinder actuator 276 being provided between the base end portion of the arm 272 and the grapple hand 273.

The grapple hand 273 grips objects by means of a pair of fingers 273*a* opening and dosing with respect to each other (as indicated by arrow b in FIG. 27).

In this grapple operating unit 270, by driving the boom cylinder actuator 274, the boom 271 can be moved upwards and downwards about a horizontal axis with respect to the upper swiveling unit 30, by driving the arm cylinder actuator 275, the arm 272 can be caused to swing about an axis parallel to the aforementioned horizontal axis, with respect to the boom 271, and by driving the hand cylinder actuator 276, the grapple hand 273 can be caused to swing about an axis parallel to the aforementioned horizontal axis, with respect to the arm 272.

In the grapple operating unit 270, the aforementioned boom 271 is divided into three sections, namely, in order from the base end portion thereof, a first boom section 271*a*, a second boom section 271*b* and a third boom section 271*c*, and moreover, by supporting a link rod 271*d* which is parallel to the second boom section 271*b* between the first boom section 271*a* and the third boom section 271*c*, a parallel link is constituted between the first boom section 271*a* and the third boom section 271*c* by means of the second boom section 271*b* and the link rod 271*d*. Furthermore, an offset cylinder actuator 271*e* is provided between the base end portion of the second boom section 271*b* and the third boom section 271*c*, and by driving this offset cylinder actuator 271*e*, it is possible to offset the arm 272 and subsequent members to the left or right with respect to the first boom section 271*a*, without altering the orientation of the grapple hand 273.

In the grapple operating unit 270 described above, by respectively extending the boom cylinder actuator 274, the arm cylinder actuator 275 and the hand cylinder actuator 276, the boom 271, arm 272 and grapple hand 273 can each be positioned respectively within the maximum turning circle of the upper swiveling unit 30, similarly to the work machine described in the first embodiment.

On the other hand, in the work machine according to the eighth embodiment, a clamp operating unit 280 is constituted by providing a pair of clamp arms 281 having an approximate S shape, wherein the front end portion thereof curves downwards when the base end portion thereof is positioned horizontally, which are connected axially via the aforementioned base end portions to the upper end portions of respective supporting brackets 24, and a connecting pipe 282 which connecting this pair of clamp arms 281 together in a mutually parallel state, at a position on each clamp arm towards the base end side thereof, clamp cylinder actuators 284 being provided respectively between a position on each clamp arm 281 slightly towards the front end portion thereof from the connecting pipe 282 and the lower end section of each supporting bracket 24.

In this clamp operating unit 280, by driving the clamp cylinder actuators 284, the clamp arms 281 are caused to move upwards and downwards about a horizontal axis with respect to the central swiveling unit 20, thereby enabling an object, such as a vehicle for breaking, or the like, positioned on the ground surface F to be clamped securely between the clamp operating unit 280 and the ground surface F.

With the exception of the grapple operating unit 270 and the clamp operating unit 280, the composition of the lower traveling unit 10, central swiveling unit 20, upper swiveling unit 30, the upper and lower swiveling circles 40, 60, and the upper and lower hydraulic motors 90, 100, and the composition relating to the installation of hydraulic piping from the two-stage swivel joint 110 to the clamp operating unit 280 inside the central swiveling unit 20 are similar to corresponding compositions in the work machine according to the first embodiment, and therefore similar labels are given only to these parts and detailed descriptions thereof are omitted here.

In the work machine according to the eighth embodiment having the foregoing composition, since the central swiveling unit 20 supporting the clamp operating unit 280 and the upper swiveling unit 30 supporting the grapple operating unit 270 can swivel respectively and independently about a common swiveling axis a with respect to the lower traveling unit 10, then the clamp operating unit 280 and the grapple operating unit 270 can be orientated in any desired direction, regardless of the orientation of the lower traveling unit 10.

Therefore, according to the work machine described above, in a car breaking site, for example, as illustrated in FIG. 28, coordinated operations can be carried out, whereby items for dismantling can be removed successively by means of the grapple hand 273 of the grapple operating unit 270 from a car for breaking C held by the clamp arms 281 of the clamp operating unit 280, and by further swiveling the upper swiveling unit 30 only with respect to the lower traveling unit 10 and the central swiveling unit 20, the aforementioned dismantled items can be loaded successively to a desired location.

Moreover, according to the work machine described above, by swiveling the central swiveling unit 20 with respect to the lower traveling unit 10, it is possible to clamp cars for breaking C positioned around the lower traveling unit 10, in a successive fashion, without having to move the lower traveling unit 10 in any way, or alternatively, by causing the central swiveling unit 20 to swivel with respect to the lower traveling unit 10 whilst a car for breaking C is being clamped by the clamp arms 281, it is possible to remove a car for breaking C after the dismantled items have been detached therefrom, without moving the lower traveling unit 10 in any way, thereby making it possible to carry out the aforementioned operations with very good efficiency, even in a restricted vehicle breaking site, or the like.

In the eighth embodiment described above, similarly to the sixth embodiment, the swiveling axes of the central swiveling unit 20 and the upper swiveling unit 30 do not necessarily have to coincide.

Figure 29:
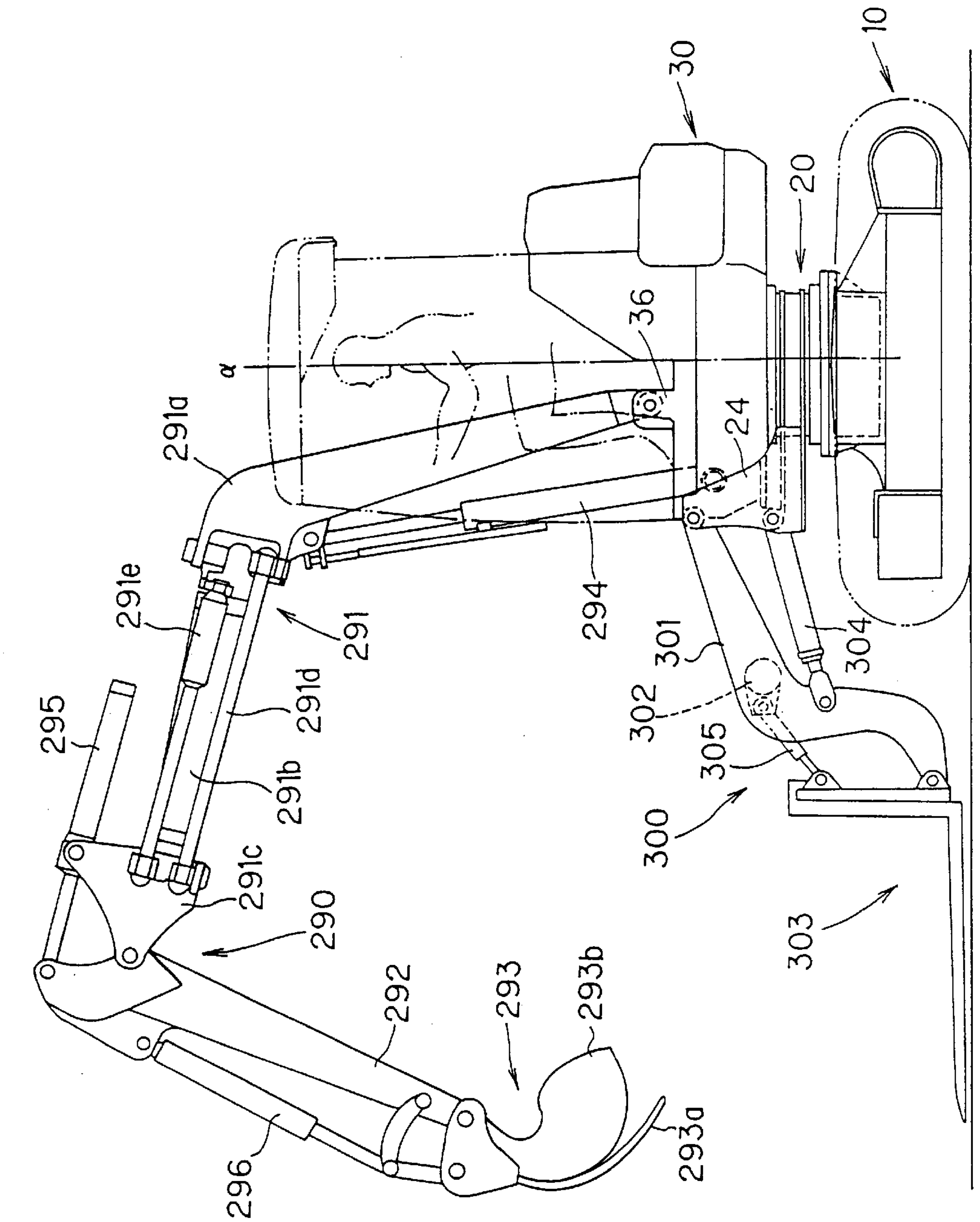
FIG. 29 is a side view showing a ninth embodiment of a work machine relating to the present invention.
Figure 30:
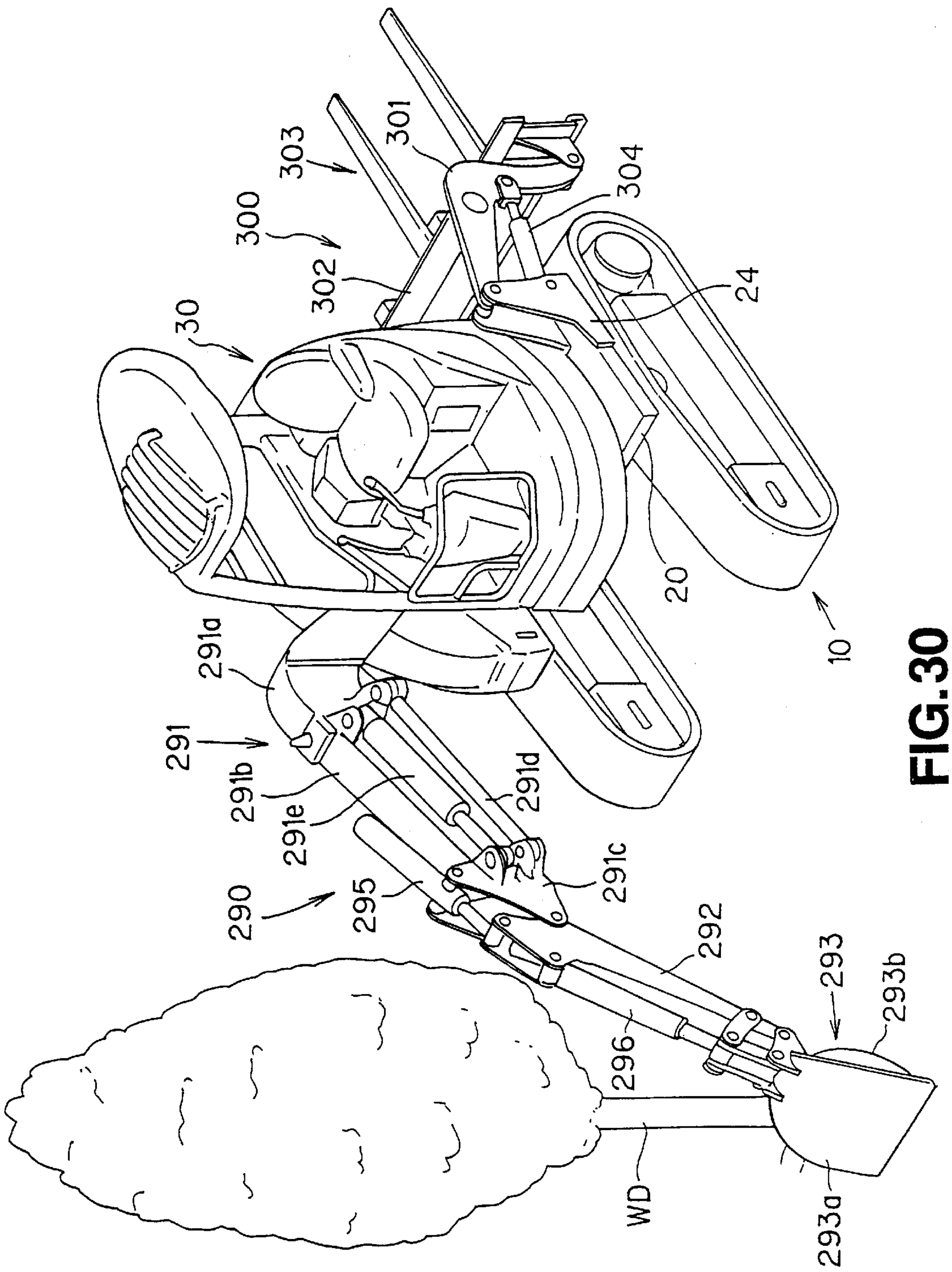
FIG. 30 is an oblique view showing an applicational mode of the work machine illustrated in FIG. 29.

FIG. 29 and FIG. 30 illustrate a work machine according to a ninth embodiment, wherein a root cutting excavator tool (second operating unit) 290 is supported on the upper swiveling unit 30 in place of the excavating operating unit 80 of the work machine described in the first embodiment, and a fork operating unit (first operating unit) 300 is supported on the central swiveling unit 20 in place of the loading operating unit 50.

In this work machine according to the ninth embodiment, the root cutting excavator operating unit 290 is constituted by providing a boom 291 having an approximate L shape, wherein the front end portion thereof curves downwards when the base end portion thereof is positioned horizontally, which is connected axially via the aforementioned base end portion to an upper supporting bracket 36 in an upwardly and downwardly movable fashion, an arm 292 connected axially to the front end portion of the boom 291 in a swingable manner about a horizontal axis, and a root-cutting bucket 293 connected axially to the front end portion of the arm 292 in a swingable manner about a horizontal axis, a boom cylinder actuator 294 being provided between the curved portion of the boom 291 and the upper supporting bracket 36, an arm cylinder actuator 295 being provided between the front end portion of the boom 291 and the base end portion of the arm 292, and a bucket cylinder actuator 296 being provided between the base end portion of the arm 292 and the root cutting bucket 293.

The root-cutting bucket 293 comprises an excavating bucket section 293*a* and a cutter section 293*b* for root cutting, and digging operations by the bucket section 293*a* and root cutting operations by the cutter section 293*b* can be carried out simultaneously.

In this root-cutting excavator tool 290, by driving the boom cylinder actuator 294, the boom 291 can be caused to move upwards and downwards about a horizontal axis with respect to the upper swiveling unit 30, by driving the arm cylinder actuator 295, the arm 292 can be caused to swing about an axis parallel to the aforementioned horizontal axis with respect to the boom 291, and by driving the bucket cylinder actuator 296, the root cutting bucket 293 can be caused to swing about an axis parallel to the aforementioned horizontal axis with respect to the arm 292.

Moreover, in this root-cutting excavator tool 290, the aforementioned boom 291 is divided into three sections, namely, in order from the base end portion thereof, a first boom section 291*a*, a second boom section 291*b* and a third boom section 291*c*, and moreover, by supporting a link rod 291*d* parallel to the second boom section 291*b* between the first boom section 291*a* and the third boom section 291*c*, a parallel link is constituted between the first boom section 291*a* and the third boom section 291*c* by means of the second boom section 291*b* and the link rod 291*d*. Furthermore, an offset cylinder actuator 291*e* is provided between the base end portion of the second boom section 291*b* and the third boom section 291*c*, and by driving this offset cylinder actuator 291*e*, it is possible to offset the arm 292 and subsequent members to the left or right with respect to the first boom section 291*a*, without altering the orientation of the root-cutting bucket 293.

In the root-cutting excavator tool 290 described above, by respectively extending the boom cylinder actuator 294, the arm cylinder actuator 295 and the bucket cylinder actuator 296, the boom 291, arm 292 and root cutting bucket 293 can each be positioned respectively within the maximum turning circle of the upper swiveling unit 30, similarly to the work machine described in the first embodiment.

On the other hand, in the work machine according to the ninth embodiment, a fork operating unit 300 is constituted by providing a pair of lift arms 301 having an approximate L shape, wherein the front end portion thereof curves downwards when the base end portion thereof is positioned horizontally, which are axially connected respectively via the base end portions thereof to the upper ends of supporting brackets 24, in an upwardly and downwardly movable fashion, a connecting pipe 302 which couples this pair of lift arms 301 together in a parallel state at a position slightly towards the base end portions of the lift arms 301 from the curved portions thereof, and a fork unit 303 connected axially between the front end portions of the aforementioned pair of lift arms 301 in a swingable manner about a horizontal axis linking these respective front end portions, lift cylinder actuators 304 being provided respectively between a position on each lift arm 301 slightly towards the front end portion thereof from the curved portion thereof and each supporting bracket 24, and dump cylinder actuators being provided respectively between the connecting pipe 302 and the two end portions of the fork unit 303, in positions to the inside of the respective lift arms 301.

In this fork operating unit 300, by driving the lift cylinder actuators 304, the lift arms 301 can be moved upwards and downwards about a horizontal axis with respect to the central swiveling unit 20, and by driving the dump cylinder actuators 305, the fork unit 303 can be caused to swing about an axis parallel to the aforementioned horizontal axis, with respect to the lift arms 301.

With the exception of the root-cutting excavator tool 290 and the fork operating unit 300, the composition relating to the lower traveling unit 10, central swiveling unit 20, upper swiveling unit 30, and the upper and lower swiveling circles 40, 60 and upper and lower hydraulic swiveling motors 90, 100, and also the composition relating to the installation of hydraulic piping from the two-stage swivel joint 110 to the fork operating unit 300 inside the central swiveling unit 20 are similar to the corresponding compositions in the work machine according to the first embodiment, and therefore similar labels have been given to these parts only, and detailed descriptions thereof have been omitted.

In the work machine according to the ninth embodiment having the foregoing composition, since the central swiveling unit 20 supporting the fork operating unit 300 and the upper swiveling unit 30 supporting the root-cutting excavator tool 290 can be swivelled respectively and independently about a common swiveling axis a with respect to the lower traveling unit 10, the fork operating unit 300 and the root-cutting excavator tool 290 can be orientated in any desired direction, regardless of the orientation of the lower traveling unit 10.

Therefore, according to the work machine described above, it is possible to carry out coordinated operations as illustrated in FIG. 30, for example, wherein a tree WD is dug out by means of the root-cutting excavator tool 290 and the extracted tree WD is then loaded directly to the container of a truck located in a desired direction by means of the fork operating unit 300.

Moreover, by causing the central swiveling unit 20 and upper swiveling unit 30 to swivel with respect to the lower traveling unit 10, trees WD standing about the lower traveling unit 10 can be dug up successively without moving the lower traveling unit 10 in any way, thereby allowing working efficiency to be improved dramatically.

Here, if the extracted trees WD are to be transported in a state where they have been loaded into the container of a truck, then usually these trees WD are held in a horizontal state in order to reduce their height.

However, in order to prevent drying, a large amount of earth is included in the root sections of the extracted trees WD, in other words, the weight of the root sections is very much greater than the weight of the upper sections, and hence the trees WD are difficult to load into the truck container in a horizontal state.

Figure 31:
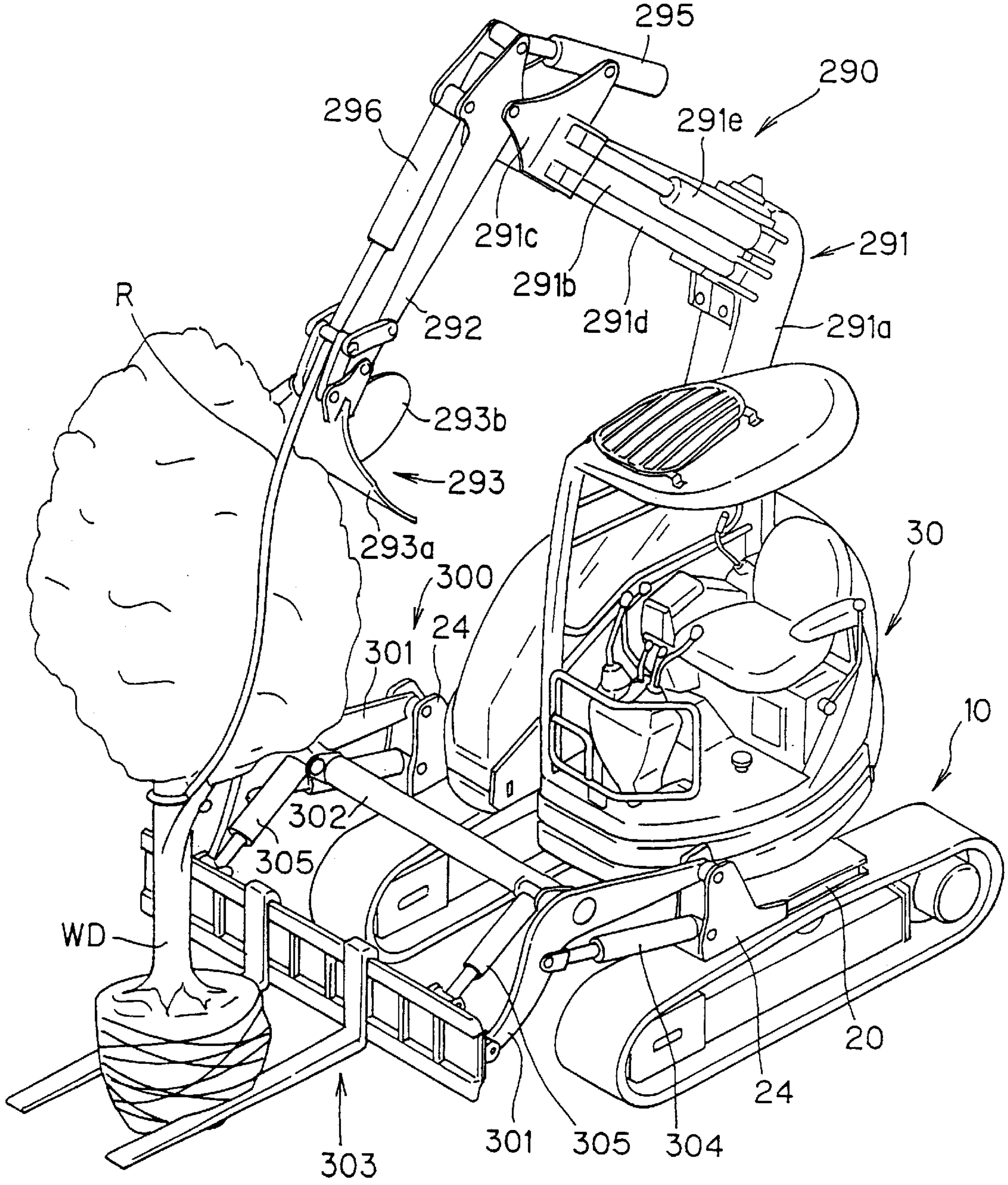
FIG. 31 is an oblique view showing an applicational mode of the work machine illustrated in FIG. 29.

In this respect, according to the work machine described above, as illustrated in FIG. 31, the root section of an extracted tree WD can be positioned on the work unit 303 of the fork operating unit 300, whilst the upper portion of the tree WD is tied to the root-cutting excavator tool 290 by means of a rope R, and by causing the upper swiveling unit 30 and the central swiveling unit 20 to swivel from this state in mutually opposite directions with respect to the lower traveling unit 10, the tree WD can be held in a horizontal state whilst resting on the fork operating unit 300, whereupon, by driving the lift cylinder actuators 304 and dump cylinder actuators 305 appropriately whilst holding the relative position of the fork operating unit 300 and the root-cutting excavator tool 290, the tree WD can be loaded into the truck container whilst being held in this horizontal state.

In this ninth embodiment, similarly to the sixth embodiment, the swiveling axes of the central swiveling unit 20 and the upper swiveling unit 30 do not necessarily have to coincide.

Figure 32:
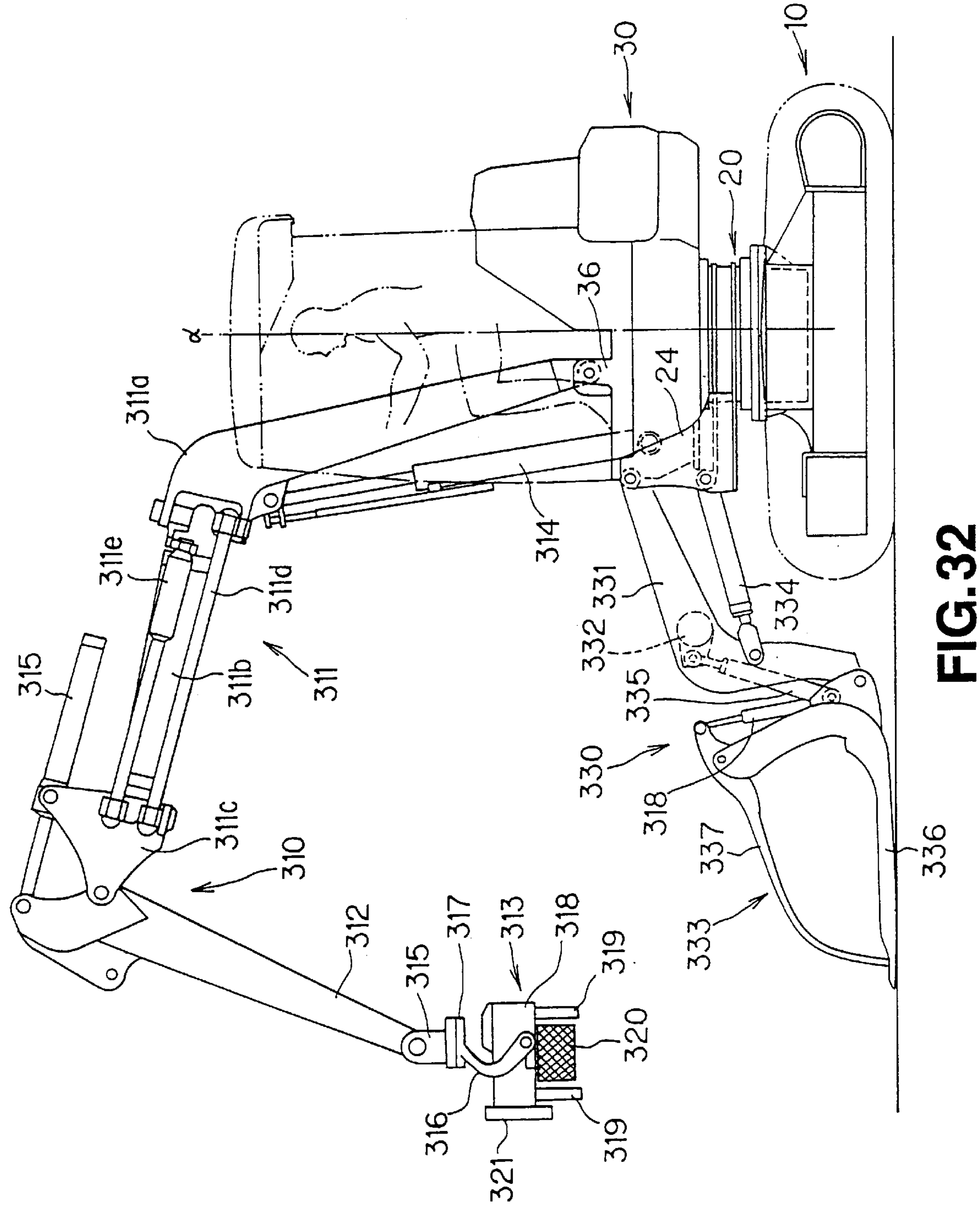
FIG. 32 is a side view showing a tenth embodiment of a work machine relating to the present invention.
Figure 33:
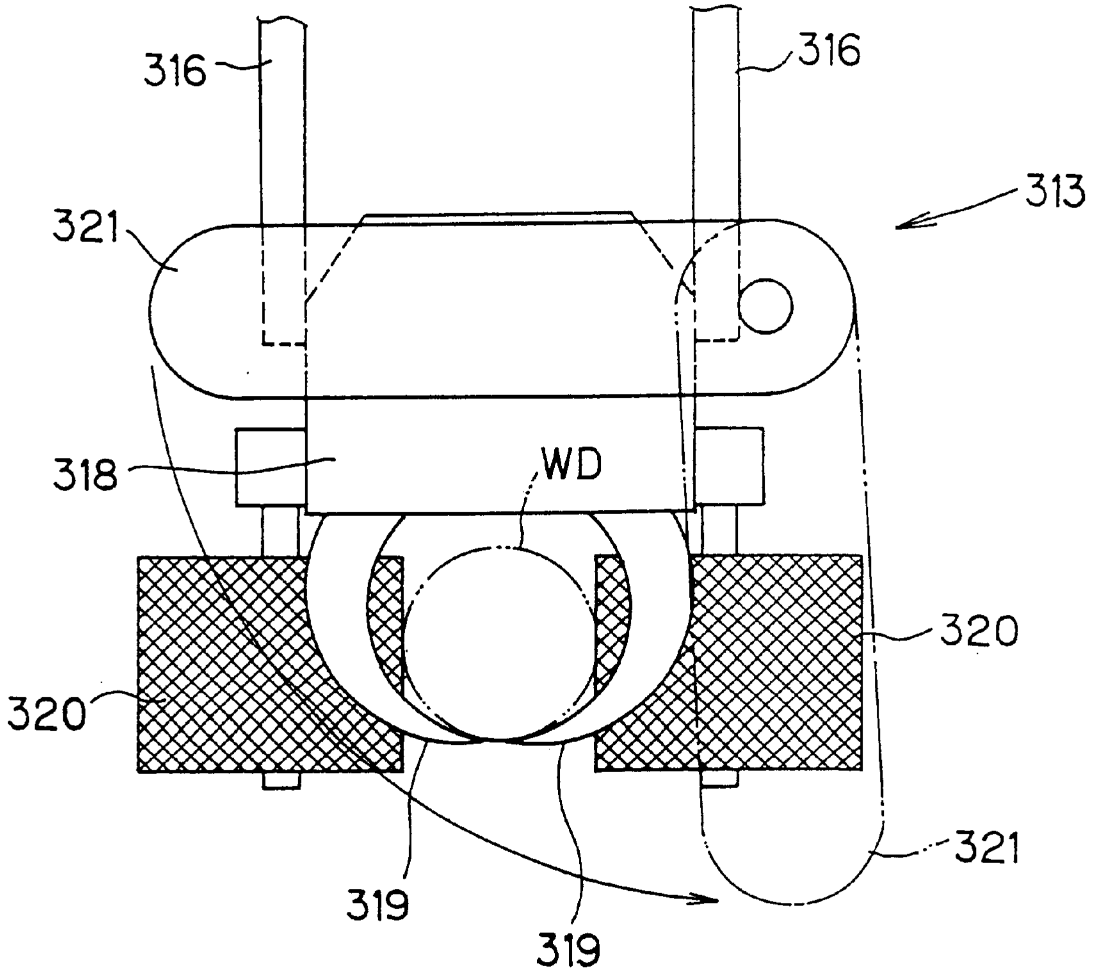
FIG. 33 is a conceptual diagram of a grapple harvester employed as a second operating unit of the work machine illustrated in FIG. 32.
Figure 34:
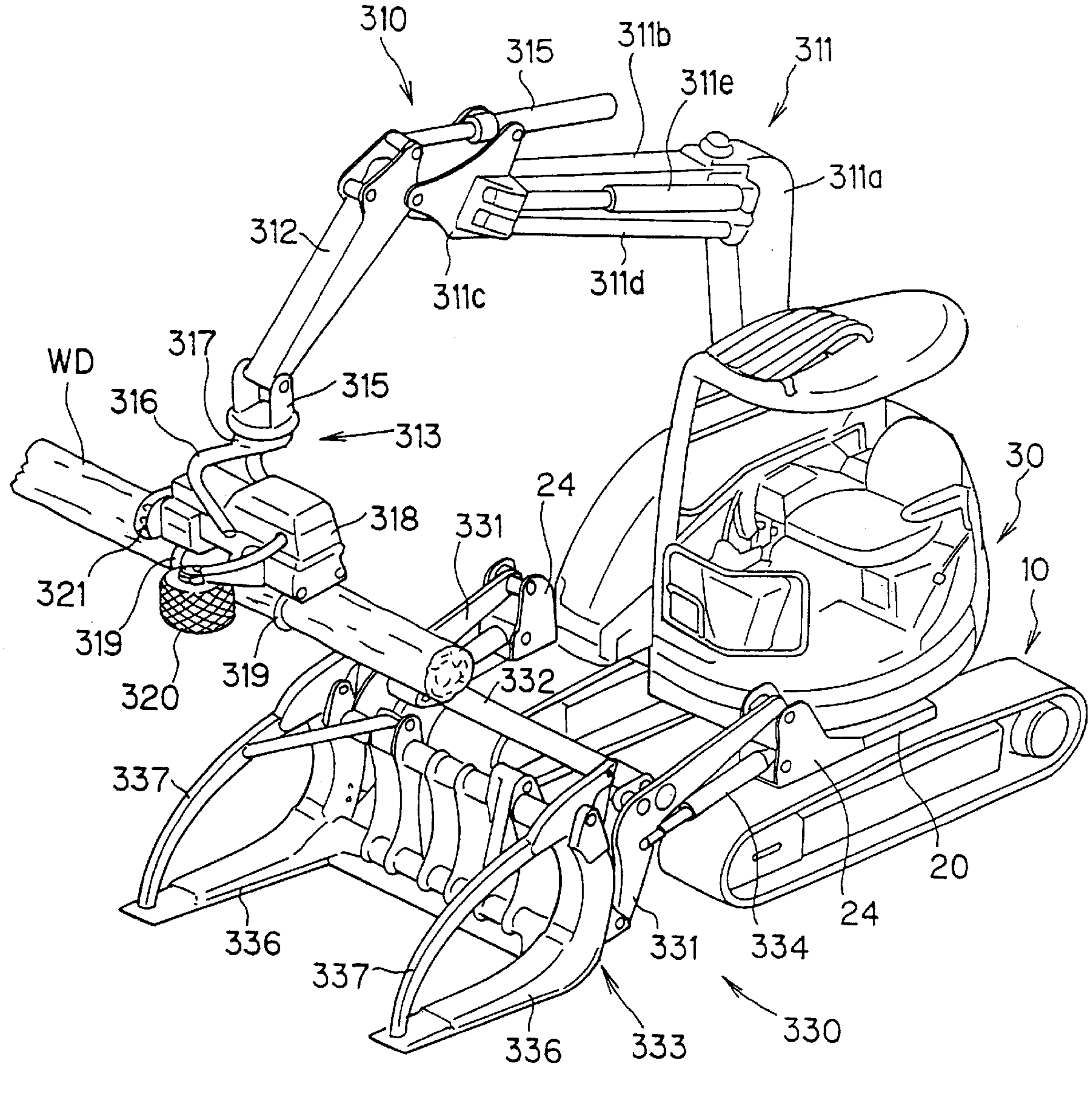
FIG. 34 is an oblique view showing an applicational mode of the work machine illustrated in FIG. 32.

FIG. 32, FIG. 33 and FIG. 34 illustrate a work machine according to a tenth embodiment, wherein a tree processing operating unit (second operating unit) 310 is supported on the upper swiveling unit 30 in place of the excavating operating unit 80 of the work machine described in the first embodiment, and a fork operating unit (first operating unit) 330 is supported on the central swiveling unit 20 in place of the loading operating unit 50.

In the work machine according to this tenth embodiment, the tree processing operating unit 310 is constituted by priding a boom 311 having an approximate L shape, wherein the front end portion thereof curves downwards when the base end portion thereof is positioned horizontally, which is connected axially via the aforementioned base end portion to an upper supporting bracket 36 in an upwardly and downwardly movable fashion, an arm 312 connected axially to the front end portion of the boom 311 in a swingable manner about a horizontal axis, and a grapple harvester 313 connected axially to the front end portion of the arm 312 in a swingable manner about a horizontal axis, a boom cylinder actuator 314 being provided between the curved portion of the boom 311 and the upper supporting bracket 36, and an arm cylinder actuator 315 being provided between the front end portion of the boom 311 and the base end portion of the arm 312.

As illustrated in FIG. 32 and FIG. 33, the grapple harvester 313 comprises a holding bracket section 315 supported swingably on the front end portion of the arm 312, a finger bracket section 317 comprising two fingers 316, which is supported on the holding bracket section 315 rotatably about an axis perpendicular to the swinging axis of the holding bracket 315 section, a harvester main unit 318 having a rectangular shape, which is axially connected in a swingable fashion between the pair of fingers 316 in the finger bracket section 317, a pair of grapple hands 319 provided respectively at either end of the lower face of the harvester main unit 318, a felled tree WD being holdable between these grapple hands 319 by means of a respective opening and closing action thereof, a pair of feeder rollers 320 positioned between the pair of grapple hands 319 on either side of the harvester main unit 318 and held under pressure acting in mutually approaching directions, and a chain saw 321 provided swingably at one end face of the harvester main unit 318.

In this grapple harvester 313, by driving the feeder rollers 320 in a state where a tree WD is held between the pair of grapple hands 319, a feed is applied to the tree WD, and by causing the chain saw 321 to swing when the feed applied to the tree WD by the feeder rollers 320 has reached a prescribed length, the tree WD can be cut successively to a prescribed length.

In the tree processing operating unit 310 described above, by driving the boom cylinder actuator 314, the boom 311 can be caused to move upwards and downwards about a horizontal axis with respect to the upper swiveling unit 30, and by driving the arm cylinder actuator 315, the arm 312 can be caused to swing about an axis parallel to the aforementioned horizontal axis with respect to the boom 311.

In the tree processing operating unit 310, the aforementioned boom 311 is divided into three sections, namely, in order from the base end portion thereof, a first boom section 311*a*, a second boom section 311*b* and a third boom section 311*c*, and moreover, by supporting a link rod 311*d* which is parallel to the second boom section 311*b* between the first boom section 311*a* and the third boom section 311*c*, a parallel link is constituted between the first boom section 311*a* and the third boom section 311*c* by means of the second boom section 311*b* and the link rod 311*d*. Furthermore, an offset cylinder actuator 311*e* is provided between the base end portion of the second boom section 311*b* and the third boom section 311*c*, and by driving this offset cylinder actuator 311*e*, it is possible to offset the arm 312 and subsequent members to the left or light with respect to the first boom section 311*a*; without altering the orientation of the grapple harvester 313.

In the tree processing operating unit 310 described above, by respectively extending the boom cylinder actuator 314 and the arm cylinder actuator 315, the boom 311, arm 312 and grapple harvester 313 can each be positioned respectively within the maximum turning circle of the upper swiveling unit 30, similarly to the work machine described in the first embodiment.

On the other hand, in the work machine according to the tenth embodiment, a fork operating unit 330 is constituted by providing a pair of lift arms 331 having an approximate L shape, wherein the front end portion thereof curves downwards when the base end portion thereof is positioned horizontally, which are axially connected respectively via the base end portions thereof to the upper ends of supporting brackets 24, in an upwardly and downwardly movable fashion, a connecting pipe 332 which couples this pair of lift arms 331 together in a parallel state at a position slightly towards the base end portions of the lift arms 331 from the curved portions thereof, and a log fork unit 333 connected axially between the front end portions of the aforementioned pair of lift arms 331 in a swingable manner about a horizontal axis linking these respective front end portions, lift cylinder actuators 334 being provided respectively between a position on each lift arm 331 slightly towards the front end portion thereof from the curved portion thereof and each supporting bracket 24, and dump cylinder actuators being provided respectively between the connecting pipe 332 and the two end portions of the log fork unit 333, in positions to the inside of the respective lift arms 331.

The log fork unit 333 comprises a pair of fork blades 336 having an approximate L shape, a pair of pressing blades 337 provided openably and closably with respect to the fork blades 336, and a pair of fork cylinder actuators 338 for opening and closing these pressing blades 337 with respect to the fork blades 336.

In this fork operating unit 330, by driving the lift cylinder actuators 334, the lift arms 331 can be moved upwards and downwards about a horizontal axis with respect to the central swiveling unit 20, and by driving the dump cylinder actuators 335, the log fork unit 333 can be caused to swing about an axis parallel to the aforementioned horizontal axis with respect to the lift arms 331.

With the exception of the tree processing operating unit 310 and the fork operating unit 330, the composition relating to the lower traveling unit 10, central swiveling unit 20, upper swiveling unit 30, and the upper and lower swiveling circles 40, 60 and upper and lower hydraulic swiveling motors 90, 100, and also the composition relating to the installation of hydraulic piping from the two-stage swivel joint 110 to the fork operating unit 330 inside the central swiveling unit 20 are similar to the corresponding compositions in the work machine according to the first embodiment, and therefore similar labels have been given to these parts only, and detailed descriptions thereof have been omitted.

In the work machine according to the tenth embodiment having the foregoing composition, since the central swiveling unit 20 supporting the fork operating unit 330 and the upper swiveling unit 30 supporting the tree processing operating unit 310 can be swivelled respectively and independently about a common swiveling axis a with respect to the lower traveling unit 10, the fork operating unit 330 and the tree processing operating unit 310 can be orientated in any desired direction, regardless of the orientation of the lower traveling unit 10.

Therefore, according to the work machine described above, it is possible to carry out coordinated operations as illustrated in FIG. 34, for example, wherein a tree cut successively into prescribed lengths by means of the grapple harvester 313 in the tree processing operating unit 310 are transferred directly into the fork operating unit 330, and these tree portions are then loaded into the container of a dump truck positioned in a desired direction, thereby allowing working efficiency to be improved dramatically.

Figure 35:
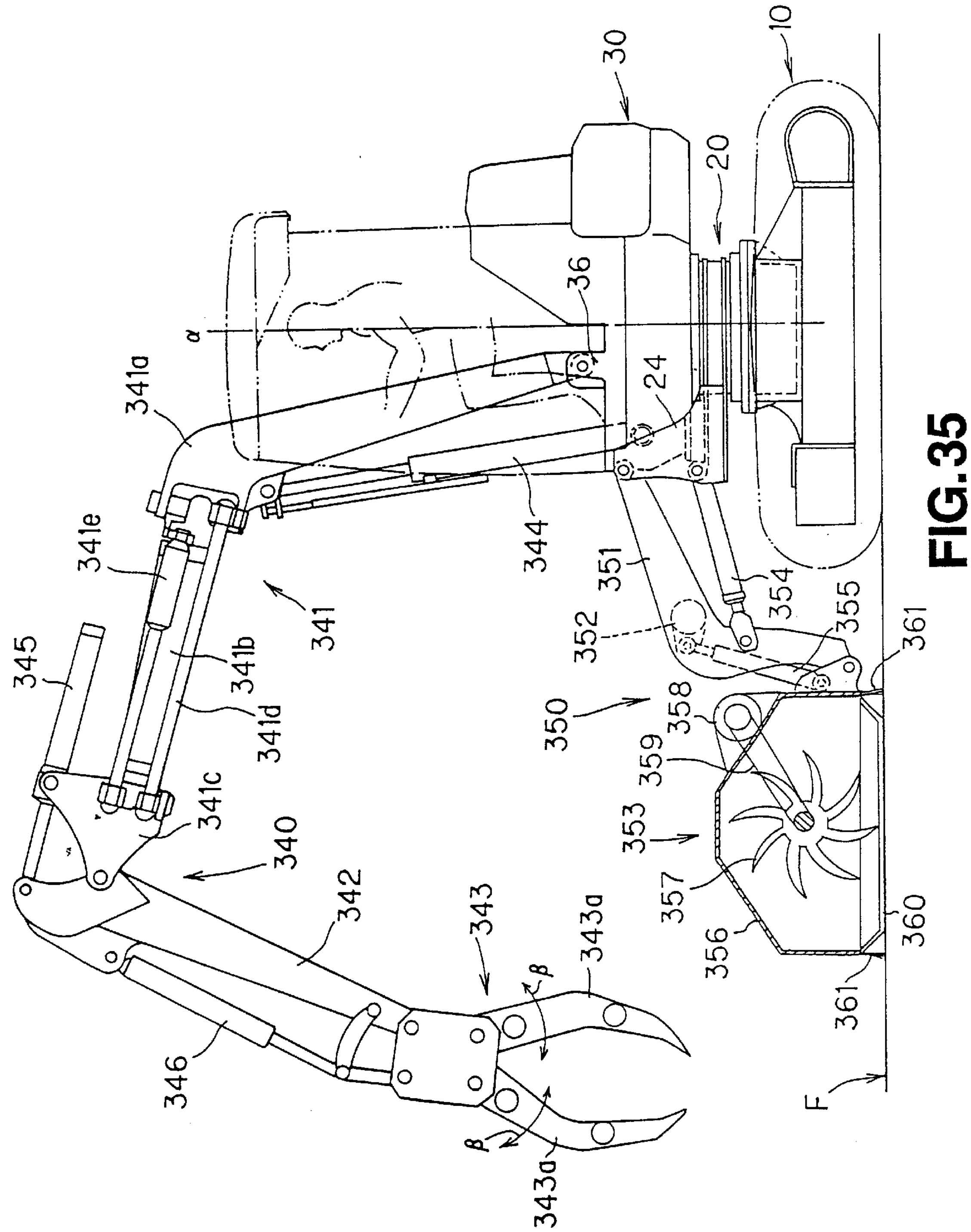
FIG. 35 is a side view showing an eleventh embodiment of a work machine relating to the present invention.
Figure 36:
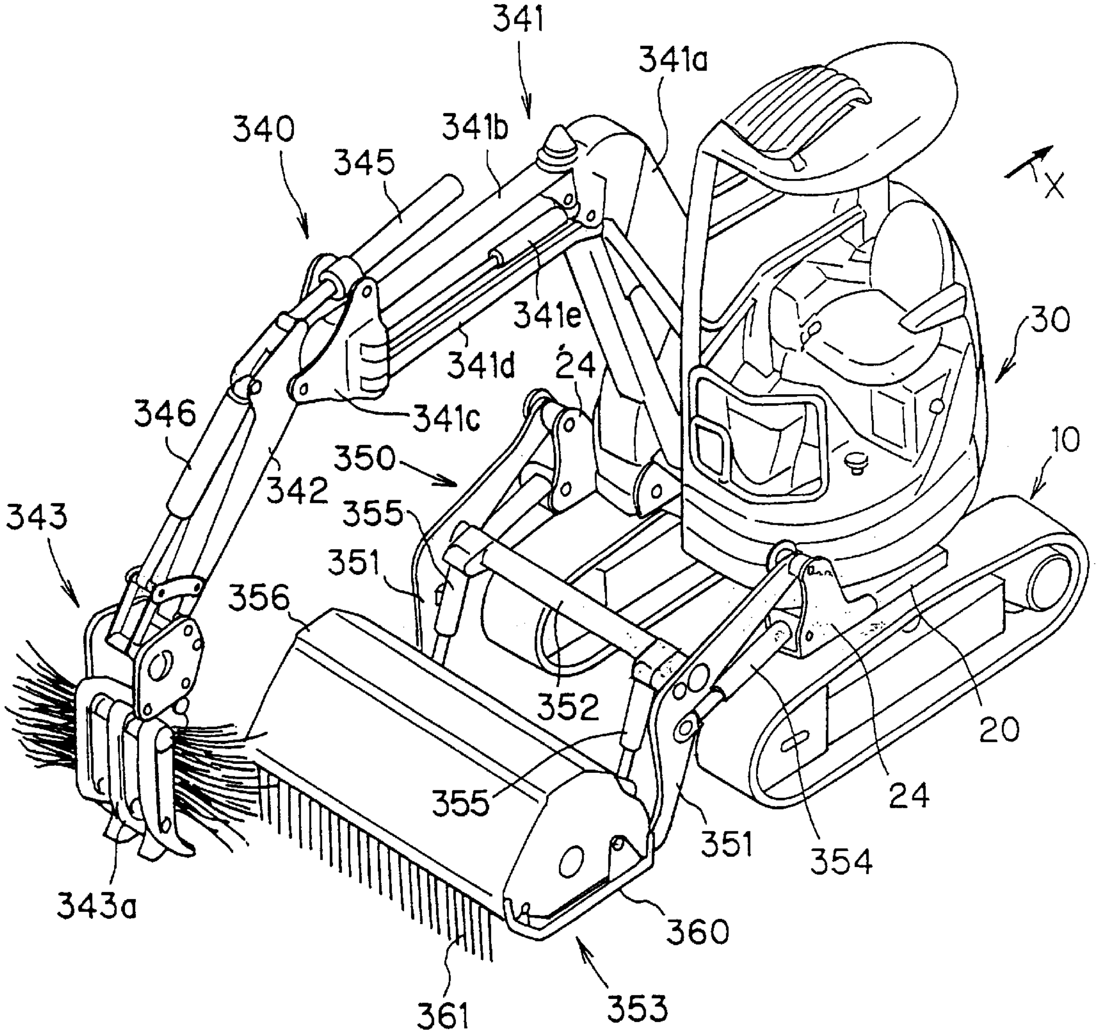
FIG. 36 is an oblique view of an applicational mode of the work machine illustrated in FIG. 35.

FIG. 35 and FIG. 36 illustrate a work machine according to an eleventh embodiment, wherein a grapple operating unit (second operating unit) 340 is supported on the upper swiveling unit 30 in place of the excavating operating unit 80 in the work machine described in the first embodiment, and a grass cutting operating unit (first operating unit) 350 is supported on the central swiveling unit 20 in place of the loading operating unit 50.

In the work machine according to this eleventh embodiment, the grapple operating unit 340 is constituted by providing a boom 341 having an approximate L shape, wherein the front end portion thereof curves downwards when the base end portion thereof is positioned horizontally, which is connected axially via the aforementioned base end portion to an upper supporting bracket 36 in an upwardly and downwardly movable fashion, an arm 342 connected axially to the front end portion of the boom 341 in a swingable manner about a horizontal axis, and a grapple hand 343 connected axially to the front end portion of the arm 342 in a swingable manner about a horizontal axis, a boom cylinder actuator 344 being provided between the curved portion of the boom 341 and the upper supporting bracket 36, an arm cylinder actuator 345 being provided between the front end portion of the boom 341 and the base end portion of the arm 342, and a hand cylinder actuator 346 being provided between the base end portion of the arm 342 and the grapple hand 343.

The grapple hand 343 grips objects by means of a pair of fingers 343*a* opening and closing with respect to each other (as indicated by arrow b in FIG. 35).

In this grapple operating unit 340, by driving the boom cylinder actuator 344, the boom 341 can be moved upwards and downwards about a horizontal axis with respect to the upper swiveling unit 30, by driving the arm cylinder actuator 345, the arm 342 can be caused to swing about an axis parallel to the aforementioned horizontal axis, with respect to the boom 341, and by driving the hand cylinder actuator 346, the grapple hand 343 can be caused to swing about an axis parallel to the aforementioned horizontal axis, with respect to the arm 342.

In the grapple operating unit 340, the aforementioned boom 341 is divided into three sections, namely, in order from the base end portion thereof, a first boom section 341*a*, a second boom section 341*b* and a third boom section 341*c*, and moreover, by supporting a link rod 341*d* which is parallel to the second boom section 341*b* between the first boom section 341*a* and the third boom section 341*c*, a parallel link is constituted between the first boom section 341*a* and the third boom section 341*c* by means of the second boom section 341*b* and the link rod 341*d*. Furthermore, an offset cylinder actuator 341*e* is provided between the base end portion of the second boom section 341*b* and the third boom section 341*c*, and by driving this offset cylinder actuator 341*e*, it is possible to offset the arm 342 and subsequent members to the left or right with respect to the first boom section 341*a*, without altering the orientation of the grapple hand 343.

In the grapple operating unit 340 described above, by respectively extending the boom cylinder actuator 344, the arm cylinder actuator 345 and the hand cylinder actuator 346, the boom 341, arm 342 and grapple hand 343 can each be positioned respectively within the maximum turning circle of the upper swiveling unit 30, similarly to the work machine described in the first embodiment.

On the other hand, in the work machine according to the eleventh embodiment, a grass cutting operating unit 350 is constituted by providing a pair of lift arms 351 having an approximate L shape, wherein the front end portion thereof curves downwards when the base end portion thereof is positioned horizontally, which are axially connected respectively via the base end portions thereof to the upper ends of supporting brackets 24, in an upwardly and downwardly movable fashion, a connecting pipe 352 which couples this pair of lift arms 351 together in a parallel state at a position slightly towards the base end portions of the lift arms 351 from the curved portions thereof, and a grass cutting unit 353 connected axially between the front end portions of the aforementioned pair of lift arms 351 in a swingable manner about a horizontal axis linking these respective front end portions, lift cylinder actuators 354 being provided respectively between a position on each lift arm 351 slightly towards the front end portion thereof from the curved portion thereof and each supporting bracket 24, and dump cylinder actuators being provided respectively between the connecting pipe 352 and the two end portions of the grass cutting unit 353, in positions to the inside of the respective lift arms 351.

The grass cutting unit 353 comprises a hammer knife 357 provided rotatably inside a box 356 having an opening in the under side thereof, a grass cutting hydraulic motor 358 provided in the aforementioned box 356, a drive chain 359 coupling the grass cutting hydraulic motor 358 with the shaft portion of the hammer knife 357, a guide pipe 360 projecting in a downward direction from either end of the aforementioned box 356, and chains 361 suspended from the lower edges of the front and rear ends of the aforementioned box 356. By driving the grass cutting hydraulic motor 358, the hammer knife is caused to rotate via the drive chain 359 and by causing the aforementioned box 356 to move from this state whilst holding the guide pipe 360 is contact with the ground surface F, grass cutting on the ground surface F is carried out.

In this grass cutting operating unit 350, by driving the lift cylinder actuators 354, the lift arms 351 are caused to move upwards and downwards about a horizontal axis with respect to the central swiveling unit 20, and by driving the dump cylinder actuators 355, the grass cutting unit 353 is caused to swing about an axis parallel to the aforementioned horizontal axis with respect to the lift arms 351.

Moreover, with the exception of the grapple operating unit 340 and the grass cutting operating unit 350, the composition relating to the lower traveling unit 10, central swiveling unit 20, upper swiveling unit 30, and the upper and lower swiveling circles 40, 60 and upper and lower hydraulic swiveling motors 90, 100, and also the composition relating to the installation of hydraulic piping from the two-stage swivel joint 110 to the grass cutting operating unit 350 inside the central swiveling unit 20 are similar to the corresponding compositions in the work machine according to the first embodiment, and therefore similar labels have been given to these parts only, and detailed descriptions thereof have been omitted.

In the work machine according to the eleventh embodiment having the foregoing composition, since the central swiveling unit 20 supporting the grass cutting operating unit 350 and the upper swiveling unit 30 supporting the tree processing operating unit 340 can be swivelled respectively and independently about a common swiveling axis a with respect to the lower traveling unit 10, the grass cutting operating unit 350 and the grapple operating unit 340 can be orientated in any desired direction, regardless of the orientation of the lower traveling unit 10.

Therefore, according to the work machine described above, it is possible to carry out coordinated operations as illustrated in FIG. 36, for example, wherein grass cut by the grass cutting operating unit 350 is directly picked up by the fingers 343*a* of the grapple operating unit 340 and the picked up grass is then loaded into the container of a dump truck positioned in any direction, thereby allowing working efficiency to be improved dramatically. In this case, desirably the aforementioned grass cutting operation is carried out whilst reversing the lower traveling unit 10, as indicated by the arrow X in FIG. 36.

Figure 37:
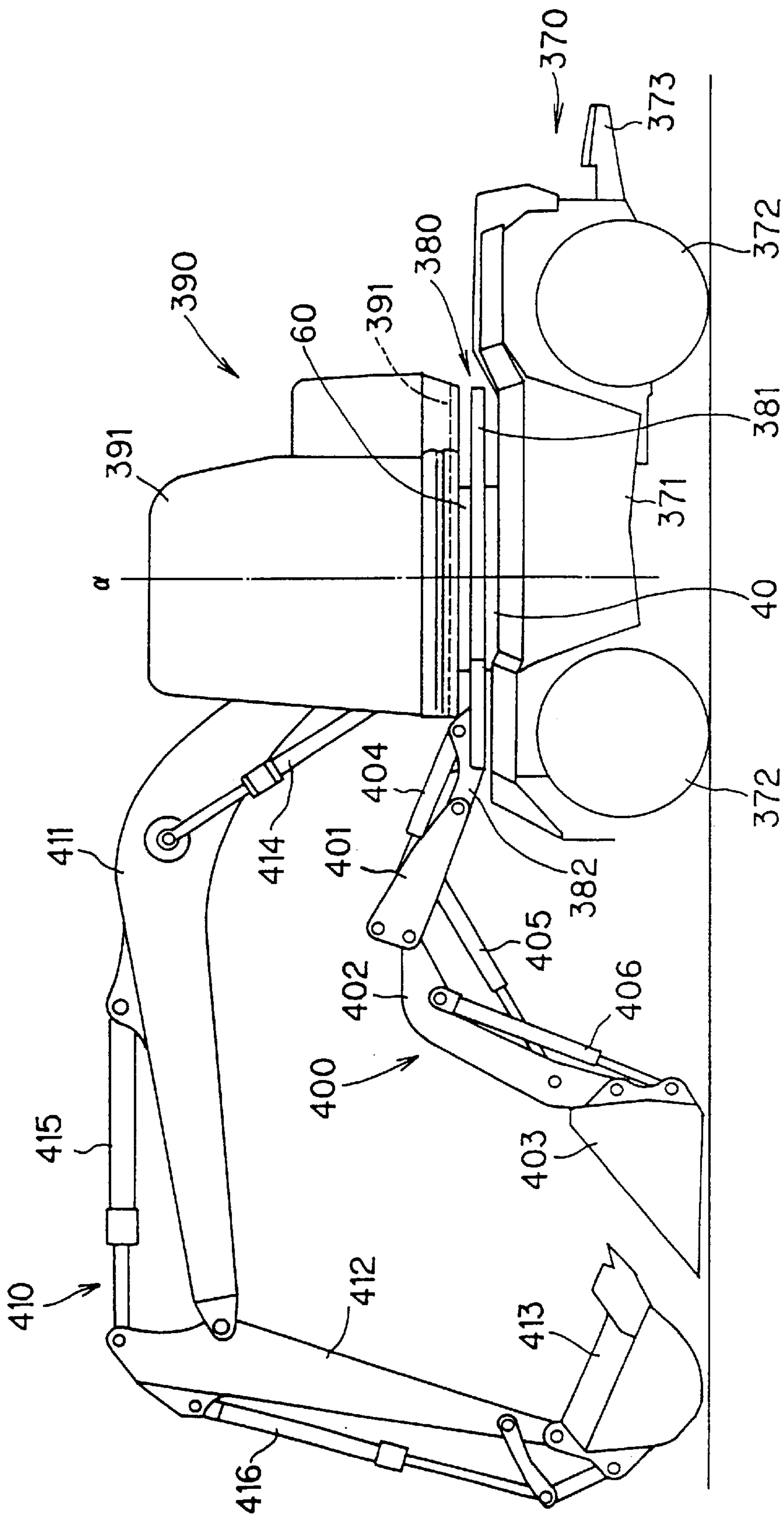
FIG. 37 is a side view showing a twelfth embodiment of a work machine relating to the present invention.
Figure 38:
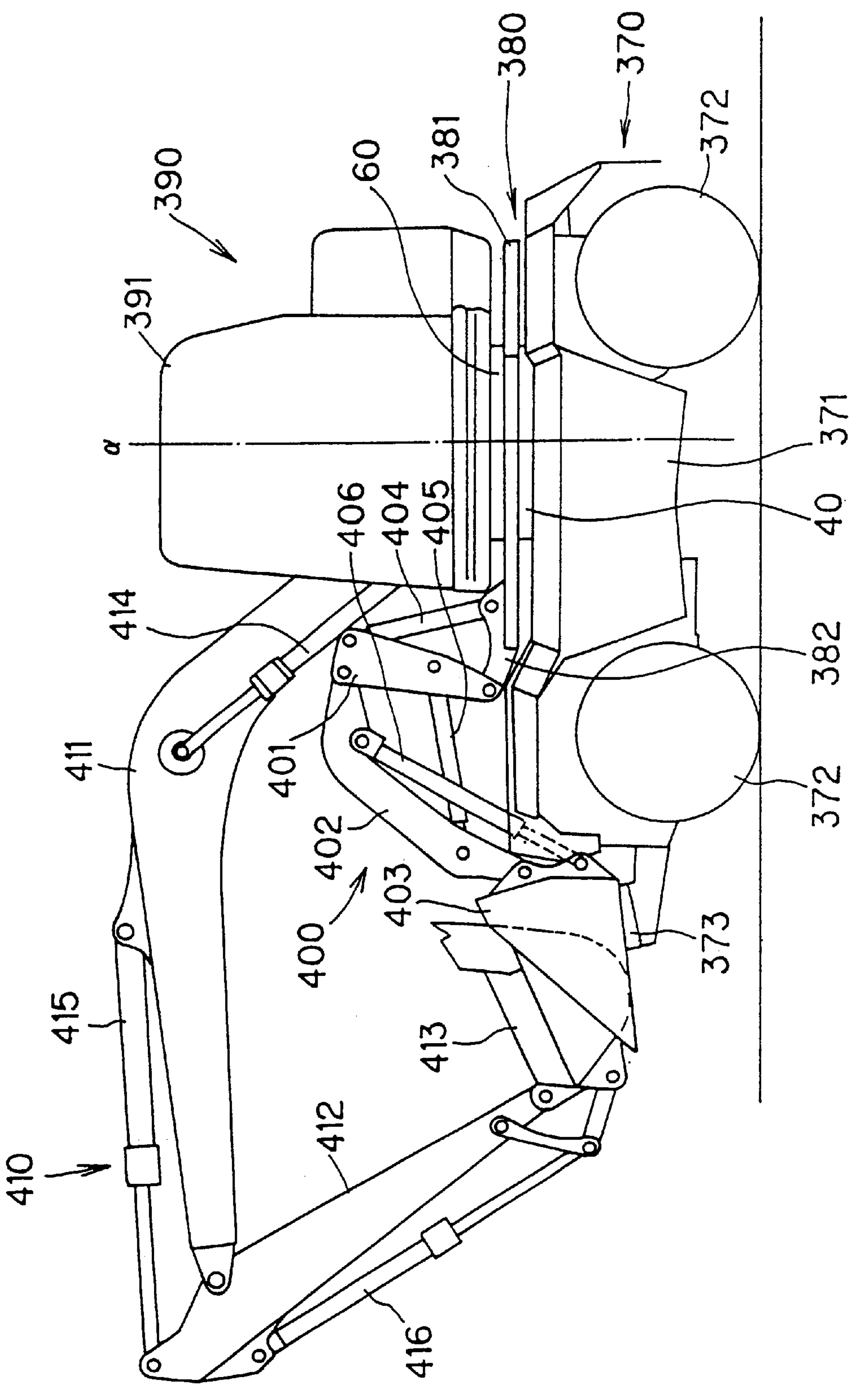
FIG. 38 is a side view illustrating the work machine shown in FIG. 37 in a state where the loading bucket in the first operating unit has been brought to a position adjacent to the traveling base.

FIG. 37 and FIG. 38 show conceptual views of a twelfth embodiment of a work machine relating to the present invention, which comprises a lower traveling unit (traveling base) 370, a central swiveling unit (first swiveling base) 380, and an upper swiveling unit (second swiveling base) 390.

The lower traveling unit 370 is provided with wheels 372 respectively at the four corner portions of a truck frame 371, and by driving a hydraulic traction motor (not illustrated) provided inside the aforementioned truck frame 371, the unit can be made to travel via the respective wheels 372.

The central swiveling unit 380 comprises a plate-shaped frame section 381, which is installed on top of the aforementioned lower traveling unit 370, in a state where a lower-stage swiveling circle 40 is positioned between the frame section 381 and the lower traveling unit 370.

Although not shown in the diagrams, the lower-stage swiveling circle 40 has the same composition as the first embodiment, and it performs the action of supporting the central swiveling unit 380 on the lower traveling unit 370 in such a manner that the central swiveling unit 380 and the lower traveling unit 370 are able to swivel through 360° with respect to each other about a swiveling axis a running in a vertical direction.

As the diagrams reveal, the central swiveling unit 380 comprises supporting brackets 382 on either side of one end portion of the frame section 381, and a loading operating unit (first operating unit) 400 is supported via these supporting brackets 382.

The loading operating unit 400 is constituted by providing a pair of first lift arms 401 axially connected respectively via the base end portions thereof to the front end portions of the supporting brackets 382, in an upwardly and downwardly movable fashion, a pair of second lift arms 402 supported on the front end portions of the respective first lift arms 401, in a swingable manner about a horizontal axis, and a loading bucket 403 connected axially between the front end portions of the first lift arms 401 in a swingable manner about a horizontal axis linking the aforementioned front end portions, lift cylinder actuators 404 being provided respectively between the front end portions of the first lift arms 401 and the base end portions of the supporting brackets 382, arm extension cylinder actuators 405 being provided respectively between the middle portion of each of the first lift arms 401 and a position towards the front end of each of the second lift arms 402, and dump cylinder actuators 406 being provided respectively between positions on each of the second lift arms 402 towards the base ends thereof and the two end portions of the loading bucket 403.

In this loading operating unit 400, by driving the lift cylinder actuators 404, the first lift arms 401 can be moved upwards and downwards about a horizontal axis with respect to the central swiveling unit 380, by driving the dump cylinder actuators 406, the loading bucket 403 can be caused to swing about an axis parallel to the aforementioned horizontal axis with respect to the second lift arms 402, and by driving the arm extension lift arms 402, the first lift arms 401 and the second lift arms 402 can be made to extend and contract, mutually, and the loading bucket 403 supported between the front end portions of the aforementioned second lift arms can be moved towards, or away from, the lower traveling unit 370.

The upper swiveling unit 390 comprises a base plate 391 extending in the horizontal direction, which is installed on top of the aforementioned central swiveling unit 380 in a state where an upper-stage swiveling circle 60 is provided between the base plate 391 and the central swiveling unit 380.

Similarly to the lower-stage swiveling circle 40, the upper-stage swiveling circle 60 has a similar composition to that in the first embodiment, and it performs the action of supporting the upper swiveling unit 390 on the central swiveling unit 380 in a state where the upper swiveling unit 390 and the central swiveling unit 380 are able to swivel through 360° with respect to each other about a swiveling axis a running in a vertical direction.

Although not shown in the diagrams, an upper supporting bracket (not illustrated) is provided on the upper swiveling unit 390 in a position to the side of the cabin 391, and an excavating operating unit (second operating unit) 410 is supported by means of this upper supporting bracket (not illustrated).

The excavating operating unit 410 is constituted by providing a boom 411 having an approximate L shape, wherein the front end portion thereof curves downwards when the base end portion thereof is positioned horizontally, which is connected axially via the aforementioned base end portion to the upper supporting bracket (not illustrated) in an upwardly and downwardly movable fashion, an arm 412 connected axially to the front end portion of the boom 411 in a swingable manner about a horizontal axis, and an excavating bucket 413 connected axially to the front end portion of the arm 412 in a swingable manner about a horizontal axis, a boom cylinder actuator 414 being provided between the curved portion of the boom 411 and the upper supporting bracket (not illustrated), an arm 412 cylinder actuator being provided between the curved portion of the boom 411 and the base end portion of the arm 412, and a bucket cylinder actuator 416 being provided between the base end portion of the arm 412 and the excavating bucket 413.

In this excavating operating unit 410, by driving the boom cylinder actuator 414, the boom 411 can be moved upwards and downwards about a horizontal axis with respect to the upper swiveling unit 390, by driving the arm cylinder actuator 415, the arm 412 can be caused to swing about an axis parallel to the aforementioned horizontal axis, with respect to the boom 411, and by driving the bucket cylinder actuator 416, the excavating bucket 413 can be caused to swing about an axis parallel to the aforementioned horizontal axis, with respect to the arm 412.

With the exception of the foregoing, the composition of this twelfth embodiment is the same as that of the work machine according to the first embodiment, and hence detailed description thereof has been omitted here.

In the work machine according to the twelfth embodiment described above, since the central swiveling unit 380 supporting the excavating operating unit 410 and the upper swiveling unit 390 supporting the loading operating unit 400 can be swivelled independently and respectively about a common swiveling axis a with respect to the lower traveling unit 370, the excavating operating unit 410 and the loading operating unit 400 can be orientated in any direction, regardless of the orientation of the lower traveling unit 370.

Therefore, according to the operating unit described above, coordinated operations can be carried out, whereby soil excavated by the excavating operating unit 410 or earth and snow swept up from a restricted space is transferred directly to the loading operating unit 400, and this soil or snow is then loaded into the container of a dump truck positioned in any desired direction, thereby allowing working efficiency to be improved dramatically.

Moreover, as stated previously, the foregoing work machine has excellent manoeuvrability, since the lower traveling unit 370 travels by means of wheels 372, in addition to which, as illustrated in FIG. 38, the loading bucket 403, which is a heavy item, can be brought to a position adjacent to a holding platform 373 of the lower traveling unit 370 by retracting the arm extension cylinder actuators 405, and moreover the excavating bucket 413 can be positioned over the loading bucket 403 by driving the boom cylinder actuator 414, the arm cylinder actuator 415 and the bucket cylinder actuator 416, appropriately, thereby giving the work machine a compact shape, and hence making it possible to ensure satisfactory stability during movement of the lower traveling unit 370 and also dramatically improving manoeuvrability in cases where, for example, the work machine is used as a snow-removing machine.

What is claimed is:

1. A work machine character in that it comprises:

a first swiveling base installed rotatably about a prescribed swiveling axis on an upper portion of a traveling base;

a first operating unit supported on the first swiveling base;

a second swiveling base installed rotatably about the swiveling axis on an upper portion of the first swiveling base;

a second operating unit supported on the second swiveling base;

first swivel driving means, provided between the traveling base and the first swiveling base, for driving the traveling base and the first swiveling base in rotation with respect to each other;

second swivel driving means, provided between the first swiveling base and the second swiveling base, for driving the first and second swiveling bases in rotation with respect to each other;

a first swivel joint extending inside the traveling base and the first swiveling base in a state where a central axis thereof coincides with the swiveling axis, whereby hydraulic pressure fluid can be supplied to respective hydraulic circuits of the traveling base and the first swiveling base; and a second swivel joint extending inside the first swiveling base and the second swiveling base in a state where a central axis thereof coincides with the swiveling axis, whereby hydraulic pressure fluid can be supplied to respective hydraulic circuits of the first swiveling base and the second swiveling base.

2. The work machine according to claim 1, characterized in that the first operating unit is an outrigger device and the second operating unit is a crane operating unit.

3. The work machine according to claim 1, characterized in that the first operating unit is a fork operating unit provided with a fork and the second operating unit is a grapple operating unit provided with a hand.

4. The work machine according to claim 1, characterized in that the first operating unit is a fork operating unit provided with a fork and the second operating unit is a crane operating unit.

5. The work machine according to claim 1, characterized in that the first operating it is a loading operating unit provided with a loading bucket and the second operating unit is an excavating operating unit provided with an excavating bucket.

6. The work machine according to claim 1, characterized in that the first operating unit is a loading operating unit provided with a loading bucket and the second operating unit is a breaking operating unit provided with a breaker.

7. The work machine according to claim 1, characterized in that the first operating unit is a fork operating unit provided with a fork and the second operating unit is a tree processing operating unit provided with a grapple harvester.

8. The work machine according to claim 1, characterized in that the first operating unit is a grass cutting operating unit provided with a grass cutting unit and the second operating unit is a grapple operating unit provided with a hand.

9. The work machine according to claim 1, characterized in that the first operating unit is a cutting operating unit provided with a cutter and the second operating unit is a grapple operating unit provided with a hand.

10. The work machine according to claim 1, characterized in that the first operating unit is a gathering operating unit provided with a bucket and the second operating unit is a brush operating unit provided with a brush for brushing up objects into the gathering operating unit.

11. The work machine according to claim 1, characterized in that the first operating unit is a clamp operating unit provided with a clamper and the second operating unit is a grapple operating unit provided with a hand.

12. The work machine according to claim 1, characterized in that the first operating unit is a fork operating unit provided with a fork and the second operating unit is an excavating operating unit provided with a root-cutting bucket.

13. The work machine according to claim 1, characterized in that the first operating unit is a loading operating unit comprising:

a pair of lift arms supported via base end portions thereof on the first swiveling base, in an upwardly and downwardly movable fashion;

a loading bucket supported on the pair of lift arms, swingably about a horizontal axis linking front end portions of the pair of lift arms; and a pair of dump cylinder actuators located respectively along the front end portions of the lift arms, in positions to the inside of the respective lift arms, cylinder tubes thereof being supported on the loading bucket and piston rods thereof being supported on the lift arms, whereby the loading bucket can be caused to swing with respect to the lift arms, and the second operating unit is an excavating operating unit provided with an excavating bucket.

14. The work machine according to claim 1, characterized in that the first operating unit is a loading operating unit comprising:

a pair of lift arms supported via base end portions thereof on the first swiveling base, in an upwardly and downwardly movable fashion;

a loading bucket supported on the pair of lift arms, swingably about a horizontal axis linking front end portions of the pair of lift arms; and a pair of dump cylinder actuators located respectively along the front end portions of the lift arms, in positions to the inside of the respective lift arms, cylinder tubes thereof being supported on the loading bucket and piston rods thereof being supported on the lift arms, whereby the loading bucket can be caused to swing with respect to the lift arms, and the second operating unit is a breaking operating unit provided with a breaker.

15. The work machine according to claim 1, characterized in that the first operating unit is a loading operating unit comprising:

a pair of first arms supported via base end portions thereof on the first swiveling base, in an upwardly and downwardly movable fashion;

a pair of second arms supported on respective front end portions of the first arms, swingably about a horizontal axis;

a loading bucket supported on the pair of second arms, swingably about a horizontal axis linking respective front end portions of the second arms; and arm extension cylinder actuators, positioned respectively between the first arms and the second arms, which cause the loading bucket to move towards, or away from, the traveling base, by means of the second arms swinging with respect to the first arms;

the second operating unit is an excavating operating unit provided with an excavating bucket; and the traveling base travels by means of wheels.

16. A work machine characterized in that it comprises:

a first swiveling base installed rotatably about a prescribed swiveling axis on an upper portion of a traveling base;

a first operating unit supported on the first swiveling base;

a second swiveling base installed rotatably about the swiveling axis on an upper portion of the first swiveling base;

a second operating unit supported on the second swiveling base;

first swivel driving means, provided between the traveling base and the first swiveling base, for driving the traveling base and the first swiveling base in rotation with respect to each other;

second swivel driving means, provided between the first swiveling base and the second swiveling base, for driving the first and second swiveling bases in rotation with respect to each other; and a two-stage swivel joint comprising a pair of rotors having respective center holes and a single shaft fitting into the center holes of the rotors, in a rotatable fashion, the two-stage swivel joint extending inside the traveling base, the first swiveling base and the second swiveling base, in a state where a central axis of the shaft is aligned with the swiveling axis, in such a manner that hydraulic pressure fluid can be supplied to respective hydraulic circuits of the traveling base, first swiveling base and second swiveling base via the pair of rotors and the shaft.

17. The work machine according to claim 16, characterized in that the two-stage swivel joint is fixed, in a central portion thereof in an axial direction, to either the traveling base or the first swiveling base.

18. A work machine characterized in that it comprises:

a first swiveling base, installed rotatably about a prescribed swiveling axis on an upper portion of a traveling base, comprising a first major swiveling gearwheel and a second major swiveling gearwheel respectively having centers on the swiveling axis;

a first operating unit supported on the first swiveling base;

a second swiveling base installed rotatably about the swiveling axis on an upper portion of the first swiveling base;

a second operating unit supported on the second swiveling base;

a first swivel drive motor, an output shaft of which is fixed to a first swiveling pinion, which is held on the traveling base in a state where the first swiveling pinion engages with the first major swiveling gearwheel; and a second swivel drive motor, an output shaft of which is fixed to a second swiveling pinion, which is held on the second swiveling base in a state where the second swiveling pinion engages with the second major swiveling gearwheel.

19. A work machine characterized in that it comprises:

a first swiveling base installed rotatably about a prescribed swiveling axis on an upper portion of a traveling base;

a supporting frame section, extending from the first swiveling base in an outward radial direction from the swiveling axis and having an empty space in an inner portion thereof;

a first operating unit supported on the first swiveling base via the supporting frame section;

a hydraulic piping passing through the empty space in the supporting frame section, through which hydraulic coil can be caused to flow to the first operating unit;

a second swiveling base installed rotatably about the swiveling axis on an upper portion of the first swiveling base;

a second operating unit supported on the second swiveling base;

first swivel driving means, provided between the traveling base and the first swiveling base, for driving the traveling base and the first swiveling base in rotation with respect to each other; and second swivel driving means, provided between the first swiveling base and the second swiveling base, for driving the first and second swiveling bases in rotation with respect to each other.

20. A work machine characterized in that it comprises:

a first swiveling base installed rotatably about a prescribed swiveling axis on an upper portion of a traveling base;

a first operating unit supported on the first swiveling base;

a second swiveling base installed rotatably about the swiveling axis on an upper portion of the first swiveling base;

a second operating unit supported on the second swiveling base;

first swivel driving means, provided between the traveling base and the first swiveling base, for driving the traveling base and the first swiveling base in rotation with respect to each other;

second swivel driving means, provided between the first swiveling base and the second swiveling base, for driving the first and second swiveling bases in rotation with respect to each other; and swivel controlling means for controlling the first swivel driving means and the second swivel driving means, respectively, and, when the first swiveling base is swiveling in one direction with respect to the traveling base, causing the second swiveling base to swivel at the same angular speed in the other direction with respect to the first swiveling base.

21. The work machine according to claim 20, characterized in that the first swivel driving means is constituted by providing a first major swiveling gearwheel having a center on the swiveling axis, and a first hydraulic swiveling motor, an output shaft of which is fixed to a first swiveling pinion, the first major swiveling gearwheel being fixed to one of either the traveling base or the swiveling base, in a state where the first swiveling pinion engages with the first major swiveling gearwheel, and the first hydraulic swiveling motor being held on the other of either the traveling base or the swiveling base;

the second swivel driving means is constituted by providing a second major swiveling gearwheel similar to the first major swiveling gearwheel, having a center on the swiveling axis, and a second hydraulic swiveling motor, an output shaft of which is fixed to a second swiveling pinion similar to the first swiveling pinion, which is driven at the same number of revolutions as the first hydraulic swiveling motor when the same quantity of hydraulic oil is supplied thereto, the second major swiveling gearwheel being fixed to either one of the first swiveling base or the second swiveling base, in a state where the second swiveling pinion engages with the second major swiveling gearwheel, and the second hydraulic swiveling motor being held on the other of the first swiveling base or the second swiveling base; and the swivel controlling means supplies the same quantity of hydraulic oil respectively to the first hydraulic swiveling motor and the second hydraulic swiveling motor.

22. A work machine characterized in that it comprises:

a first swiveling base, installed rotatably about a prescribed swiveling axis on an upper portion of a traveling base, comprising a first major swiveling gearwheel and a second major swiveling gearwheel, which are mutually similar and respectively have centers on the swiveling axis;

a supporting frame section, extending from the first swiveling base in an outward radial direction from the swiveling axis and having an empty space in an inner portion thereof;

a first operating unit supported on the first swiveling base via the supporting frame section;

a hydraulic piping passing through the empty space in the supporting frame section, through which hydraulic oil can be caused to flow to the first operating unit;

a second swiveling base installed rotatably about the swiveling axis on an upper portion of the first swiveling base;

a second operating unit supported on the second swiveling base;

a first hydraulic swiveling motor, an output shaft of which is fixed to a first swiveling pinion, which is held on the traveling base in a state where the first swiveling pinion engages with the first major swiveling gearwheel, a second hydraulic swiveling motor, an output shaft of which is fixed to a second swiveling pinion similar to the first swiveling pinion, which is held on the second swiveling base in a state where the second swiveling pinion engages with the second major swiveling gearwheel and is driven at the same number of revolutions as the first hydraulic swiveling motor when the same quantity of hydraulic oil is supplied thereto;

swivel controlling means for supplying the same quantity of hydraulic oil to the first hydraulic swiveling motor and the second hydraulic swiveling motor, respectively, and, when the first swiveling base is swiveling in one direction, causing the second swiveling base to swivel at the same angular speed in the other direction with respect to the first swiveling base; and a two-stage swivel joint comprising a pair of rotors having respective center holes and a single shaft fitting into the center holes of the rotors, in a rotatable fashion, the two-stage swivel joint extending inside the traveling base, the first swiveling base and the second swiveling base, in a state where a central axis of the shaft is aligned with the swiveling axis and a central portion of the joint in an axial direction thereof is fixed to either one of the traveling base or the first swiveling base, whereby respective hydraulic circuits of the traveling base, the first swiveling base and the second swiveling base can be mutually connected via the pair of rotors and the shaft.

23. A work machine characterized in that it comprises:

a first swiveling base installed rotatably about a prescribed swiveling axis on an upper portion of a traveling base and supporting a cutting operating unit provided with a cutter; and a second swiveling base installed rotatably about a prescribed swiveling axis on an upper portion of the first swiveling base and supporting a grapple operating unit provided with a hand.

24. A work machine characterized in that it comprises:

a first swiveling base installed rotatably about a prescribed swiveling axis on an upper portion of a traveling base and supporting a gathering operating unit provided with a bucket; and a second swiveling base installed rotatably about a prescribed swiveling axis on an upper portion of the first swiveling base and supporting a brush operating unit provided with a brush for sweeping up objects into the gathering operating unit.

25. A work machine characterized in that it comprises:

a first swiveling base installed rotatably about a prescribed swiveling axis on an upper portion of a traveling base and supporting a clamping operating unit provided with a clamper; and a second swiveling base installed rotatably about a prescribed swiveling axis on an upper portion of the first swiveling base and supporting a grapple operating unit provided with a hand.

26. A work machine characterized in that it comprises:

a first swiveling base installed rotatably about a prescribed swiveling axis on an upper portion of a traveling base and supporting a fork operating unit provided with a fork; and a second swiveling base installed rotatably about a prescribed swiveling axis on an upper portion of the fire swiveling base and supporting an excavating operating unit provided with a root-cutting bucket.

* * * * *